(12) United States Patent
Kanagalingam et al.

(10) Patent No.: US 10,689,306 B2
(45) Date of Patent: Jun. 23, 2020

(54) FERTILIZER COMPOSITION AND METHODS OF MAKING AND USING SAME

(71) Applicant: SABIC GLOBAL TECHNOLOGIES B.V., Bergen Op Zoom (NL)

(72) Inventors: Sabeshan Kanagalingam, Riyadh (SA); Ravi Hegde, Bangalore (IN); Madduri Srinivasarao, Bangalore (IN); Rajamalleswaramma Koripelly, Bangalore (IN); Samik Gupta, Bangalore (IN); Nilkamal Bag, Bangalore (IN); Satish Burla, Bangalore (IN); Yoganand Gurumallappa, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 63 days.

(21) Appl. No.: 15/746,096

(22) PCT Filed: Jul. 18, 2016

(86) PCT No.: PCT/IB2016/054271
§ 371 (c)(1),
(2) Date: Jan. 19, 2018

(87) PCT Pub. No.: WO2017/013573
PCT Pub. Date: Jan. 26, 2017

(65) Prior Publication Data
US 2018/0208513 A1    Jul. 26, 2018

Related U.S. Application Data

(60) Provisional application No. 62/194,600, filed on Jul. 20, 2015.

(51) Int. Cl.
*C05G 3/08* (2006.01)
*C05C 9/00* (2006.01)
(Continued)

(52) U.S. Cl.
CPC ............. *C05C 9/005* (2013.01); *C05G 3/00* (2013.01); *C05G 3/0041* (2013.01);
(Continued)

(58) Field of Classification Search
CPC ........ C05C 9/005; C05G 3/0052; C05G 3/00; C05G 3/08; C05G 3/0041; C07F 9/224; Y02P 60/218
See application file for complete search history.

(56) References Cited

U.S. PATENT DOCUMENTS 3,056,723 A     10/1962  Galloway
3,232,740 A *    2/1966  Sor ........................... C05C 9/00
                                                            252/384
(Continued)

FOREIGN PATENT DOCUMENTS

AU           667645        2/1995
AU         2015212412      9/2016
(Continued)

OTHER PUBLICATIONS

Al-Zahrani, S. M. "Utilization of Polyethylene and Paraffin Waxes as Controlled delivery Systems for Different Fertilizers" *Ind. Eng. Chem. Res.*, 2000, 39(2):367-371.
(Continued)

*Primary Examiner* — Jennifer A Smith
(74) *Attorney, Agent, or Firm* — Norton Rose Fulbright US LLP

(57) ABSTRACT

In accordance with the present invention, disclosed herein is a fertilizer core particle and fertilizer granule. The fertilizer core particle has one or more fertilizer additives, one or more binders comprising a wax, and one or more pH buffering agents, and wherein the core particle comprises from about 10 wt % to about 99 wt % of the one or more binders comprising a wax.

20 Claims, 22 Drawing Sheets

(51) Int. Cl.
    *C05G 3/00*           (2020.01)
    *C07F 9/22*           (2006.01)

(52) U.S. Cl.
    CPC ............ *C05G 3/0052* (2013.01); *C05G 3/08* (2013.01); *C07F 9/224* (2013.01); *Y02P 60/218* (2015.11)

(56) References Cited

U.S. PATENT DOCUMENTS

| | | | |
|---|---|---|---|
| 3,314,778 A * | 4/1967 | Campbell | C05G 3/0035 564/3 |
| 3,322,528 A | 5/1967 | Hamamoto | |
| 3,326,665 A | 7/1967 | Schafer et al. | |
| 3,331,677 A | 7/1967 | Campbell et al. | |
| 3,388,989 A | 6/1968 | Sor | |
| 3,441,539 A | 4/1969 | Schäfer et al. | |
| 3,499,748 A | 3/1970 | Fraser | |
| 3,825,414 A | 6/1974 | Lee et al. | |
| 3,870,755 A | 3/1975 | Kamo et al. | |
| 3,954,436 A | 5/1976 | Vad et al. | |
| 3,961,329 A | 7/1976 | Naidich | |
| 3,962,329 A | 7/1976 | Schoenaich et al. | |
| 4,062,890 A | 12/1977 | Shank | |
| 4,880,455 A | 11/1989 | Blank | |
| 4,994,100 A | 2/1991 | Sutton et al. | |
| 5,124,451 A | 7/1992 | Hackl et al. | |
| 5,169,954 A | 12/1992 | Hackl et al. | |
| 5,264,019 A | 11/1993 | Gossett, Jr. et al. | |
| 5,300,135 A | 4/1994 | Hudson et al. | |
| 5,352,265 A | 10/1994 | Weston et al. | |
| 5,399,186 A | 3/1995 | Derrah et al. | |
| 5,414,083 A | 5/1995 | Hackl et al. | |
| 5,597,917 A | 1/1997 | Hackl et al. | |
| 5,645,624 A | 7/1997 | Naka et al. | |
| 5,741,521 A | 4/1998 | Knight et al. | |
| 5,917,110 A | 6/1999 | Kust | |
| 5,976,210 A | 11/1999 | Sensibaugh | |
| 6,048,376 A | 4/2000 | Miller | |
| 6,048,378 A | 4/2000 | Moore | |
| 6,231,633 B1 | 5/2001 | Hirano et al. | |
| 6,391,454 B1 | 5/2002 | Mao et al. | |
| 6,500,223 B1 | 12/2002 | Sakai et al. | |
| 6,576,035 B2 | 6/2003 | Hartmann et al. | |
| 6,749,659 B1 | 6/2004 | Yu et al. | |
| 6,900,162 B2 | 5/2005 | Wertz et al. | |
| 6,936,573 B2 | 8/2005 | Wertz et al. | |
| 6,936,681 B1 | 8/2005 | Wertz et al. | |
| 7,213,367 B2 | 5/2007 | Wertz et al. | |
| 8,163,058 B2 | 4/2012 | Whitehurst | |
| 8,419,819 B2 | 4/2013 | Sutton | |
| 8,603,211 B2 | 12/2013 | Rahn et al. | |
| 9,034,072 B2 | 5/2015 | Gabrielson et al. | |
| 9,376,350 B2 | 6/2016 | Pursell et al. | |
| 9,394,210 B2 | 7/2016 | Gabrielson et al. | |
| 9,422,203 B2 | 8/2016 | Waliwitiya | |
| 9,446,993 B2 | 9/2016 | Li et al. | |
| 2003/0224031 A1 | 12/2003 | Heier et al. | |
| 2004/0001884 A1 | 1/2004 | Moroni et al. | |
| 2004/0016275 A1 | 1/2004 | Hartmann et al. | |
| 2004/0016276 A1 | 1/2004 | Wynnyk et al. | |
| 2004/0050127 A1 | 3/2004 | Ambri | |
| 2004/0163434 A1 | 8/2004 | Quin | |
| 2004/0182953 A1 | 9/2004 | Knoer | |
| 2006/0089259 A1 | 4/2006 | Driessen et al. | |
| 2006/0142157 A1 | 6/2006 | Birthisel et al. | |
| 2009/0270257 A1 | 10/2009 | Pursell et al. | |
| 2010/0011825 A1 | 1/2010 | Ogle et al. | |
| 2010/0139348 A1 | 6/2010 | Wan et al. | |
| 2011/0036009 A1 | 2/2011 | Bissonnette et al. | |
| 2011/0275520 A1 | 11/2011 | Frey et al. | |
| 2012/0017659 A1 | 1/2012 | Pursell et al. | |
| 2012/0067094 A1 * | 3/2012 | Pursell | C05C 9/005 71/29 |
| 2012/0090366 A1 | 4/2012 | Pursell et al. | |
| 2013/0152649 A1 | 6/2013 | Kweeder et al. | |
| 2013/0231493 A1 | 9/2013 | Shishkov et al. | |
| 2014/0047884 A1 | 2/2014 | Gabrielson et al. | |
| 2014/0102156 A1 | 4/2014 | Pursell et al. | |
| 2014/0255605 A1 | 9/2014 | Van Kaathoven et al. | |
| 2015/0031786 A1 | 1/2015 | Lambeth | |
| 2015/0052960 A1 | 2/2015 | Makin et al. | |
| 2015/0101379 A1 | 4/2015 | Gabrielson et al. | |
| 2015/0152017 A1 | 6/2015 | Schumski et al. | |
| 2015/0197460 A1 | 7/2015 | Gabrielson et al. | |
| 2016/0075609 A1 | 3/2016 | Gabrielson et al. | |
| 2016/0076062 A1 | 3/2016 | Medoff et al. | |
| 2016/0340265 A1 | 11/2016 | Kanagalingam et al. | |
| 2018/0208513 A1 | 7/2018 | Kanagalingam et al. | |
| 2018/0297903 A1 | 10/2018 | Ledoux et al. | |

FOREIGN PATENT DOCUMENTS

| | | |
|---|---|---|
| CA | 2441175 | 3/2004 |
| CA | 2701995 | 10/2011 |
| CN | 1126465 | 7/1996 |
| CN | 1145059 | 3/1997 |
| CN | 1666972 | 9/2005 |
| CN | 101134697 | 3/2008 |
| CN | 101177365 | 5/2008 |
| CN | 101289350 | 10/2008 |
| CN | 101289353 | 10/2008 |
| CN | 101323545 | 12/2008 |
| CN | 101723752 | 6/2010 |
| CN | 102143927 | 8/2011 |
| CN | 102295491 | 12/2011 |
| CN | 102557838 | 7/2012 |
| CN | 102826917 | 12/2012 |
| CN | 103319120 | 9/2013 |
| CN | 104261723 | 1/2015 |
| CN | 104311366 | 1/2015 |
| CN | 104326847 | 2/2015 |
| DE | 1146080 | 3/1963 |
| DE | 1905834 | 11/1972 |
| DE | 142044 | 6/1980 |
| DE | 3042662 | 6/1982 |
| DE | 4128828 | 3/1993 |
| DE | 19631764 | 2/1998 |
| EP | 0047556 | 3/1982 |
| EP | 0255752 | 2/1988 |
| EP | 0491238 | 6/1992 |
| EP | 0877722 | 11/1998 |
| EP | 1724247 | 11/2006 |
| EP | 2431346 | 3/2012 |
| FR | 893153 | 6/1944 |
| FR | 1356105 | 3/1964 |
| GB | 1212605 | 11/1970 |
| GB | 1435678 | 5/1976 |
| GB | 1535807 | 12/1978 |
| JP | HO7-033576 | 2/1995 |
| JP | H11263689 | 9/1999 |
| JP | H11278973 | 10/1999 |
| JP | 2001294792 | 10/2001 |
| KR | 100974639 | 8/2010 |
| NZ | 596113 | 8/2012 |
| TW | 1549926 | 9/2016 |
| WO | WO 1989/000079 | 1/1989 |
| WO | WO 95/26942 | 10/1995 |
| WO | WO 1996/018591 | 6/1996 |
| WO | WO 2003/066207 | 8/2003 |
| WO | WO 2004/047974 | 6/2004 |
| WO | WO 2004/098858 | 11/2004 |
| WO | WO 2005/075602 | 8/2005 |
| WO | WO 2006/044393 | 4/2006 |
| WO | WO 2007/041234 | 4/2007 |
| WO | WO 2007/086773 | 8/2007 |
| WO | WO 2013/017888 | 2/2013 |
| WO | WO 2013/019121 | 2/2013 |
| WO | WO 2013/121384 | 8/2013 |
| WO | WO 2014/189183 | 11/2014 |
| WO | WO 2015/001457 | 1/2015 |
| WO | WO 2015/114542 | 8/2015 |
| WO | WO 2015/170217 | 11/2015 |
| WO | WO 2016/091205 | 6/2016 |

(56) References Cited

FOREIGN PATENT DOCUMENTS

| | | |
|---|---|---|
| WO | WO 2016/107548 | 7/2016 |
| WO | WO 2016/186526 | 11/2016 |
| WO | WO 2017/013572 | 1/2017 |
| WO | WO 2017/013573 | 1/2017 |
| WO | WO 2017/081183 | 5/2017 |
| WO | WO 2017/087264 | 5/2017 |
| WO | WO 2017/087265 | 5/2017 |
| WO | WO 2017/100507 | 6/2017 |
| WO | WO 2017/137902 | 8/2017 |
| WO | WO 2017/168288 | 10/2017 |
| WO | WO 2018/193344 | 10/2018 |
| WO | WO 2018/193345 | 10/2018 |
| WO | WO 2018/193358 | 10/2018 |
| WO | WO 2019/030671 | 2/2019 |
| ZA | 201105819 | 4/2012 |

OTHER PUBLICATIONS

Office Action issued in European Patent Application No. 16741394.7, dated Dec. 7, 2018.

Allison, "The Enigma of Soil Nitrogen Balance Sheets" *Adv. Agro.*, 7:213, (1955).

Bolan et al. "Soil Acidification and Liming interactions with Nutrient and Heavy Metal Transformation and Bioavailability," *Advances in Agronomy*, 78:215, (2003).

Chien et al., "Recent Developments of Fertilizer Production and Use to Improve Nutrient Efficiency and Minimize Environmental Impacts," *Adv. Agro.* 102:267, (2009).

Ciurli et al., "Structural properties of the nickel irons in urease: novel insights into the catalytic and inhibition mechanisms" *Coord. Chem. Rev.*, 190-192:331, (1999).

Hays, "Symposium on Controlled-Release Fertilizers" *J. Agri. Food Chem.*, 19:797, (1971).

International Preliminary Report on Patentability issued in International Application No. PCT/IB2016/054271, dated Oct. 18, 2017.

International Search Report and Written Opinion issued in International Application No. PCT/IB2016/054271, dated Oct. 20, 2016.

Subbarao et al., "Scope and Strategies for Regulation of Nitrification in Agricultural Systems—Challenges and Opportunities," *Crit Rev. Plant Sci.*, 25:303, (2006).

International Search Report and Written Opinion issued in International Patent Application No. PCT/IB2016/054270, dated Oct. 24, 2016.

Mahmood et al., "Calcium Carbide-Based Formulations cause Slow Release of Acetylene and Ethylene in Soil and Nitrification Inhibition," *Communication in Soil Science and Plant Analysis*, 2014, 45(17):2277-2288.

Mahmood et al., "Effect of rate and application depth matrix-I calcium carbide based formulation on growth, yield and nitrogen uptake of wheat," *African Journal of Agricultural Research*, 2011, 6(30), 6363-6398.

Mahmood et al., "Nutritional and physiological response of wheat to soil applied matrix-I formulated calcium carbide with and without nitrogen fertilizer" *Pakistan Journal of Nutrition*, 2012, 11(2):154-159.

Sinclair et al., "Radiation use Efficiency" *Advances in agronomy*, 1999, 65:215-265.

Office Action Issued in Corresponding Chinese Patent Application No. 201680051745.8, dated Jul. 23, 2019.

Search Report Issued in Corresponding Chinese Patent Application No. 2016800517458, dated Jul. 2, 2019.

Wu, et al., Eds. "Guidelines for the Use of Fertilizers," China Agricultural Press, Beijing, pp. 122-123, 2000. (English Translation Provided).

Al-Kanani et al., "Volatilization of ammonia from urea-ammonium nitrate solutions as influenced by organic and inorganic additives." *Fertilizer research* 1990, 23, 113-119.

Bose, et al., "New protocol for Biginelli reaction—a practical synthesis of Monastrol," *ARKIVOC*, 2005, 3:228-236.

Gautney, et al., "Feasibility of cogranulating the nitrogen loss inhibitors dicyandiamide, thiourea, phenyl phosphorodiamidate, and potassium ethyl xanthate with urea," *Ind. Eng. Chem. Prod. Res. Dev.*, 1984, 23:483-489.

Gioacchini, et al., "Influence of urease and nitrification inhibitors on N losses from soils fertilized with urea," *Biology and Fertility of Soils*, 2002, 36(2):129-135.

International Preliminary Report on Patentability issued in International Patent Application No. PCT/IB2016/054271, dated Oct. 18, 2017.

International Preliminary Report on Patentability was issued in International Patent Application No. PCT/IB2015/050654, dated Aug. 2, 2016.

International Search Report and Written Opinion issued in counterpart International Application No. PCT/IB2015/053056, dated Sep. 23, 2015.

International Search Report and Written Opinion issued in International Patent Application No. PCT/182016/054271, dated Oct. 24, 2016.

International Search Report and Written Opinion issued in International Patent Application No. PCT/162015/050654, dated May 19, 2015.

International Search Report and Written opinion issued in International Application No. PCT/IB2018/052577, dated Aug. 1, 2018.

International Search Report and Written opinion issued in International Application No. PCT/IB2018/052578, dated Aug. 1, 2018.

International Search Report and Written opinion issued in International Application No. PCT/IB2018/052630, dated Aug. 9, 2018.

International Search Report and Written opinion issued in International Application No. PCT/IB2018/055946, dated Dec. 3, 2018.

International Search Report and Written opinion issued in International Application No. PCT/IB2017/050683, dated Jun. 20, 2017.

International Search Report and Written Opinion issued in International Application No. PCT/IB2016/054270, dated Oct. 24, 2016.

International Search Report and Written Opinion issued in International Patent Application No. PCT/US2016/061486, dated Jan. 25, 2017.

International Search Report and Written Opinion issued in International Patent Application No. PCT/US2016/061487, dated Jan. 5, 2017.

Jarosiewicz & Tomaszewska, "Controlled-release NPK fertilizer encapsulated by polymeric membranes." *Journal of Agricultural and Food Chemistry*, 2003, 51(2):413-417.

Kawakami, et al., "Physiological and yield responses of field-grown cotton to application of urea with the urease inhibitor NBPT and the nitrification inhibitor DCD," *European Journal of Agronomy*, 2012, 43:147-154.

Lunt, et al., "Properties and Value of 1,1-Diureido Isobutane (IBDU) as a Long-Lasting Nitrogen Fertilizer," *J. Agr. Food Chem.*, 1969, 17(6):1269-1271.

Office Action and Search Report issued in Corresponding Taiwanese Patent Application No. 104114189, dated May 9, 2019.

Office Action issued in corresponding Chinese Patent Application No. 201580008733.2, dated Jan. 11, 2019. (Machine Translation Provided).

Office Action issued in corresponding Chinese Patent Application No. 2015800087332, dated Jun. 13, 2019.

Office Action issued in corresponding Indian Patent Application No. 201617028561, dated Jun. 18, 2019.

Office Action issued in corresponding Taiwan Patent Application No. 105122936, dated Sep. 5, 2019.

Patra et al., "Use of urea coated with natural products to inhibit urea hydrolysis and nitrification in soil," *Biol. Fertil. Soils*, 2009, 45, 617-621.

Reddy, et al., New environmentally friendly solvent free syntehesis of dihydropyrimidinones catalysed by N-butyl-N, N-dimethylphenylethylammonium bromide, *Tetrahedron Letters*, 2003, 44:8173-8175.

Sanz-Cobena, et al., "Gaseous emissions of N2O and NO and NO3—leaching from urea applied with urease and nitrification inhibitors to a maize (Zea mays) crop," *Agriculture, Ecosystems & Environment*, 2012, 149:64-73.

(56) References Cited

OTHER PUBLICATIONS

Soares, et al., "Ammonia volatilization losses from surface-applied urea with urease and nitrification inhibitors," *Soil Biology and Biochemistry*, 2012, 52:82-89.
Trenkel, "Controlled-release and stabilized fertilizers in agriculture." *International fertilizer industry association*, 1997, 11, 1-156.
Upadhyay,"Urease inhibitors: A review." *Indian Journal of Biotechnology* 2012, 11, 381-388.
Watson, et al., "Rate and mode of application of the urease inhibitor N-(n-butyl) thiophosphoric triamide on ammonia volatilization from surface-applied urea," *Soil Use and Management*, 2008, 24:246-253.
Zaman, et al., "Effects of urease and nitrification inhibitors on the efficient use of urea for pastoral systems," *J. Soil Science and Plant Nutrition*, 2013, 59(4):649-659.
Zaman, et al., "Improving pasture growth and urea efficiency using N inhibitor, molybdenum and elemental Sulphur," *Journal of Soil Science and Plant Nutrition*, 2014, 14(1):245-257.

\* cited by examiner

| Crop | Soil pH | | | | |
|---|---|---|---|---|---|
| | 4.7 | 5 | 5.7 | 6.8 | 7.5 |
| | Relative Yield (100 is the best, 0 is the worst) | | | | |
| Corn | 34 | 73 | 83 | 100 | 85 |
| Wheat | 68 | 78 | 89 | 100 | 99 |
| Soybeans | 65 | 79 | 80 | 100 | 93 |
| Oats | 77 | 93 | 99 | 98 | 100 |
| Barley | 0 | 23 | 80 | 95 | 100 |
| Alfalfa | 2 | 9 | 42 | 100 | 100 |
| Timothy (grass) | 31 | 47 | 66 | 100 | 95 |

FIG. 12

FERTILIZER COMPOSITION AND METHODS OF MAKING AND USING SAME

CROSS-REFERENCE TO RELATED APPLICATIONS

This application is a national phase under 35 U.S.C. § 371 of International Application No. PCT/IB2016/054271, filed Jul. 18, 2016, which claims the benefit of and priority to U.S. Provisional Application No. 62/194,600, filed Jul. 20, 2015, the entire contents of each of which are hereby incorporated by reference in their entirety.

FIELD OF INVENTION

This disclosure relates to a fertilizer core particle and fertilizer granule comprising a binder, and a pH buffering agent, and methods for making such fertilizer granule.

BACKGROUND

Continuous use of fertilizers leads to loss of soil fertility and nutrient balance. To increase the crop yield and satisfy the growing need of increasing population, more fertilizers are being used. In addition, large application or usage of urea, its rapid hydrolysis and nitrification in the soil is causing deterioration of soil health and environmental issues such as greenhouse emissions and ground water contamination.

To improve the soil fertility, the farmers are applying micronutrient fertilizers and/or inhibitors in addition to the regular fertilizers. Because it is a separate application, there is a chance of over-application, under-application and mis-application (wrong time, wrong ratio etc.). Separate applications are also more laborious.

Thus, there is a need for an improved fertilizer granule with improved application properties. Such fertilizer granule and methods related thereto are disclosed herein.

SUMMARY OF THE INVENTION

In accordance with the present invention, disclosed herein is a fertilizer core particle having an outer surface and comprising one or more fertilizer additives, one or more binders comprising a wax, and one or more pH buffering agents, and wherein the core particle comprises from about 10 wt % to about 99 wt % of the one or more binders comprising a wax.

Also disclosed herein is a fertilizer granule comprising the fertilizer core particle disclosed herein, wherein the fertilizer granule further comprises a first nitrogen containing fertilizer composition in contact with the outer surface of the fertilizer core particle.

Also disclosed herein is a composition comprising the fertilizer granule disclosed herein and a second nitrogen containing fertilizer composition.

Also disclosed herein is a composition comprising the fertilizer granule disclosed herein and a fertilizer composition.

Also disclosed herein is a composition comprising the fertilizer core particle disclosed herein and a second nitrogen containing fertilizer composition.

Also disclosed herein is a composition comprising the fertilizer core particle disclosed herein and a fertilizer composition.

Also disclosed herein is a kit comprising a) the fertilizer granule disclosed herein; and b) a second nitrogen containing fertilizer composition.

Also disclosed herein is a kit comprising a) the fertilizer granule disclosed herein; and b) a fertilizer composition.

Also disclosed herein is a kit comprising a) the fertilizer core particle disclosed herein; and b) a second nitrogen containing fertilizer composition.

Also disclosed herein is a kit comprising a) the fertilizer core particle disclosed herein; and b) a fertilizer composition.

Also disclosed herein is a system comprising an extruder capable of extruding a fertilizer core particle disclosed herein.

Also disclosed herein, is a method preparing a fertilizer core particle disclosed herein comprising the step of: a) extruding a mixture comprising one or more fertilizer additives, one or more binders comprising a wax, and one or more pH buffering agents, and wherein the mixture comprises from about 10 wt % to about 99 wt % of the one or more binders comprising a wax, thereby forming the fertilizer core particle.

Also disclosed herein is a method for preparing the fertilizer granule disclosed herein comprising the steps of: a) providing a core particle comprising one or more fertilizer additives, one or more binders comprising a wax, and one or more pH buffering agents, and wherein the core particle comprises from about 10 wt % to about 99 wt % of the one or more binders comprising a wax; and b) granulating the core particle with a nitrogen containing fertilizer composition, thereby forming a fertilizer granule.

Also disclosed herein is a method for increasing the amount of nitrogen in soil comprising the step of: a) applying to the soil an effective amount of the fertilizer granule disclosed herein, thereby increasing the amount of nitrogen in the soil.

Additional advantages will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying Figures, which are incorporated in and constitute a part of this specification, illustrate several aspects and together with the description serve to explain the principles of the invention.

FIG. 10A shows the ammonium transformation, and FIG. 10B shows the nitrate transformation.

FIG. 11A shows the ammonium transformation, and FIG. 11B shows the nitrate transformation.

FIG. 12 show relative yield of crops as a function of the pH in the soil.

Figure 1A:
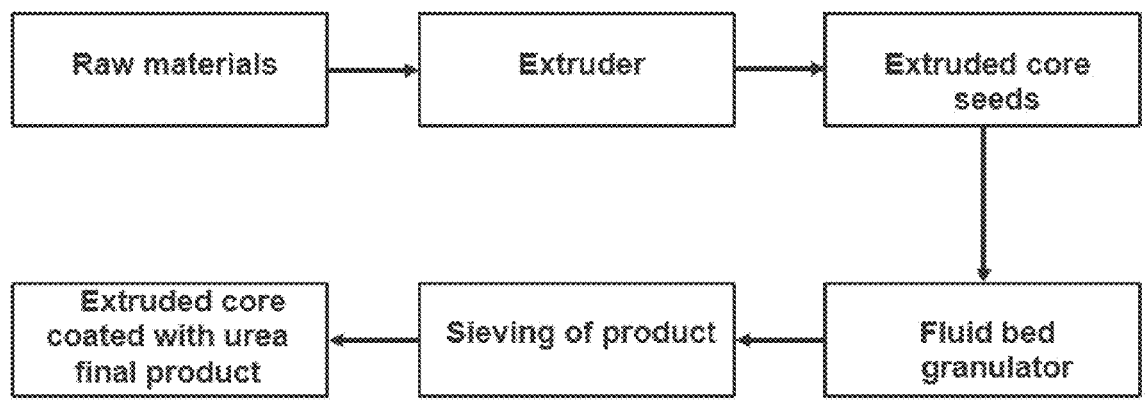
FIGS. 1A and 1B show general non-limiting schemes of the production of a fertilizer granule.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the examples included therein.

Before the present fertilizer compositions, articles, systems, devices, and/or methods are disclosed and described, it is to be understood that they are not limited to specific methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

A. Definitions

As used herein, nomenclature for compounds and fertilizer compositions can be given using common names as well as names assigned by the International Union of Pure and Applied Chemistry (IUPAC), Chemical Abstracts Service (CAS) recommendations for nomenclature, and the *Manual for Determining the Physical Properties of Fertilizer*, hereby incorporated herein by reference. One of skill in the art can readily ascertain the structure of a compound and fertilizer composition if given a name by systemic reduction of the compound structure using naming conventions.

As used in the specification and the appended claims, the singular forms "a," "an," and "the" include plural referents unless the context clearly dictates otherwise.

As used herein, the term "other nitrogen fertilizer" refers to a fertilizer comprising one or more nitrogen atoms that is not urea. Non-limiting examples of other nitrogen fertilizers include ammonium nitrate, ammonium sulfate, diammonium phosphate (DAP), monoammonium phosphate (MAP), urea-formaldehyde, ammonium chloride, and potassium nitrate.

As used herein, the term "other biomaterial" as it relates to the filler refers to biomaterials that are biodegradable. Non-limiting examples of other biomaterials include rice husk, and dried distillers grains with solubles (DDGS).

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component denotes the weight relationship between the element or component and any other elements or components or article for which a part by weight is expressed. Thus, in a composition comprising two parts by weight of component X and five parts by weight component Y, X and Y are present at a weight ratio of 2:5 or 2/5 or 0.4, and are present in such ratio regardless of whether additional components are contained in the compound. Additionally, references in the specification and concluding claims to molar ratios of a particular element or component denotes the molar relationship between the element or component and any other elements or components in the composition or article for which a molar ratio is expressed. Thus, in a composition containing five moles of component X and two moles component Y, X and Y are present at a molar ratio of 5:2 or 5/2 or 2.5 and are present in such ratio regardless of whether additional components are contained in the composition.

A weight percent (wt %) of a component, unless specifically stated to the contrary, is based on total weight of the formulation or composition in which the component is included.

As used herein, the terms "optional" or "optionally" means that a subsequently described event or circumstance can or cannot occur, and that the description includes instances where said event or circumstance occurs and instances where it does not.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow, plain meaning derived from grammatical organization or punctuation, and number or type of embodiments described in the specification.

Disclosed are components to be used to prepare fertilizer compositions as well as the fertilizer compositions themselves to be used within the methods disclosed herein. These and other compounds are disclosed herein, and it is understood that when combinations, subsets, interactions, groups, etcetera, of these materials are disclosed that while specific reference of each various individual and collective combinations and permutation of these components cannot be explicitly disclosed, each is specifically contemplated and described herein. For example, if a particular fertilizer composition is disclosed and discussed and a number of modifications that can be made to a number of compounds including the fertilizer compositions are discussed, specifically contemplated is each and every combination and permutation of the composition and modifications that are possible unless specifically indicated to the contrary. Thus, if a class of compounds A, B, and C are disclosed as well as a class of fertilizer compositions D, E, and F and an example of a fertilizer composition, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using fertilizer compositions. Thus, if there are a variety of additional steps that can be performed, it is understood that each of these additional steps can be performed with any specific embodiment or combination of embodiments of the methods of the invention.

As used herein, the term "abrasion resistance" means resistance to formation of dust and fines that result in granule-to-granule and granule-to-equipment contact. It is also useful for estimating material losses; handling, storage and application properties; and pollution control requirements. Abrasion resistance is determined by measuring the percentage of dust and fines created by subjecting a sample to abrasive-type action.

As used herein, the term "crushing strength" means minimum force required to crush an individual fertilizer granule. Crushing strength is useful in predicting the expected handling and storage properties of granular fertilizer compositions, as well as the pressure limits applied during bag and bulk storage. The crushing strength is measured by applying pressure to granules of a specified range and recording the pressure required to fracture them.

As used herein, the term "bulk density (loose)" means mass per unit volume of a material after it has been poured freely into a container under clearly specified conditions. Bulk density is a measure of the material density, material porosity, and voids between the particles of a material. Loose-pour density represents minimum density (greatest volume occupancy) expected from a given material.

As used herein, the term "critical relative humidity," abbreviated CRH, is the atmospheric humidity above which a fertilizer composition will absorb a significant amount of moisture and below which it will not absorb a significant amount of moisture. For every fertilizer composition, there is a maximum relative humidity to which it can be exposed without absorbing moisture from the air. This value also indicates a degree of protection required during handling. The procedure for determination of CRH involved exposure of a sample of a fertilizer composition of the present invention to progressively higher relative humidity in a variable humidity chamber. The lowest humidity that initiated significant moisture pickup determined by frequent weighing of the sample was the CRH.

As used herein, the term "hygroscopicity" means the degree to which a material will absorb moisture from the atmosphere. Hygroscopicity of fertilizer compositions can determine conditions under which bulk fertilizer can be stored and also flowability during handling and field application. Fertilizers vary in their ability to withstand physical deterioration, such as wetting and softening, when exposed to humidity. Even fertilizers with similar CRH values can behave differently as a result of differences in moisture holding capacity. Thus, CRH alone is not sufficient to determine hygroscopicity of a fertilizer composition. Accordingly, hygroscopocities of fertilizer compositions can be compared by imposing various periods of humid exposure on samples contained in completely filled, open-top glass cups. The hygroscopicity tests consisted of moisture absorption, which is rate of moisture pickup per unit of exposed surface; moisture penetration, which is depth of moisture penetration or visible wetting of the fertilizer; moisture holding capacity, which is amount of moisture that individual granules will absorb before allowing moisture to be transferred by capillary action to adjacent particles; and integrity of wetted granules, which is determined quantitatively by handling the top surface layer of a sample after it has been exposed to a humid atmosphere.

As used herein, the term "effective amount" refers to an amount that is sufficient to achieve the desired result or to have an effect on an undesired condition. For example, an "effective amount of the fertilizer granule to increase the amount of nitrogen in the soil" refers to an amount that is sufficient to achieve to increase the nitrogen content in the soil.

B. General

Disclosed herein is a fertilizer core particle and a fertilizer granule. The fertilizer core particle can be made by extrusion due to the selection of binder in the fertilizer core particle. For example, the binder is a wax and is chosen such that it is amenable to various aspects of extrusion.

The fertilizer core particle and a fertilizer granule disclosed herein have desirable physical properties such as desired abrasion resistance, particle strength, pelletizability, hygroscopicity, particle shape, and size distribution, which are important properties for the fertilizer core particle. Accordingly, the binder comprising a wax is chosen to maximize these properties. The examples described elsewhere herein provide data for appropriate binders and their amounts, so that the resulting composition would be amenable to the extrusion process and would withstand the post-extrusion processes (e.g., granulation, coating and the like).

A particular application of embodiments disclosed herein is the stabilization of a fertilizer additive, present in the fertilizer core particle, such as, for example, stabilization of an inhibitor, such as, for example, N-(n-butyl) thiophosphoric triamide (NBTPT). Certain fertilizer additives are unstable and tend to degrade upon exposure to high temperatures, changing in pH (either acidic or basic) etc. In particular instances, the fertilizer core particle disclosed herein is embedded (or coated) within a fertilizer compositions, for example, within a nitrogen containing fertilizer composition, such as, for example, urea. In some instances, a shell that comprises a nitrogen containing fertilizer substantially surrounds at least a portion of the outer surface of the fertilizer core particles.

In conventional fertilizer technology, various fertilizer additives are mixed with a fertilizer using an "all in one" methodology. In these instances, fertilizer additives, excipients, other ingredients and fertilizer compositions are mixed together to form a fertilizer compositions, in the form of particles or granules. In most cases, granulation is performed at elevated temperatures such that the fertilizer composition is at a molten state. For example, the granulation temperature for molten urea is about 135° C. at about 35 atm pressure. Most of the fertilizer additives degrade, at least partially, under these conditions. Traditionally, these stability problems have been circumvented by using a large excess of fertilizer additives. Such methods, although in use, are sub-optimal and raises concerns regarding the cost, efficacy, by-products, environmental waste, and green-house gases etc.

The production of the fertilizer core particle disclosed herein provides, inter alia, a solution to the instability of the fertilizer additives at higher temperatures. The binder, excipient, and/or filler are chosen such that the resulting composition synergistically protects the fertilizer additives from high temperature degradation. As disclosed herein, the binder, excipient, and filler, can be mixed together with the fertilizer additive and extruded to form a fertilizer core particle.

In one aspect, no nitrogen fertilizer composition is present in the fertilizer core particle. Thus, in such instances, only the fertilizer additive (together with the binder, pH buffering agent, excipient, and/or filler) is present in within the fertilizer core particle.

Some of the fertilizer additives are unstable towards changing in the pH, either in the composition during the manufacturing process, or after application to the soil. For example, in the case of nitrogen containing fertilizers, after application, the soil environment becomes acidic. Accordingly, fertilizer additives that are sensitive to the acidic pH degrade and will not reach the full performance capacity. Including a large excess of fertilizer additives to compensate for the loss due to pH variations may not be successful, since the fertilizer composition, which presents in a large excess (in comparison to the fertilizer additives) continue to alter the pH of the soil environment. Also, commercial products, such as, SuperU®, uses organic solvents to, such as NMP. Such use is undesired. The use of such organic solvents is not needed in the production of the fertilizer core particle or fertilizer granule.

The fertilizer core particle disclosed herein comprises one or more pH buffering agents. These buffering agents prevent the pH-mediated degradation, especially, the acidic pH-mediated degradation of the fertilizer. For example, N-(n-butyl) thiophosphoric triamide (NBTPT), is unstable at acidic pH and at higher temperatures. In certain aspects disclosed herein, the fertilizer core particle is a formulation of that provides pH and thermal stability, for fertilizer additives, such as, for example, inhibitors, such as, for example, NBTPT.

The fertilizer core particle comprising a fertilizer additive can be used in combination with an appropriate fertilizer composition. For example, the core particles can be mixed with a nitrogen containing fertilizer composition (either granules or powder), and can be applied to the soil.

In an alternative embodiment, the fertilizer core particle can be embedded within a fertilizer composition. For example, in some embodiments, a shell containing a fertilizer composition at least partially surrounds the outer surface of the fertilizer core particle. In some of these embodiments, the shell comprises a nitrogen containing fertilizer composition. In some cases, the nitrogen containing fertilizer composition is urea. In some instances, two or more core particles can be embedded within a matrix of a nitrogen containing fertilizer composition (e.g., urea).

The granulating or fattening of fertilizer particles of the same composition is a known technique. However, it is practically difficult the match the surface properties of the core particle with that of a heterogeneous composition. For example, as in some of the instances disclosed herein, forming a shell over a core particle comprising binders, fillers, fertilizer additives and other excipients, with a nitrogen containing fertilizer composition (e.g., urea) is problematic. The surface properties of the fertilizer core disclosed herein is appropriate for the granulation process.

Forming a shell that at least partially surrounds the fertilizer core particle produces a fertilizer granule. In some instances where the shell comprises a nitrogen containing fertilizer composition, such as, for example, a nitrogen containing fertilizer composition comprising urea.

In some instances, the urea granules can be used as a homogenous composition (i.e., comprising only the urea granules disclosed herein). They can also be used as a heterogenous composition, i.e., mixed with other nitrogen containing fertilizers or other fertilizers (e.g., phosphorous or potassium containing fertilizers).

In one aspect, the fertilizer core particle disclosed herein comprises a urease inhibitor or a nitrification inhibitor or a combination thereof. In one aspect, the urease or nitrification inhibitor is included only in the core particle. Thus, in one aspect, the shell only contains, in these instances, a nitrogen containing fertilizer composition, for example, urea.

In one aspect, the shell can further comprise a fertilizer additive as disclosed herein.

Some of the fertilizer core particles disclosed herein comprise a binder comprising a wax, one or more pH buffering agents, and NBTPT and dicyandiamide (DCD). Some of these fertilizer core particles are granulated with urea, forming a shell that substantially covers the outer surface of the fertilizer core particle. In some aspects, about 95 wt % of the fertilizer granule is the outer shell (e.g., urea) and about 5 wt % is the fertilizer core particle.

C. Fertilizer Compositions

Plants take up ammonium and other positively charged cations by releasing one hydrogen ion ($H^+$) into the medium solution for each ammonium ion absorbed. Over time, ammoniacal nitrogen uptake increases hydrogen ion concentration thereby lowering the growing medium pH. The uptake of negatively charged anions such as nitrate is most often accomplished by releasing hydroxide ions ($OH^-$). In the medium solution, hydroxide and hydrogen ions combine to form water. The ratio of nitrate to ammoniacal nitrogen in a fertilizer determines the rate of substrate pH change. The pH changing property is known as a fertilizer's potential acidity or basicity. Apart from fertilizer use and root activity, many other factors affect the pH of the soil including source and quality of water, soil type and soil minerals. However both acidic pH (<5.5) and basic pH (>8) can be detrimental to soil health and plant growth. Moreover, it was observed that most of the commercially used fertilizers illicit change in pH (mostly causes acidity) (*Advances in Agronomy*, 2001, 78, 215). It was observed that crop yield is directly correlated to pH. For example, for most crops, a range of 6 to 7.5 is best as shown in FIG. 12.

Urea is one of the most widely used fertilizers because of its high nitrogen content (46.6%). Unfortunately, urea has several drawbacks such as a) high water solubility that leads to leaching in the soil before plants can assimilate it, b) rapid hydrolysis by urease enzyme to form carbon dioxide and ammonia, c) an abrupt overall pH increase. Under ideal conditions, the urea hydrolyzed product, ammonia is converted to ammonium, ready for plant uptake. However, under less than ideal conditions (pH<6 or >8) the ammonia can be lost to the atmosphere, etc. (S. H. Chien., et al., *Adv. Agro.*, 2009, 102, 267). The ammonia that is produced from the urease catalyzed hydrolysis of urea further reacts with soil water to provide ammonium cation. Subsequently the ammonium cation gets oxidized biologically to nitrite and nitrate by nitrosomonas and nitrobacter bacteria. This process is known as nitrification. The conversion of a relatively immobile nitrogen form (ammonium) to a nitrogen that is highly mobile (nitrate) makes the soil nitrogen susceptible to losses through multiple pathways like, leaching of nitrate, gaseous losses of nitrogen in the form of $N_2$, NO, $N_2O$. Allison and Lundt have reported that as much as 75% of the nitrogen may be lost in area with high and intermittent precipitation (F. E. Allison, *Adv. Agro.*, 1955, 7, 213; J. T. Hays, *J. Agri. Food Chem.*, 1971, 19, 797). These adverse effects caused by application of urea leads to significant negative environmental and economic impact.

Different approaches have been proposed to reduce the nitrogen loss from fertilizers. One such approach is to encapsulate fertilizer granules with a material, which has low water permeability. Such encapsulated fertilizer granule would retard the release of fertilizer so that plants get more time for assimilation. The other possible approach would be to use urease and/or nitrification inhibitor that would slow down the activity of the particular enzyme or the microorganism. Both of these approaches have been extensively explored to develop enhanced efficiency fertilizers (S. H. Chien., et al., *Adv. Agro.*, 2009, 102, 267; F. E. Allison, *Adv. Agro.*, 1955, 7, 213; J. T. Hays, *J. Agri. Food Chem.*, 1971, 19, 797; S. Ciurli, et al., *Coord. Chem. Rev.*, 1999, 190-192, 331; G. V. Subbarao, et al., *Crit. Rev. Plant Sci.*, 2006, 25, 303)).

A number of urease and nitrification inhibitors have been developed to enhance the efficiency of fertilizer, but their application is very limited due to its stability in the soil at various conditions such as pH, temperature, precipitation, etc. For example, N-(n-butyl) thiophosphoric triamide (NBTPT) is known to be a good inhibitor of urease but it is unstable under acidic pH. NBTPT also decomposes when exposed to high temperatures, such as the temperature of a urea melt (about 135-140° C.). Likewise, dicyandiamide (DCD) is one of the commercially used nitrification inhibitors but it cannot be used in hot climatic region due to its thermal instability in the soil.

It is also known that nitrogen loss can be reduced when an inhibitor is applied with or within urea fertilizer. Agrotain® (NBTPT containing liquid-solution, which is coated on urea granules), for example is proved to prevent urease enzyme from breaking down urea for up to 14 days. In another study, granulated mixture of molten urea and inhibitor showed beneficial effect (U.S. Pat. No. 4,994,100 to Balser et al.). However, these techniques have not addressed the problem of thermal and/or pH sensitivity of the inhibitors. Similarly, SuperU® (NBTPT mixed with NMP as solvent before granulation) also does not protect the NBTPT from being exposed to and, therefore can degrade, the heat from a urea melt (about 135-140° C.).

To overcome these issues a fertilizer core particle is provided that is coated with an outer coating of urea that will first come in contact with the soil protecting the active ingredients, and the central particle will get released gradually. The fertilizer core particle contains both a binder and a pH buffering agent. The pH buffering agent, for example $CaCO_3$ (chalk powder (CP)) (mostly calcium carbonate), is a material that neutralize the acidity caused by urea hydrolysis, thereby preventing active agents, such as, for example, NBTPT, from degrading when placed in soil with an acidic pH. Thus, pH buffering agent increases the efficacy of active agents, such as, for example, NBTPT, and also maintains soil pH.

Balancing the pH of in the soil, by use of the fertilizer core particle and/or fertilizer granule disclosed herein, increases a plant's (crop's) ability to uptake required nutrients. The fertilizer core particle and fertilizer granule disclosed herein can also effectively be used to monitor the amount of ingredients applied to the soil, thereby preventing over or under fertilization.

The binder in the fertilizer core particle protects the active ingredient, for example NBTPT, from being exposed to high temperatures during the granulation process, thereby preventing NBTPT from decomposing in the granulation process. For example, high melt or low melt wax containing cores can prevent NBTPT degradation efficiently during the granulation process. In such a formulation, all active ingredients e.g., inhibitors, e.g. NBTPT, are protected inside the core by the wax.

The outer coating, for example urea, first comes in contact with the soil protecting the active ingredients, and the ingredients in the central particle are released gradually. It is also possible for the active ingredient in the core to come in contact with the soil in a phased manner upon dissolution of outer urea shell.

Disclosed herein is a fertilizer core particle having an outer surface and comprising one or more fertilizer additives, one or more binders comprising a wax, and one or more pH buffering agents, and wherein the core particle comprises from about 10 wt % to about 99 wt % of the one or more binders comprising a wax.

In one aspect, the fertilizer core particle is an extruded fertilizer core particle.

Also disclosed herein is a fertilizer granule comprising the fertilizer core particle disclosed herein, wherein the fertilizer granule further comprises a first nitrogen containing fertilizer composition in contact with the outer surface of the fertilizer core particle.

In one aspect, the fertilizer granule comprises two or more fertilizer core particles. In yet another aspect, the fertilizer granule comprises one fertilizer core particle. In yet another aspect, the fertilizer granule consists of one fertilizer core particle and a shell at least partially surrounding the fertilizer core particle. For example, one or more cores can be surrounded by a matrix of nitrogen containing fertilizers; in some instances, the surrounding matrix can be urea.

Also disclosed herein is a composition comprising the fertilizer granule disclosed herein and a second nitrogen containing fertilizer composition.

Also disclosed herein is a composition comprising the fertilizer granule disclosed herein and a fertilizer composition.

Also disclosed herein is a composition comprising the fertilizer core particle disclosed herein and a second nitrogen containing fertilizer composition.

Also disclosed herein is a composition comprising the fertilizer core particle disclosed herein and a fertilizer composition.

Also disclosed herein is a kit comprising a) the fertilizer granule disclosed herein; and b) a second nitrogen containing fertilizer composition.

Also disclosed herein is a kit comprising a) the fertilizer granule disclosed herein; and b) a fertilizer composition.

Also disclosed herein is a kit comprising a) the fertilizer core particle disclosed herein; and b) a second nitrogen containing fertilizer composition.

Also disclosed herein is a kit comprising a) the fertilizer core particle disclosed herein; and b) a containing fertilizer composition.

The fertilizer composition in the kit or composition with the fertilizer core particle or fertilizer granule can be any conventional fertilizer such as a fertilizer composition with a micronutrient, a primary nutrient, or a secondary nutrient, or combination thereof.

The one or more fertilizer additives can be mixed with the binder prior to extrusion. Such mixing can be done with a number of methods that are known in the art. For example, the mixing can be done by mechanically stirring the one or more fertilizer additives with the binder.

In one aspect, the one or more fertilizer additives are selected from an inhibitor, a micronutrient, a primary nutrient, or a secondary nutrient, or combination thereof. For example, the one or more fertilizer additives can comprise a micronutrient. In another example, the one or more fertilizer additives can comprise a primary nutrient. In yet another example, the one or more fertilizer additives can comprise an inhibitor. In yet another example, the one or more fertilizer additives can comprise a secondary nutrient. In yet another example, the one or more fertilizer additives can comprise a micronutrient and a secondary nutrient. In yet another example, the one or more fertilizer additives can comprise a micronutrient and a primary nutrient. In yet another example, the one or more fertilizer additives can comprise a micronutrient and an inhibitor. In yet another example, the one or more fertilizer additive comprises an inhibitor or a micronutrient and one or more additional fertilizer additives selected from an inhibitor, a micronutrient, a primary nutrient, or a secondary nutrient, or combination thereof. In yet another example, the one or more fertilizer additive comprises an inhibitor and a micronutrient and one or more additional fertilizer additives selected from an inhibitor, a micronutrient, a primary nutrient, or a secondary nutrient, or combination thereof.

In one aspect, the fertilizer core particle comprises from greater than 0 wt % to 90 wt % of the one or more fertilizer additives. For example, the fertilizer core particle can comprise from greater than 0 wt % to 70 wt % of the one or more fertilizer additives. In another example, the fertilizer core particle can comprise from greater than 0 wt % to 50 wt % of the one or more fertilizer additives. In yet another example, fertilizer core particle can comprise from greater than 0 wt % to 30 wt % of the one or more fertilizer additives. In yet another example, fertilizer core particle can comprise from greater than 0 wt % to 10 wt % of the one or more fertilizer additives. In yet another example, fertilizer core particle can comprise from greater than 0 wt % to 5 wt % of the one or more fertilizer additives. In yet another example, fertilizer core particle can comprise from 5 wt % to 70 wt % of the one or more fertilizer additives. In yet another example, fertilizer core particle can comprise from 5 wt % to 50 wt % of the one or more fertilizer additives. In yet another example, fertilizer core particle can comprise from 5 wt % to 30 wt % of the one or more fertilizer additives. In yet another example, fertilizer core particle can comprise from 10 wt % to 30 wt % of the one or more fertilizer additives. In yet another example, fertilizer core particle can comprise from 10 wt % to 50 wt % of the one or more fertilizer additives. In yet another example, fertilizer core particle can comprise from 30 wt % to 90 wt % of the one or more fertilizer additives. In yet another example, fertilizer core particle can comprise from 30 wt % to 70 wt % of the one or more fertilizer additives. In yet another example, fertilizer core particle can comprise from 30 wt % to 50 wt % of the one or more fertilizer additives.

Also disclosed herein is a fertilizer core particle comprising an inhibitor, a binder, and a pH buffering agent, wherein the inhibitor comprises N-(n-butyl) thiophosphoric triamide (NBTPT), 3,4-dimethylpyrazole phosphate (DMPP), thiourea (TU), dicyandiamide (DCD), phenyl phosphorodiamidate (PPDA), 2-Chloro-6-(trichloromethyl)-pyridine (Nitrapyrin), 5-Ethoxy-3-trichloromethyl-1, 2, 4-thiadiazol (Terrazole), 2-Amino-4-chloro-6-methyl-pyrimidine (AM), 2-Mercapto-benzothiazole (MBT), or 2-Sulfanimalamidothiazole (ST), or a combination thereof, and wherein the fertilizer core particle comprises from 10 wt % to 99 wt % of the binder.

Also disclosed herein is a fertilizer core particle comprising a urease inhibitor, a binder, and a pH buffering agent, wherein the fertilizer core particle comprises from 10 wt % to 99 wt % of the binder.

Also disclosed herein is a fertilizer core particle comprising a nitrification inhibitor, a binder, and a pH buffering agent, wherein the fertilizer core particle comprises from 10 wt % to 99 wt % of the binder.

Also disclosed herein is a fertilizer core particle comprising NBTPT, a binder comprising wax, and a pH buffering agent, wherein the fertilizer core particle comprises from 10 wt % to 99 wt % of the binder comprising wax.

Also disclosed herein is a fertilizer core particle comprising DCD, a binder comprising wax, and a pH buffering agent, wherein the fertilizer core particle comprises from 10 wt % to 99 wt % of the binder comprising wax.

Also disclosed herein is a fertilizer core particle comprising NBTPT and DCD, a binder comprising wax, and a pH buffering agent, wherein the fertilizer core particle comprises from 10 wt % to 99 wt % of the binder comprising wax.

The core can be produced via an extrusion process. The extrusion process can occur at a temperature from 0° C. to 150° C. The extrusion process can occur at a screw speed from 1 to 500 rpm.

In one aspect, the fertilizer granule comprises a fertilizer core particle disclosed herein and an outer shell comprising urea or other nitrogen containing fertilizer composition that at least partially surrounds the fertilizer core particle. In one aspect, the fertilizer granule comprises a fertilizer core particle disclosed herein and an outer shell comprising a first nitrogen containing fertilizer composition that at least partially surrounds the fertilizer core particle. In one aspect, the outer shell comprises urea. In another aspect, the outer shell substantially consists of urea. In yet another aspect, the outer shell consists of urea. In one aspect, the outer shell substantially surrounds the core. In another aspect, the outer shell fully surrounds the core. An outer shell is a shell that is "outer" in relation to the core. It is appreciated that another an outer shell can be further covered with another material (layer) and, thus, would not be the most outer layer of the fertilizer granule.

The fertilizer core particle can be fattened with urea or other nitrogen fertilizer or combination thereof to produce the fertilizer granule. Such process, producing the fertilizer granule, can be achieved via a granulation process, wherein molten urea is sprayed onto the fertilizer core particle.

In one aspect, the fertilizer granule comprises from 50 wt % to 99 wt % of the outer shell. For example, the fertilizer granule can comprises from 50 wt % to 95 wt % of the outer shell. In another example, the fertilizer granule comprises from 50 wt % to 70 wt % of the outer shell. In another example, the fertilizer granule comprises from 70 wt % to 99 wt % of the outer shell. In another example, the fertilizer granule comprises from 85 wt % to 99 wt % of the outer shell. In another example, the fertilizer granule comprises from 90 wt % to 99 wt % of the outer shell. In another example, the fertilizer granule comprises from 93 wt % to 97 wt % of the outer shell. In another example, the fertilizer granule comprises about 95 wt % of the outer shell.

In one aspect, the fertilizer core particle comprises an inhibitor and a micronutrient. In another aspect, the fertilizer core particle comprises an inhibitor. In yet another aspect, the core comprises a micronutrient. In yet another aspect, the fertilizer core particle comprises an inhibitor and not a micronutrient. In yet another aspect, the fertilizer core particle comprises a micronutrient and not an inhibitor.

In one aspect, the fertilizer core particle further comprises urea or other nitrogen fertilizer or a combination thereof. For example, the fertilizer core particle can comprise urea.

In one aspect, the fertilizer core particle further comprises a filler.

In one aspect, the fertilizer core particle has a size from 0.7 mm to 2.0 mm. For example, the fertilizer core particle can have a size from 0.9 mm to 1.5 mm. The fertilizer core particle can have a substantial spherical shape. The substantial spherical shape results from spheronization of the core once produced as cylinders from the extrusion process.

In one aspect, the fertilizer granule can have any shape. For example, the fertilizer granule can have a spherical, puck, oval, or oblong shape.

In one aspect, the fertilizer granule has a longest dimension from about 1.5 mm to about 8.0 mm. For example, the fertilizer granule can have a longest dimension from about 2.0 mm to about 4.0 mm.

In one aspect, the fertilizer core particle comprises from greater than 0 wt % to 4.0 wt % of moisture content. For example, the fertilizer core particle can comprise from greater than 0 wt % to 0.5 wt % of moisture content, or from 1 wt % to 3 wt % of moisture content.

In one aspect, the fertilizer core particle has a crush strength of at least 1 kg/granule. For example, the fertilizer core particle can have a crush strength of at least 2 kg/granule. In another example, the fertilizer core particle can have a crush strength of at least 5 kg/granule. In yet another example, the fertilizer core particle can have a crush strength of at least 9 kg/granule. In yet another example, the fertilizer core particle can have a crush strength from 1 kg/granule to 15 kg/granule, such as a crush strength from 2 kg/granule to 9 kg/granule.

In one aspect, the fertilizer core particle or the fertilizer granule does not comprise calcium cyanamide.

In one aspect, the fertilizer additive is dispersed throughout the core. In another aspect, the fertilizer additive is dispersed homogeneously throughout the core.

The fertilizer core particle and fertilizer granule disclosed herein has advantageous properties as compared to conventional fertilizer. For example, the fertilizer core particle and fertilizer granule can include a combination of components, each of which serves a different purpose, but which are administered together as a single composition and application. In contrast, many currently-available products only serves one purpose must be administered together in conjunction with other products in a separate application and according to different schedules. Accordingly, the multi-function of the disclosed fertilizer core particle and fertilizer granule provides for fewer and easier applications as compared to conventional products.

Figure 1B:
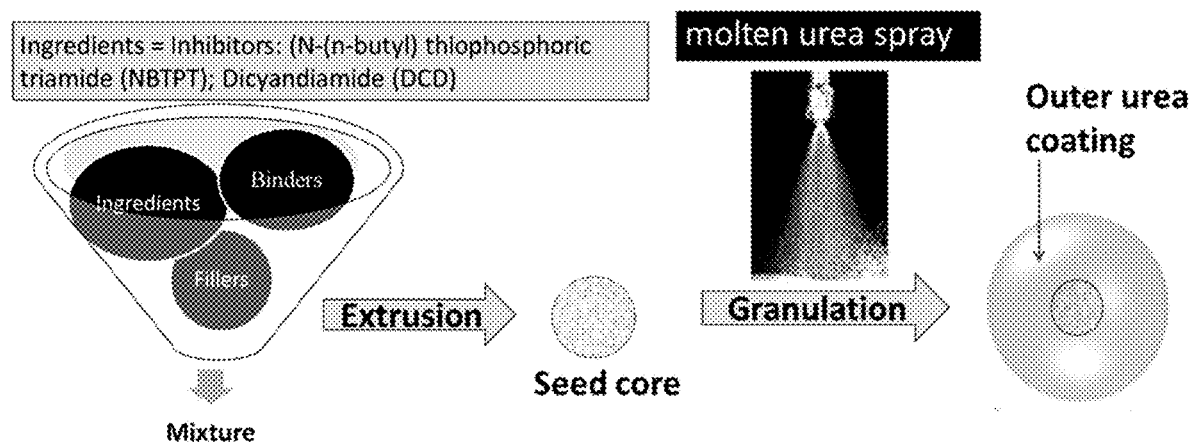
Figure 2:
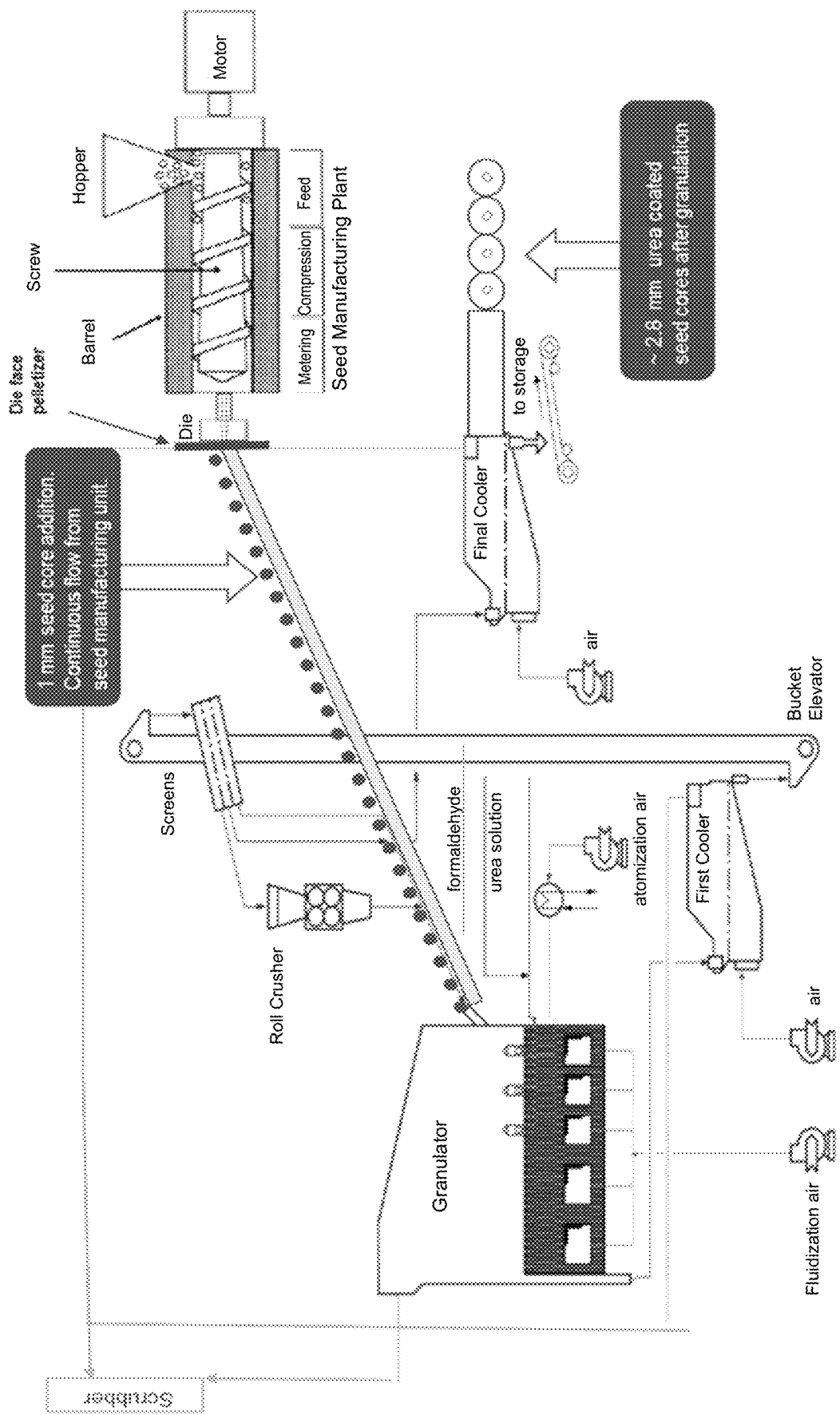
FIG. 2 shows an exemplary non-limiting system for producing a fertilizer granule.

A non-limiting general process for producing the fertilizer core particle and fertilizer granule disclosed herein is shown in FIG. 1A. A non-limiting general process for producing the fertilizer granule disclosed herein is shown in FIG. 1B. An exemplary non-limiting system for producing the fertilizer granule is shown in FIG. 2.

1. Binder Comprising a Wax

A binder comprising a wax is a material that is used to bind together components in a mixture through adhesive and cohesive forces.

In one aspect, the binder comprising a wax is an extrudable binder comprising a wax.

In one aspect, the binder comprising a wax comprises a high melt wax or a low melt wax or a combination thereof. In another aspect, the binder comprising a wax comprises a high melt wax. In yet another aspect, the binder comprising a wax comprises a low melt wax.

A wax is lipid type compound with a melting point above 45° C., to give a low viscosity liquid. The wax can be an animal wax or plant wax. The wax can also be a petroleum derived wax. For example, suitable waxes include, but are not limited to, vegetable waxes, animal waxes, ethylene bis(stearamide) wax, paraffin waxes, polyethylene based waxes, and olefin waxes. In one aspect, the wax can be a high melt wax, which has a melting point from 95° C. to 145° C. High melt waxes include, but are not limited to, qualiwax-C, Qualiwax QD, and Qualiwax QD-150. In one aspect, the wax can be a low melt wax, which has a melting point from 45° C. to 95° C. Low melt waxes include, but are not limited to, castor wax, soy wax, and palm wax.

The fertilizer core particle comprises from 10 wt % to 99 wt % of the binder comprising a wax. The binder comprising a wax is selected to so that an extrusion process can be used during the production of the fertilizer core particle. The wax in the binder provides desired properties to make the core extrudable. Any moisture present in the core material during the extrusion process is typically removed post-extrusion. However, residual amounts of moisture, typically below 4 wt %, such as, for example, below 0.5 wt %, can be present in the fertilizer core particle.

In one aspect, the fertilizer core particle comprises from 20 wt % to 99 wt % of the binder comprising a wax. In another aspect, the fertilizer core particle comprises from 30 wt % to 99 wt % of the binder comprising a wax. In yet another aspect, the fertilizer core particle comprises from 40 wt % to 99 wt % of the binder comprising a wax. In yet another aspect, the fertilizer core particle comprises from 50 wt % to 99 wt % of the binder comprising a wax. In yet another aspect, the fertilizer core particle comprises from 60 wt % to 99 wt % of the binder comprising a wax. In yet another aspect, the fertilizer core particle comprises from 70 wt % to 99 wt % of the binder comprising a wax. In yet another aspect, the fertilizer core particle comprises from 80 wt % to 99 wt % of the binder comprising a wax. In yet another aspect, the fertilizer core particle comprises from 90 wt % to 99 wt % of the binder comprising a wax. In yet another aspect, the fertilizer core particle comprises from 60 wt % to 95 wt % of the binder comprising a wax.

In one aspect, the fertilizer core particle comprises from 10 wt % to 90 wt % of the binder comprising a wax. In one aspect, the fertilizer core particle comprises from 20 wt % to 90 wt % of the binder comprising a wax. In another aspect, the fertilizer core particle comprises from 30 wt % to 90 wt % of the binder comprising a wax. In yet another aspect, the fertilizer core particle comprises from 40 wt % to 90 wt % of the binder comprising a wax. In yet another aspect, the fertilizer core particle comprises from 50 wt % to 90 wt % of the binder comprising a wax. In yet another aspect, the fertilizer core particle comprises from 60 wt % to 90 wt % of the binder comprising a wax. In yet another aspect, the fertilizer core particle comprises from 70 wt % to 90 wt % of the binder comprising a wax comprising a wax. In yet another aspect, the fertilizer core particle comprises from 80 wt % to 90 wt % of the binder comprising a wax.

In one aspect, the fertilizer core particle comprises from 10 wt % to 85 wt % of the binder comprising a wax. In one aspect, the fertilizer core particle comprises from 20 wt % to 85 wt % of the binder comprising a wax. In another aspect, the fertilizer core particle comprises from 30 wt % to 85 wt % of the binder comprising a wax. In yet another aspect, the fertilizer core particle comprises from 40 wt % to 85 wt % of the binder comprising a wax. In yet another aspect, the fertilizer core particle comprises from 50 wt % to 85 wt % of the binder comprising a wax. In yet another aspect, the fertilizer core particle comprises from 60 wt % to 85 wt % of the binder comprising a wax. In yet another aspect, the fertilizer core particle comprises from 75 wt % to 85 wt % of the binder comprising a wax. In yet another aspect, the fertilizer core particle comprises from 70 wt % to 85 wt % of the binder comprising a wax.

In one aspect, the fertilizer core particle comprises from 10 wt % to 80 wt % of the binder comprising a wax. In one aspect, the fertilizer core particle comprises from 20 wt % to 80 wt % of the binder comprising a wax. In another aspect, the fertilizer core particle comprises from 30 wt % to 80 wt % of the binder comprising a wax. In yet another aspect, the fertilizer core particle comprises from 40 wt % to 80 wt % of the binder comprising a wax. In yet another aspect, the fertilizer core particle comprises from 50 wt % to 80 wt % of the binder comprising a wax. In yet another aspect, the fertilizer core particle comprises from 60 wt % to 80 wt % of the binder comprising a wax. In yet another aspect, the fertilizer core particle comprises from 70 wt % to 80 wt % of the binder comprising a wax.

In one aspect, the fertilizer core particle comprises from 10 wt % to 75 wt % of the binder comprising a wax. In one aspect, the fertilizer core particle comprises from 20 wt % to 75 wt % of the binder comprising a wax. In another aspect, the fertilizer core particle comprises from 30 wt % to 75 wt % of the binder comprising a wax. In yet another aspect, the fertilizer core particle comprises from 40 wt % to 75 wt % of the binder comprising a wax. In yet another aspect, the fertilizer core particle comprises from 50 wt % to 75 wt % of the binder comprising a wax. In yet another aspect, the fertilizer core particle comprises from 60 wt % to 75 wt % of the binder comprising a wax.

In one aspect, the fertilizer core particle comprises from 10 wt % to 70 wt % of the binder comprising a wax. In one aspect, the fertilizer core particle comprises from 20 wt % to 70 wt % of the binder comprising a wax. In another aspect, the fertilizer core particle comprises from 30 wt % to 70 wt % of the binder comprising a wax. In yet another aspect, the fertilizer core particle comprises from 40 wt % to 70 wt % of the binder comprising a wax. In yet another aspect, the fertilizer core particle comprises from 50 wt % to 70 wt % of the binder comprising a wax. In yet another aspect, the fertilizer core particle comprises from 60 wt % to 70 wt % of the binder comprising a wax.

In one aspect, the fertilizer core particle comprises from 10 wt % to 65 wt % of the binder comprising a wax. In one aspect, the fertilizer core particle comprises from 20 wt % to 65 wt % of the binder comprising a wax. In another aspect, the fertilizer core particle comprises from 30 wt % to 65 wt % of the binder comprising a wax. In yet another aspect, the fertilizer core particle comprises from 40 wt % to 65 wt % of the binder comprising a wax. In yet another aspect, the fertilizer core particle comprises from 50 wt % to 65 wt % of the binder comprising a wax.

In one aspect, the fertilizer core particle comprises from 10 wt % to 60 wt % of the binder comprising a wax. In one aspect, the fertilizer core particle comprises from 20 wt % to 60 wt % of the binder comprising a wax. In another aspect, the fertilizer core particle comprises from 30 wt % to 60 wt % of the binder comprising a wax. In yet another aspect, the fertilizer core particle comprises from 40 wt % to 60 wt % of the binder comprising a wax. In yet another aspect, the fertilizer core particle comprises from 50 wt % to 60 wt % of the binder comprising a wax.

In one aspect, the fertilizer core particle comprises about 10 wt %, 11 wt % 12 wt %, 13 wt %, 14 wt %, 15 wt %, 16 wt %, 17, wt %, 18 wt %, 19 wt %, 20 wt %, 21 wt % 22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, 41 wt % 42 wt %, 43 wt %, 44 wt %, 45 wt %, 46 wt %, 47, wt %, 48 wt %, 49 wt %, 50 wt %, 51 wt % 52 wt %, 53 wt %, 54 wt %, 55 wt %, 56 wt %, 57, wt %, 58 wt %, 59 wt %, 60 wt %, 61 wt % 62 wt %, 63 wt %, 64 wt %, 65 wt %, 66 wt %, 67, wt %, 68 wt %, 69 wt %, 70 wt %, 71 wt % 72 wt %, 73 wt %, 74 wt %, 75 wt %, 76 wt %, 77, wt %, 78 wt %, 79 wt %, 80 wt %, 81 wt % 82 wt %, 83 wt %, 84 wt %, 85 wt %, 86 wt %, 87, wt %, 88 wt %, 89 wt %, 90 wt %, 91 wt % 92 wt %, 93 wt %, 94 wt %, 95 wt %, 96 wt %, 97, wt %, 98 wt %, or 99 wt % of the binder comprising a wax.

In one aspect the binder comprising a wax comprises a wax and a phosphate, a polyphosphate, or a biodegradable polymer, or a combination thereof. In another example, the binder comprising a wax comprises a wax and a phosphate. Suitable phosphates include, but are not limited to, diammonium phosphate, and monoammonium phosphate. In yet another example, the binder comprising a wax comprises a wax and a polyphosphate. Suitable polyphosphates include, but are not limited to, ammonium polyphosphate. In yet another example, the binder comprising a wax comprises a wax and a biodegradable polymer. Suitable biodegradable polymers include, but are not limited to, polyacrylamide, polyacrylic acid, polyacrylonitrile; biodegradable polylactic acid and other biodegradable polymeric material such as polylactic acid, poly(3-hydroxypropionic acid), polyvinyl alcohol, poly e-caprolactone, poly L-lactide, poly butylene succinate and biodegradable starch based polymers.

In another aspect, the binder comprising a wax comprises a wax and polymers of, copolymers of, or blends of ethylene, propylene, acrylamide, acrylic acid, acrylonitrile, lactic acid, 3-hydroxy propionic acid, vinyl alcohol, lactide, or butylene succinate, or a combination thereof. For example, the binder can comprise polymers of ethylene, propylene, acrylamide, acrylic acid, acrylonitrile, lactic acid, 3-hydroxy propionic acid, vinyl alcohol, lactide, or butylene succinate, or a combination thereof, such as, for example, homopolymers of ethylene, propylene, acrylamide, acrylic acid, acrylonitrile, lactic acid, 3-hydroxy propionic acid, vinyl alcohol, lactide, or butylene succinate. In another example, the binder can comprise a blend of polymers of ethylene, propylene, acrylamide, acrylic acid, acrylonitrile, lactic acid, 3-hydroxy propionic acid, vinyl alcohol, lactide, or butylene succinate, or a combination thereof, such as for example, a blend of homopolymers of ethylene, propylene, acrylamide, acrylic acid, acrylonitrile, lactic acid, 3-hydroxy propionic acid, vinyl alcohol, lactide, or butylene succinate. In another example, the binder comprising a wax comprises a wax and co-polymers of ethylene, propylene, acrylamide, acrylic acid, acrylonitrile, lactic acid, 3-hydroxy propionic acid, vinyl alcohol, lactide, or butylene succinate, or a combination thereof.

In another aspect, the binder comprising a wax comprises a wax and Plaster of Paris, flour, starch, or gluten, or combination thereof. For example, the binder comprising a wax comprises a wax and Plaster of Paris. In another example, the binder comprising a wax comprises a wax, and flour, such as, for example, bleached wheat flour. In another example, the binder comprising a wax comprises a wax and flour. Suitable flours include, but are not limited to, rice flour, wheat flour, and bleached wheat flour. In yet another example, the binder comprising a wax comprises wax and a starch. Suitable starches include, but are not limited to, dextrin modified starches. In yet another example, the binder comprising a wax comprises wax and gluten.

In one aspect, the binder comprising a wax comprises from about 15 wt % to about 80 wt % of the wax. In another aspect, the binder comprising a wax comprises from about 25 wt % to about 80 wt % of the wax. In yet another aspect, the binder comprising a wax comprises from about 35 wt % to about 80 wt % of the wax. In yet another aspect, the binder comprising a wax comprises from about 45 wt % to about 80 wt % of the wax. In yet another aspect, the binder comprising a wax comprises from about 55 wt % to about 80 wt % of the wax. In yet another aspect, the binder comprising a wax comprises from about 65 wt % to about 80 wt % of the wax. In yet another aspect, the binder comprising a wax comprises from about 15 wt % to about 70 wt % of the wax. In yet another aspect, the binder comprising a wax comprises from about 15 wt % to about 60 wt % of the wax. In yet another aspect, the binder comprising a wax comprises from about 25 wt % to about 60 wt % of the wax. In yet another aspect, the binder comprising a wax comprises from about 35 wt % to about 60 wt % of the wax.

In one aspect, the binder comprising a wax comprises from comprises from about 20 wt % to about 85 wt % of Plaster of Paris, flour, starch, starch, polymer or gluten, or a filler comprising rice husk, or combination thereof. In another aspect, the binder comprising a wax comprises from comprises from about 20 wt % to about 60 wt % of Plaster of Paris, flour, starch, starch, polymer or gluten, or a filler comprising rice husk, or combination thereof. In yet another aspect, the binder comprising a wax comprises from comprises from about 30 wt % to about 60 wt % of Plaster of Paris, flour, starch, starch, polymer or gluten, or a filler comprising rice husk, or combination thereof.

For example, the binder comprising a wax comprises from comprises from about 10 wt % to about 50 wt % of Plaster of Paris. In one aspect, the binder comprising a wax comprises from comprises from about 20 wt %, 21 wt % 22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, 41 wt % 42 wt %, 43 wt %, 44 wt %, 45 wt %, 46 wt %, 47, wt %, 48 wt %, 49 wt %, 50 wt % of Plaster of Paris.

In one aspect, the binder comprising a wax comprises from comprises from about 5 wt % to about 40 wt % of bleached wheat flour. For example, the binder comprising a wax comprises from comprises from about 20 wt % to about 45 wt % of bleached wheat flour. In one aspect, the binder comprising a wax comprises from comprises about 5 wt %, 6 wt %, 7, wt %, 8 wt %, 9 wt %, 10 wt %, 11 wt % 12 wt %, 13 wt %, 14 wt %, 15 wt %, 16 wt %, 17, wt %, 18 wt %, 19 wt %, 20 wt %, 21 wt % 22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, of bleached wheat flour.

2. Inhibitor

The fertilizer core particle can comprise an inhibitor. The inhibitor is a urease and/or nitrification inhibitor. Such inhibitors are known to one skilled in the art.

In one aspect, the fertilizer core particle can comprise one or more inhibitors. The inhibitor can be a urease inhibitor or a nitrification inhibitor, or a combination thereof. In one aspect, the fertilizer core particle can comprise a urease inhibitor and a nitrification inhibitor. In one aspect, the inhibitor can be a urease inhibitor. Suitable urease inhibitors include, but are not limited to, NBTPT and PPDA. In one aspect, urease inhibitor can comprise NBTPT or PPDA, or a combination thereof. For example, the urease inhibitor can be selected from the group consisting of NBTPT and PPDA, or a combination thereof. In another aspect, the inhibitor can be a nitrification inhibitor. Suitable nitrification inhibitors include, but are not limited to, DMPP, DCD, TU, Nitrapyrin, Terrazole, AM, MBT and ST. In one aspect, the fertilizer core particle can comprise a urease inhibitor and a nitrification inhibitor. In one aspect, nitrification inhibitor can comprise DMPP, DCD, TU, Nitrapyrin, Terrazole, AM, MBT or ST, or a combination thereof. For example, the nitrification inhibitor can be selected form the group consisting of DMPP, DCD, TU, Nitrapyrin, Terrazole, AM, MBT and ST, or a combination thereof. In one aspect, the inhibitor can comprise NBTPT, DMPP, TU, DCD, PPDA, Nitrapyrin, Terrazole, AM, MBT, or ST or a combination thereof. For example, the inhibitor can comprise NBTPT. In another example, the inhibitor can comprise DMPP. In yet another example, the inhibitor can comprise TU. In yet another example, the inhibitor can comprise DCD. In yet another example, the inhibitor can comprise PPDA. In yet another example, the inhibitor can comprise Nitrapyrin. In yet another example, the inhibitor can comprise Terrazole. In yet another example, the inhibitor can comprise AM. In yet another example, the inhibitor can comprise MBT. In yet another example, the inhibitor can comprise ST. In yet another example, the inhibitor can comprise any combination of NBTPT, DMPP, TU, DCD, PPDA, Nitrapyrin, Terrazole, AM, MBT, and ST. For example, the inhibitor can comprise NBTPT and DCD. In yet another example, the inhibitor can comprise PPDA and DCD. In yet another example, the inhibitor can comprise NBTPT and DMPP. In some of the instances where the fertilizer core particle comprises at least one of a urease inhibitor and a nitrification inhibitors, the urease inhibitors are selected from the group consisting of N-(n-butyl) thiophosphoric triamide (NBTPT), phenyl phosphorodiamidate (PPDA), and combinations thereof, and the nitrification inhibitor is selected from the group consisting of 3,4-dimethylpyrazole phosphate (DMPP), thio-urea (TU), dicyandiamide (DCD), 2-Chloro-6-(trichloromethyl)-pyridine (Nitrapyrin), 5-Ethoxy-3-trichloromethyl-1, 2, 4-thiadiazol (Terrazole), 2-Amino-4-chloro-6-methyl-pyrimidine (AM), 2-Mercapto-benzothiazole (MBT), 2-Sulfanimalamidothiazole (ST), and combinations thereof.

In one aspect, the fertilizer core particle comprises from greater than 0 wt % to 80 wt % of the inhibitor. In another aspect, the fertilizer core particle comprises from 10 wt % to 80 wt % of the inhibitor. In another aspect, the fertilizer core particle comprises from 15 wt % to 80 wt % of the inhibitor. In yet another aspect, the fertilizer core particle comprises from 10 wt % to 50 wt % of the inhibitor. In yet another aspect, the fertilizer core particle comprises from 15 wt % to 50 wt % of the inhibitor. In yet another aspect, the fertilizer core particle comprises from 15 wt % to 45 wt % of the inhibitor. In one aspect, the fertilizer core particle comprises from greater than 0 wt % to 54 wt % of the inhibitor. In another aspect, the fertilizer core particle comprises from greater than 0 wt % to 45 wt % of the inhibitor. In yet another aspect, the fertilizer core particle comprises from greater than 0 wt % to 35 wt % of the inhibitor. In yet another aspect, the fertilizer core particle comprises from greater than 0 wt % to 30 wt % of the inhibitor. In yet another aspect, the fertilizer core particle comprises from greater than 0 wt % to 25 wt % of the inhibitor. In yet another aspect, the fertilizer core particle comprises from greater than 0 wt % to 20 wt % of the inhibitor. In yet another aspect, the fertilizer core particle comprises from 10 wt % to 35 wt % of the inhibitor. In yet another aspect, the fertilizer core particle comprises from 10 wt % to 30 wt % of the inhibitor.

In one aspect, the fertilizer core particle comprises from greater than 0 wt % to 20 wt % of a urease inhibitor. In another aspect, the fertilizer core particle comprises from greater than 0 wt % to 15 wt % of a urease inhibitor. In another aspect, the fertilizer core particle comprises from greater than 0 wt % to 10 wt % of a urease inhibitor. In yet another aspect, the fertilizer core particle comprises from greater than 0 wt % to 5 wt % of a urease inhibitor. In yet another aspect, the fertilizer core particle comprises from greater than 0 wt % to 3 wt % of a urease inhibitor. In yet another aspect, the fertilizer core particle comprises from greater than 0 wt % to 2 wt % of a urease inhibitor. In yet another aspect, the fertilizer core particle comprises from 1 wt % to 2 wt % of a urease inhibitor. In one aspect, the fertilizer core particle comprises about 0.5 wt %, 1 wt %, 2 wt %, 3 wt %, 4 wt %, 5 wt %, 6 wt %, 7 wt %, 8 wt %, 9 wt %, 10 wt %, 11 wt % 12 wt %, 13 wt %, 14 wt %, 15 wt %, 16 wt %, 17, wt %, 18 wt %, 19 wt %, 20 wt % of a urease inhibitor.

In one aspect, the fertilizer core particle comprises from greater than 0 wt % to 20 wt % of NBTPT. In another aspect, the fertilizer core particle comprises from greater than 0 wt % to 15 wt % of NBTPT. In another aspect, the fertilizer core particle comprises from greater than 0 wt % to 10 wt % of NBTPT. In yet another aspect, the fertilizer core particle comprises from greater than 0 wt % to 5 wt % of NBTPT. In yet another aspect, the fertilizer core particle comprises from greater than 0 wt % to 3 wt % of NBTPT. In yet another aspect, the fertilizer core particle comprises from greater than 0 wt % to 2 wt % of NBTPT. In yet another aspect, the fertilizer core particle comprises from 1 wt % to 2 wt % of NBTPT. In one aspect, the fertilizer core particle comprises about 0.5 wt %, 1 wt %, 2 wt %, 3 wt %, 4 wt %, 5 wt %, 6 wt %, 7 wt %, 8 wt %, 9 wt %, 10 wt %, 11 wt % 12 wt %, 13 wt %, 14 wt %, 15 wt %, 16 wt %, 17, wt %, 18 wt %, 19 wt %, 20 wt % of NBTPT.

In one aspect, the fertilizer core particle comprises from 10 wt % to 50 wt % of a nitrification inhibitor. In another aspect, the fertilizer core particle comprises from 15 wt % to 45 wt % of a nitrification inhibitor. In another aspect, the fertilizer core particle comprises from 18 wt % to 42 wt % of a nitrification inhibitor. In yet another aspect, the fertilizer core particle comprises from 30 wt % to 50 wt % of a nitrification inhibitor. In yet another aspect, the fertilizer core particle comprises from 35 wt % to 45 wt % of a nitrification inhibitor. In yet another aspect, the fertilizer core particle comprises from 10 wt % to 30 wt % of a nitrification inhibitor. In yet another aspect, the fertilizer core particle comprises from 15 wt % to 25 wt % of a nitrification inhibitor. In one aspect, the fertilizer core particle comprises about 10 wt %, 11 wt % 12 wt %, 13 wt %, 14 wt %, 15 wt %, 16 wt %, 17, wt %, 18 wt %, 19 wt %, 20 wt %, 21 wt % 22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, 41 wt % 42 wt %, 43 wt %, 44 wt %, 45 wt %, 46 wt %, 47, wt %, 48 wt %, 49 wt %, 50 wt % of a nitrification inhibitor.

In one aspect, the fertilizer core particle comprises from 10 wt % to 50 wt % of DCD. In another aspect, the fertilizer core particle comprises from 15 wt % to 45 wt % of DCD. In another aspect, the fertilizer core particle comprises from 18 wt % to 42 wt % of DCD. In yet another aspect, the fertilizer core particle comprises from 30 wt % to 50 wt % of DCD. In yet another aspect, the fertilizer core particle comprises from 35 wt % to 45 wt % of DCD. In yet another aspect, the fertilizer core particle comprises from 10 wt % to 30 wt % of DCD. In yet another aspect, the fertilizer core particle comprises from 15 wt % to 25 wt % of DCD. In one aspect, the fertilizer core particle comprises about 10 wt %, 11 wt % 12 wt %, 13 wt %, 14 wt %, 15 wt %, 16 wt %, 17, wt %, 18 wt %, 19 wt %, 20 wt %, 21 wt % 22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, 41 wt % 42 wt %, 43 wt %, 44 wt %, 45 wt %, 46 wt %, 47, wt %, 48 wt %, 49 wt %, 50 wt % of DCD.

In one aspect, the fertilizer core particle comprises from greater than 0 wt % to 20 wt % of a urease inhibitor and from 10 wt % to 50 wt % of a nitrification inhibitor. In another aspect, the fertilizer core particle comprises from greater than 0 wt % to 5 wt % of a urease inhibitor and from 10 wt % to 30 wt % of a nitrification inhibitor. In another aspect, the fertilizer core particle comprises from greater than 0 wt % to 5 wt % of a urease inhibitor and from 30 wt % to 50 wt % of a nitrification inhibitor. In yet another aspect, the fertilizer core particle comprises from greater than 0 wt % to 2 wt % of a urease inhibitor and from 35 wt % to 45 wt % of a nitrification inhibitor. In yet another aspect, the fertilizer core particle comprises from greater than 0 wt % to 2 wt % of a urease inhibitor and from 15 wt % to 25 wt % of a nitrification inhibitor.

In one aspect, the fertilizer core particle comprises from greater than 0 wt % to 20 wt % of NBTPT and from 10 wt % to 50 wt % of DCD. In another aspect, the fertilizer core particle comprises from greater than 0 wt % to 5 wt % of NBTPT and from 10 wt % to 30 wt % of DCD. In another aspect, the fertilizer core particle comprises from greater than 0 wt % to 5 wt % of NBTPT and from 30 wt % to 50 wt % of DCD. In yet another aspect, the fertilizer core particle comprises from greater than 0 wt % to 2 wt % of NBTPT and from 35 wt % to 45 wt % of DCD. In yet another aspect, the fertilizer core particle comprises from greater than 0 wt % to 2 wt % of NBTPT and from 15 wt % to 25 wt % of DCD.

In one aspect, the fertilizer core particle comprises from 20 wt % to 90 wt % of the binder and from 80 wt % to 10 wt % of the inhibitor. In another aspect, the fertilizer core particle comprises from 50 wt % to 90 wt % of the binder and from 50 wt % to 10 wt % of the inhibitor. In yet another aspect, the fertilizer core particle comprises from 30 wt % to 85% of the binder and from 70 wt % to 15 wt % of the inhibitor.

In one aspect, the fertilizer core particle comprises from 30 wt % to 50 wt % of Plaster of Paris, from 20 wt % to 40 wt % of flour comprising bleached wheat flour, from 10 wt % to 50 wt % of a nitrification inhibitor, and from more than 0 wt % to 5 wt % of a urease inhibitor. In yet another aspect, the fertilizer core particle comprises from 20 wt % to 40 wt % of Plaster of Paris, from 10 wt % to 30 wt % of flour comprising bleached wheat flour, from 30 wt % to 50 wt % of a urease inhibitor, and from more than 0 wt % wt to 5 wt % of a nitrification inhibitor.

In one aspect, the fertilizer core particle comprises from 30 wt % to 50 wt % of Plaster of Paris, from 20 wt % to 40 wt % of flour comprising bleached wheat flour, from 10 wt % to 50 wt % of DCD, from more than 0 wt % to 5 wt % of NBTPT, and one or more pH buffering agents. In yet another aspect, the fertilizer core particle comprises from 20 wt % to 40 wt % of Plaster of Paris, from 10 wt % to 30 wt % of flour comprising bleached wheat flour, one or more pH buffering agents, from 30 wt % to 50 wt % of DCD, and from more than 0 wt % wt to 5 wt % of NBTPT.

In one aspect, the fertilizer core particle comprises from 30 wt % to 50 wt % of Plaster of Paris, from 20 wt % to 40 wt % of flour comprising bleached wheat flour, from 10 wt % to 50 wt % of DCD, and from more than 0 wt % to 5 wt % of NBTPT, and one or more pH buffering agents, and wherein a shell substantially comprising urea surrounds or partially surrounds the fertilizer core particle. In yet another aspect, the fertilizer core particle comprises from 20 wt % to 40 wt % of Plaster of Paris, from 10 wt % to 30 wt % of flour comprising bleached wheat flour, from 30 wt % to 50 wt % of DCD, and from more than 0 wt % wt to 5 wt % of NBTPT, and one or more pH buffering agents, and wherein a shell substantially comprising urea surrounds or partially surrounds the fertilizer core particle.

3. pH Buffering Agent

The fertilizer core particle comprises one or more pH buffering agents. pH buffering agents are known to one skilled in the art.

In one aspect, the pH buffering agent is a solid at room temperature. In another aspect, the pH buffering agent can be a liquid at room temperature.

In one aspect, the fertilizer core particle comprises from about 5 wt % to about 60 wt % of the one or more pH buffering agents. In another aspect, the fertilizer core particle comprises from about 20 wt % to about 60 wt % of the one or more pH buffering agents. In yet another aspect, the fertilizer core particle comprises from about 40 wt % to about 60 wt % of the one or more pH buffering agents. In yet another aspect, the fertilizer core particle comprises from about 5 wt % to about 30 wt % of the one or more pH buffering agents.

In one aspect, the fertilizer core particle comprises about 5 wt %, 6 wt %, 7, wt %, 8 wt %, 9 wt %, 10 wt %, 11 wt % 12 wt %, 13 wt %, 14 wt %, 15 wt %, 16 wt %, 17, wt %, 18 wt %, 19 wt %, 20 wt %, 21 wt % 22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, 41 wt % 42 wt %, 43 wt %, 44 wt %, 45 wt %, 46 wt %, 47, wt %, 48 wt %, 49 wt %, 50 wt % 51 wt % 52 wt %, 53 wt %, 54 wt %, 55 wt %, 56 wt %, 57, wt %, 58 wt %, 59 wt %, 60 wt %, of the one or more pH buffering agents.

In one aspect, the one or more pH buffering agents comprise $CaCO_3$, $MgO$, $KH_2PO_4$, or $NaHCO_3$, or a combination thereof. In another aspect, the one or more pH buffering agents comprise $CaCO_3$. In yet another aspect, the one or more pH buffering agents substantially consists of $CaCO_3$.

Other non-limiting pH buffering agents include, but are not limited to, chalk powder, aluminum, magnesium hydroxide, aluminum hydroxide/magnesium hydroxide co-precipitate, aluminum hydroxide/sodium bicarbonate co-precipitate, calcium acetate, calcium bicarbonate, calcium borate, calcium carbonate, calcium bicarbonate, calcium citrate, calcium gluconate, calcium hydroxide, dibasic sodium phosphate, dipotassium hydrogen phosphate, dipotassium phosphate, disodium hydrogen phosphate, magnesium acetate, magnesium borate, magnesium bicarbonate, magnesium carbonate, magnesium hydroxide, magnesium lactate, magnesium oxide, magnesium phosphate, magnesium silicate, magnesium succinate, magnesium tartrate, potassium acetate, potassium carbonate, potassium bicarbonate, potassium borate, potassium citrate, potassium metaphosphate, potassium phthalate, potassium phosphate, potassium polyphosphate, potassium pyrophosphate, potassium succinate, potassium tartrate, sodium acetate, sodium bicarbonate, sodium borate, sodium carbonate, sodium citrate, sodium gluconate, sodium hydrogen phosphate, sodium hydroxide, sodium lactate, sodium phthalate, sodium phosphate, sodium polyphosphate, sodium pyrophosphate, sodium tartrate, sodium tripolyphosphate, synthetic hydrotalcite, tetrapotassium pyrophosphate, tetrasodium pyrophosphate, tripotassium phosphate, trisodium phosphate, and trometamol, or a combination thereof.

Other non-limiting pH buffering agents can be liquid form. Non-limiting pH buffering agents include, but are not limited to, 3-{[tris(hydroxymethyl)methyl]amino}propanesulfonic acid (TAPS), tris(hydroxymethyl)methylamine (Tris), N-tris(hydroxymethyl)methylglycine (Tricine), 3-[N-Tris(hydroxymethyl)methylamino]-2-hydroxypropanesulfonic acid (TAPSO), 4-2-hydroxyethyl-1-piperazineethanesulfonic acid (HEPES), 2-{[tris(hydroxymethyl)methyl]amino}ethanesulfonic acid (TES), 3-(N-morpholino)propanesulfonic acid (MOPS), piperazine-N, N'-bis(2-ethanesulfonic acid (PIPES), dimethylarsinic acid (Cacodylate), saline sodium citrate (SSC), 2-(N-morpholino)ethanesulfonic acid (MES), 2(R)-2-(methylamino) succinic acid (Succinic acid), and phosphate and dibasic monohydrogen phosphat, or combinations thereof.

In one aspect, the fertilizer core particle comprises from 20 wt % to 50 wt % of a low melt wax or high melt wax or combination thereof, from 20 wt % to 50 wt % of a binder selected from bleached wheat flour, rice husk, or starch, or a combination thereof, from 10 wt % to 30 wt % of DCD, and from more than 0 wt % to 5 wt % of NBTPT, and from about 15 wt % to about 50 wt % of the pH buffering agent.

In one aspect, the core particle comprises from 20 wt % to 50 wt % of a low melt wax or high melt wax or combination thereof, from 20 wt % to 50 wt % of a binder selected from bleached wheat flour, rice husk, or starch, or a combination thereof, from 10 wt % to 30 wt % of DCD, and from more than 0 wt % to 5 wt % of NBTPT, and from about 15 wt % to about 50 wt % of the pH buffering agent, and wherein a shell substantially comprising urea surrounds or partially surrounds the fertilizer core particle.

4. Micronutrient

The fertilizer core particle can comprise a micronutrient. A micronutrient is a botanically acceptable form of an inorganic or organometallic compound comprising boron (B), copper (Cu), iron (Fe), chloride (CO, manganese (Mn), molybdenum (Mo), Nickel (Ni), or zinc (Zn), or a combination thereof. A micronutrient provide amounts of B, Cu, Fe, Cl, Mn, Mo, Ni, or Zn, or a combination thereof to promote the growth and development of plants, such as crops. For example, the fertilizer core particle can comprise B. In another example, the fertilizer core particle can comprise Cu. In yet another example, the fertilizer core particle can comprise Fe. In yet another example, the fertilizer core particle can comprise Cl. In yet another example, the fertilizer core particle can comprise Mn. In yet another example, the fertilizer core particle can comprise Mo. In yet another example, the fertilizer core particle can comprise Zn. In yet another example, the fertilizer core particle can comprise any combination of B, Cu, Fe, Cl, Mn, Mo, Ni, or Zn, or a combination thereof. In yet another example, the fertilizer core particle can comprise any combination of B, Cu, Fe, Cl, Mn, Mo, or Zn, or a combination thereof. For example the fertilizer core particle can comprise of B and Zn.

In one aspect, the micronutrient is an inorganic compound comprising B, Cu, Fe, Cl, Mn, Mo, Ni, or Zn, or a combination thereof. In one aspect, the micronutrient is an inorganic compound comprising B, Cu, Fe, Cl, Mn, Mo, or Zn, or a combination thereof. Suitable inorganic compounds include, but are not limited to, sulfates oxides and salts. Specific examples include Borax, $CuSO_4$, $FeSO_4$, and $ZnSO_4$.

In another aspect, the micronutrient is an organic compound comprising B, Cu, Fe, Cl, Mn, Mo, Ni, or Zn, or a combination thereof. Suitable organic compounds include, but are not limited to, to Fe EDTA, Fe EDDHA, Ca EDTA, Zn EDTA, and Mn EDTA where EDTA is ethylenediaminetetraacetate and EDDHA is ethylenediamine-N,N'-bis(2-hydroxyphenylacetate).

The micronutrient, in some cases, is boron. In these instances, boron can be included in the fertilizer core particle, shell or both fertilizer core particle and the shell. In some particular aspects, the boron is included in shell, with urea and other ingredients. It can also be included in a separate layer, over or under the urea shell. In some other aspects, the boron is included in the fertilizer core particle. It can be included as in any form known in the skill of art, for example, as separate granules, or as a mixture with the other ingredients. For the ease of processing, it is convenient to include the micronutrient (e.g., boron) as a mixture with other ingredients. However, practical problems may arise due to adverse interactions with the other ingredients. In these cases, the boron can be included as separate granules.

As the elemental boron cannot be used as a micronutrient, any of forms known in the skill or art can be used. Generally, boron is used as the boric acid or borates (borax) or derivatives thereof. In some particular aspects, the fertilizer granule includes borates in the fertilizer core particle. As discussed above, borates can be included in the shell as well. The exemplary borate compounds include anhydrous sodium tetraborate ($Na_2B_4O_7$), sodium tetraborate pentahydrate ($Na_2B_4O_7 \cdot 5H_2O$), sodium tetraborate decahydrate ($Na_2B_4O_7 \cdot 10H_2O$), potassium metaborates, potassium tetraborates, potassium peroxyborates, calcium metaborates, ammonium pentaborates, ammonium tetraborates or derivatives thereof.

In one aspect, the fertilizer core particle comprises from greater than 0 wt % to 50 wt % of the micronutrient on an atom basis. In another aspect, the fertilizer core particle comprises from greater than 0 wt % to 40 wt % of the micronutrient on an atom basis. In yet another aspect, the fertilizer core particle comprises from greater than 0 wt % to 30 wt % of the micronutrient on an atom basis. In yet another aspect, the fertilizer core particle comprises from greater than 0 wt % to 20 wt % of the micronutrient on an atom basis. In yet another aspect, the fertilizer core particle comprises from greater than 0 wt % to 10 wt % of the micronutrient on an atom basis. In yet another aspect, the fertilizer core particle comprises from greater than 10 wt % to 50 wt % of the micronutrient on an atom basis. In yet another aspect, the fertilizer core particle comprises from 20 wt % to 50 wt % of the micronutrient on an atom basis. In yet another aspect, the fertilizer core particle comprises from 30 wt % to 50 wt % of the micronutrient on an atom basis. The term "on an atom basis" refers to the weight of the micronutrient as determined based on an atom to atom calculation. For example, for a fertilizer core particle weighing 100 g, 10% on an atom basis of Fe or 10 g Fe. Thus, Fe can be incorporated into the fertilizer core particle as $FeSO_4$, thus, (10 g×152/56)=27 g of $FeSO_4$ has to be added to get 10 g (or 10%) of Fe in the fertilizer core particle.

5. Primary Nutrient

A primary nutrient is a material that can deliver nitrogen (N), phosphorus (P), and/or potassium (K) to a plant. For example, the primary nutrient can be a material that can deliver nitrogen to a plant. In another example, the primary nutrient can be a material that can deliver phosphorus to a plant. In another example, the primary nutrient can be a material that can deliver potassium to a plant.

In one aspect, the primary nutrient is a material that comprises urea, ammonium nitrate, ammonium sulfate, diammonium phosphate, monoammonium phosphate, or urea-formaldehyde, or a combination thereof. For example, the primary nutrient can be a material that comprises urea. In another example, the primary nutrient can be a material that comprises ammonium nitrate. In yet another example, the primary nutrient can be a material that comprises ammonium nitrate. In yet another example, the primary nutrient can be a material that comprises ammonium sulfate. In yet another example, the primary nutrient can be a material that comprises diammonium phosphate. In yet another example, the primary nutrient can be a material that comprises monoammonium phosphate. In yet another example, the primary nutrient can be a material that comprises urea-formaldehyde.

The primary nutrient can be mixed with the binder, such as the extrudable binder, prior extrusion.

In one aspect, the fertilizer core particle comprises from greater than 0 wt % to 80 wt % of the primary nutrient. In another aspect, the fertilizer core particle comprises from 10 wt % to 80 wt % of the primary nutrient. In another aspect, the fertilizer core particle comprises from 15 wt % to 80 wt % of the primary nutrient. In yet another aspect, the fertilizer core particle comprises from 10 wt % to 50 wt % of the primary nutrient. In yet another aspect, the fertilizer core particle comprises from 15 wt % to 50 wt % of the primary nutrient. In yet another aspect, the fertilizer core particle comprises from 15 wt % to 45 wt % of the primary nutrient. In one aspect, the fertilizer core particle comprises from greater than 0 wt % to 54 wt % of the primary nutrient. In another aspect, the fertilizer core particle comprises from greater than 0 wt % to 45 wt % of the primary nutrient. In yet another aspect, the fertilizer core particle comprises from greater than 0 wt % to 35 wt % of the primary nutrient. In yet another aspect, the fertilizer core particle comprises from greater than 0 wt % to 30 wt % of the primary nutrient. In yet another aspect, the fertilizer core particle comprises from greater than 0 wt % to 25 wt % of the primary nutrient. In yet another aspect, the fertilizer core particle comprises from greater than 0 wt % to 20 wt % of the primary nutrient. In yet another aspect, the fertilizer core particle comprises from 10 wt % to 35 wt % of the primary nutrient. In yet another aspect, the fertilizer core particle comprises from 10 wt % to 30 wt % of the primary nutrient.

In one aspect, the fertilizer core particle comprises from 20 wt % to 90 wt % of the binder and from 80 wt % to 10 wt % of the primary nutrient. In another aspect, the fertilizer core particle comprises from 50 wt % to 90 wt % of the binder and from 5 wt 0% to 10 wt % of the primary nutrient. In yet another aspect, the fertilizer core particle comprises from 30 wt % to 85 wt % of the binder and from 70% wt % to 15 wt % of the primary nutrient.

Fertilizers with urea-formaldehyde from various sources are described in U.S. Pat. Nos. 8,419,819; 6,936,681; 6,900,162; 6,936,573; 7,213,367; and 6,048,378, which are all hereby incorporated by reference for their disclosure of fertilizers with urea-formaldehyde.

In one aspect, the shell can comprise a primary nutrient.

6. Secondary Nutrient

A secondary nutrient is a material that can deliver calcium (Ca), magnesium (Mg), and/or sulfur (S) to a plant. For example, the secondary nutrient can be a material that can deliver calcium to a plant. In another example, the secondary nutrient can be a material that can deliver magnesium to a plant. In another example, the secondary nutrient can be a material that can deliver sulfur to a plant.

In one aspect, the secondary nutrient can comprise Ca or Mg or a combination thereof.

In one aspect, the sulfur can be elemental sulfur.

Fertilizers with urea-formaldehyde from various sources are described in U.S. Pat. No. 6,749,659 and Published U.S. Application 2004/0163434, which are both hereby incorporated by reference for their disclosure of fertilizers with sulfur.

In one aspect, the secondary nutrient comprises lime, gypsum or superphosphate, or a combination thereof. In another aspect, the secondary nutrient comprises calcium ammonium nitrate or calcium nitrate, or a combination thereof. In yet another aspect, the secondary nutrient comprises eggshells, bone meal, or limestone, or a combination thereof.

The secondary nutrient can be mixed with the binder, such as the extrudable binder, prior extrusion.

In one aspect, the fertilizer core particle comprises from greater than 0 wt % to 80 wt % of the secondary nutrient. In another aspect, the fertilizer core particle comprises from 10 wt % to 80 wt % of the secondary nutrient. In another aspect, the fertilizer core particle comprises from 15 wt % to 80 wt % of the secondary nutrient. In yet another aspect, the fertilizer core particle comprises from 10 wt % to 50 wt % of the secondary nutrient. In yet another aspect, the fertilizer core particle comprises from 15 wt % to 50 wt % of the secondary nutrient. In yet another aspect, the fertilizer core particle comprises from 15 wt % to 45 wt % of the secondary nutrient. In one aspect, the fertilizer core particle comprises from greater than 0 wt % to 54 wt % of the secondary nutrient. In another aspect, the fertilizer core particle comprises from greater than 0 wt % to 45 wt % of the secondary nutrient. In yet another aspect, the fertilizer core particle comprises from greater than 0 wt % to 35 wt % of the secondary nutrient. In yet another aspect, the fertilizer core particle comprises from greater than 0 wt % to 30 wt % of the secondary nutrient. In yet another aspect, the fertilizer core particle comprises from greater than 0 wt % to 25 wt % of the secondary nutrient. In yet another aspect, the fertilizer core particle comprises from greater than 0 wt % to 20 wt % of the secondary nutrient. In yet another aspect, the fertilizer core particle comprises from 10 wt % to 35 wt % of the secondary nutrient. In yet another aspect, the fertilizer core particle comprises from 10 wt % to 30 wt % of the secondary nutrient.

In one aspect, the fertilizer core particle comprises from 20 wt % to 90 wt % of the binder and from 80 wt % to 10 wt % of the secondary nutrient. In another aspect, the fertilizer core particle comprises from 50 wt % to 90 wt % of the binder and from 50 wt % to 10 wt % of the secondary nutrient. In yet another aspect, the fertilizer core particle comprises from 30 wt % to 85 wt % of the binder and from 70 wt % to 15 wt % of the secondary nutrient.

In one aspect, the shell can comprise a secondary nutrient.

7. Filler

In some aspects, the fertilizer core particle can comprise a filler. A filler is a material that can facilitate the release of inhibitors or micronutrients from the fertilizer core particle. Accordingly, a filler is added to a matrix material with improve the properties of the fertilizer core particle. A filler in combination with a binder can be selected to enhance physical and release properties of the fertilizer core particle. For example, the good surface texture and good crush strength of the fertilizer core particle can be achieved by using bleached wheat flour, as a binder, and colloidal silica, as a filler.

In one aspect, the filler comprises rice husk, silica, colloidal silica, dried distillers grains with solubles (DDGS), kaolin, bentonite, or other biomaterial, or a combination thereof. For example, the fertilizer core particle can comprise silica. In another example, the fertilizer core particle can comprise colloidal silica. In yet another example, the fertilizer core particle can comprise dried distillers grains with solubles (DDGS). In yet another example, the fertilizer core particle can comprise kaolin. In yet another example, the fertilizer core particle can comprise bentonite. In yet another example, the fertilizer core particle can comprise rice husk. In yet another example, the fertilizer core particle can comprise other biomaterials, such as DDGS. In yet another example, the fertilizer core particle can comprise any combination of silica, colloidal silica, dried distillers grains with solubles (DDGS), kaolin, bentonite, and other biomaterial.

In one aspect, the fertilizer core particle comprises from greater than 0 wt % to 60 wt % of the filler. In another aspect, the fertilizer core particle comprises from greater than 0 wt % to 50 wt % of the filler. In yet another aspect, the fertilizer core particle comprises from greater than 0 wt % to 40 wt % of the filler. In yet another aspect, the fertilizer core particle comprises from greater than 0 wt % to 30 wt % of the filler. In yet another aspect, the fertilizer core particle comprises from greater than 0 wt % to 25 wt % of the filler. In yet another aspect, the fertilizer core particle comprises from greater than 0 wt % to 20 wt % of the filler. In yet another aspect, the fertilizer core particle comprises from 5 wt % to 40 wt % of the filler. In yet another aspect, the fertilizer core particle comprises from 10 wt % to 30 wt % of the filler.

For example, fertilizer core particle comprises from about 10 wt % to about 60 wt % of rice husk. In one aspect, fertilizer core particle comprises from about 20 wt %, 21 wt % 22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, 41 wt % 42 wt %, 43 wt %, 44 wt %, 45 wt %, 46 wt %, 47, wt %, 48 wt %, 49 wt %, 50 wt % of rice husk.

8. Shell

As used herein "shell" and "outer shell" are used interchangeably herein.

In one aspect, the fertilizer granule comprises a shell comprising urea or other nitrogen fertilizer or a combination thereof. For example, the fertilizer granule can comprise urea. In another example, the fertilizer granule can comprise other nitrogen fertilizer. In yet another example, the fertilizer granule can comprise urea and other nitrogen fertilizer. Suitable other nitrogen fertilizers include, but are not limited to, ammonium nitrate, ammonium sulfate, DAP, MAP, urea-formaldehyde, ammonium chloride, and potassium nitrate. Suitable first nitrogen fertilizers include, but are not limited to, urea, ammonium nitrate, ammonium sulfate, DAP, MAP, urea-formaldehyde, ammonium chloride, and potassium nitrate.

The shell can be fattened onto the fertilizer core particle by spraying molten urea onto the fertilizer core particle in a granulation process.

In one aspect, the shell comprises from greater than 0 wt % to 100 wt % of the urea or first nitrogen fertilizer composition or a combination thereof. In another aspect, the shell comprises from greater than 0 wt % to 99 wt % of the urea or first nitrogen fertilizer composition or a combination thereof. In yet another aspect, the shell comprises from greater than 0 wt % to 90 wt % of the urea or first nitrogen fertilizer composition or a combination thereof. In yet another aspect, the shell comprises from greater than 0 wt % to 80 wt % of the urea or first nitrogen fertilizer composition or a combination thereof. In yet another aspect, the shell comprises from greater than 0 wt % to 60 wt % of the urea or first nitrogen fertilizer composition or a combination thereof. In yet another aspect, the shell comprises from greater than 60 wt % to 99 wt % of the urea or first nitrogen fertilizer composition or a combination thereof. In yet another aspect, the shell comprises from 80 wt % to 99 wt % of the urea or first nitrogen fertilizer composition or a combination thereof.

In one aspect, a shell comprising a first nitrogen containing fertilizer composition at least partially surrounds the fertilizer core particle. In another aspect, a shell comprising a first nitrogen containing fertilizer composition substantially surrounds the fertilizer core particle. In yet another aspect, a shell comprising a first nitrogen containing fertilizer composition fully surrounds the fertilizer core particle.

In one aspect, a shell comprising urea at least partially surrounds the fertilizer core particle. In another aspect, a shell comprising urea substantially surrounds the fertilizer core particle. In yet another aspect, a shell comprising urea fully surrounds the fertilizer core particle.

D. Compositions

Also disclosed herein is a composition comprising the fertilizer granule disclosed herein and a second nitrogen containing fertilizer composition.

Also disclosed herein is a composition comprising the fertilizer core particle disclosed herein and a second nitrogen containing fertilizer composition.

Also disclosed herein is a composition comprising the fertilizer granule disclosed herein and a fertilizer composition.

Also disclosed herein is a composition comprising the fertilizer core particle disclosed herein and a fertilizer composition.

In one aspect, the fertilizer composition comprises micronutrient, a primary nutrient, a secondary nutrient, an insecticide, an herbicide, or a fungicide, or a combination thereof.

The fertilizer granule or fertilizer core particle can be mixed with the second nitrogen containing fertilizer composition to form a mixture, such as a homogeneous mixture, of the two. In another example, the fertilizer granule or fertilizer core particle can be together with but not mixed with the second nitrogen containing fertilizer composition to form a heterogeneous mixture of the two.

In one aspect, the second nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof. In another aspect, the second nitrogen containing fertilizer composition comprises urea. Thus, for example, the composition can comprise the fertilizer core particle disclosed herein and urea. In another example, the composition can comprise the fertilizer granule disclosed herein and urea.

The second nitrogen containing fertilizer composition can be in any suitable form, such as, for example, granules or prills. For example, the urea can be in any suitable form, such as, for example, urea granules or urea prills.

In one aspect, the composition can comprise from above 0 wt % to about 90 wt % of the fertilizer granule disclosed herein and from about 99 wt % to about 10 wt % of the second nitrogen containing fertilizer composition. For example, the composition can comprise from about 20 wt % to about 90 wt % of the fertilizer granule disclosed herein and from about 80 wt % to about 10 wt % of the second nitrogen containing fertilizer composition. In another example, the composition can comprise from about 30 wt % to about 70 wt % of the fertilizer granule disclosed herein and from about 70 wt % to about 30 wt % of the second nitrogen containing fertilizer composition.

In one aspect, the composition can comprise from above 0 wt % to about 50 wt % of the fertilizer core particle disclosed herein and from about 99 wt % to about 50 wt % of the second nitrogen containing fertilizer composition. For example, the composition can comprise from about 1 wt % to about 25 wt % of the fertilizer core particle disclosed herein and from about 99 wt % to about 75 wt % of the second nitrogen containing fertilizer composition. In another example, the composition can comprise from about 1 wt % to about 10 wt % of the fertilizer core particle disclosed herein and from about 99 wt % to about 90 wt % of the second nitrogen containing fertilizer composition.

In one aspect, the composition can further comprise a micronutrient, a primary nutrient, a secondary nutrient, an insecticide, an herbicide, or a fungicide, or a combination thereof.

E. Kit

Also disclosed herein is a kit comprising a) the fertilizer granule disclosed herein; and b) a second nitrogen containing fertilizer composition.

Also disclosed herein is a kit comprising a) the fertilizer core particle disclosed herein; and b) a second nitrogen containing fertilizer composition.

Also disclosed herein is a kit comprising a) the fertilizer granule disclosed herein; and b) a fertilizer composition.

Also disclosed herein is a kit comprising a) the fertilizer core particle disclosed herein; and b) a fertilizer composition.

In one aspect, the fertilizer composition comprises micronutrient, a primary nutrient, a secondary nutrient, an insecticide, an herbicide, or a fungicide, or a combination thereof.

In one aspect, the second nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof. In another aspect, the second nitrogen containing fertilizer composition comprises urea. Thus, for example, the kit can comprise the fertilizer core particle disclosed herein and urea. In another example, the kit can comprise the fertilizer granule disclosed herein and urea.

The second nitrogen containing fertilizer composition can be in any suitable form, such as, for example, granules or prills. For example, the urea can be in any suitable form, such as, for example, urea granules or urea prills.

In one aspect, the kit can comprise from above 0 wt % to about 90 wt % of the fertilizer granule disclosed herein and from about 99 wt % to about 10 wt % of the second nitrogen containing fertilizer composition. For example, the kit can comprise from about 20 wt % to about 90 wt % of the fertilizer granule disclosed herein and from about 80 wt % to about 10 wt % of the second nitrogen containing fertilizer composition. In another example, the kit can comprise from about 30 wt % to about 70 wt % of the fertilizer granule disclosed herein and from about 70 wt % to about 30 wt % of the second nitrogen containing fertilizer composition.

In one aspect, the kit can comprise from above 0 wt % to about 50 wt % of the fertilizer core particle disclosed herein and from about 99 wt % to about 50 wt % of the second nitrogen containing fertilizer composition. For example, the kit can comprise from about 1 wt % to about 25 wt % of the fertilizer core particle disclosed herein and from about 99 wt % to about 75 wt % of the second nitrogen containing fertilizer composition. In another example, the kit can comprise from about 1 wt % to about 10 wt % of the fertilizer core particle disclosed herein and from about 99 wt % to about 90 wt % of the second nitrogen containing fertilizer composition.

In one aspect, the kit further comprises at least one of a micronutrient, a primary nutrient, a secondary nutrient, an insecticide, an herbicide, a fungicide, or instructions for administering an effective amount of the kit to soil in order to increase the amount of nitrogen in the soil.

F. Methods

1. Method of Making a Composition

Also disclosed herein, is a method preparing a fertilizer core particle disclosed herein comprising the step of: a) extruding a mixture comprising one or more fertilizer additives, one or more binders comprising a wax, and one or more pH buffering agents, and wherein the mixture comprises from about 10 wt % to about 99 wt % of the one or more binders comprising a wax, thereby forming the fertilizer core particle.

Also disclosed herein is a method for preparing the fertilizer granule disclosed herein comprising the steps of: a) providing a core particle comprising one or more fertilizer additives, one or more binders comprising a wax, and one or more pH buffering agents, and wherein the core particle comprises from about 10 wt % to about 99 wt % of the one or more binders comprising a wax; and b) granulating the core particle with a nitrogen containing fertilizer composition, thereby forming a fertilizer granule.

Also disclosed herein, is a method for preparing a fertilizer core particle comprising the step of: a) extruding a mixture comprising an inhibitor or a micronutrient or a combination thereof, one or more binders comprising a wax, and one or more pH buffering agents, thereby forming a fertilizer granule core, wherein the inhibitor comprises NBTPT, DMPP, TU, DCD, PPDA, Nitrapyrin, Terrazole, AM, MBT, or ST or a combination thereof, and wherein the mixture comprises from about 10 wt % to about 99 wt % of the one or more binders comprising a wax.

In one aspect, the first nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof. In another aspect, the first nitrogen containing fertilizer composition comprises urea.

Also disclosed herein is a fertilizer core particle produced from the methods disclosed herein.

In one aspect, the fertilizer granule core can be a fertilizer granule core described elsewhere herein.

In one aspect, the extruding comprises extruding from an extruder at a temperature from 0° C. to 150° C. and a screw speed from 1 to 500 rpm, wherein the extruder comprises a multi-feeder comprising extrusion components. Extrusion components include, but are not limited to, the main drive, shaft, screw, barrel, and die. In one example, the temperature can be from 20° C. to 120° C. In another example, the temperature can be from 20° C. to 100° C. In yet another example, the temperature can be from 20° C. to 80° C. In yet another example, the temperature can be from 20° C. to 60° C. In yet another example, the temperature can be from 60° C. to 120° C. In one example, the screw speed from 60 to 80 rpm. In another example, the screw speed from 70 to 90 rpm. In yet another example, the screw speed from 100 to 500 rpm. In yet another example, the screw speed from 150 to 300 rpm.

In one aspect, the when the one or more binders comprising a wax comprise Plaster of Paris and the temperature of the extrusion is performed from about 15° C. to about 50° C.

In one aspect, the method further comprises slicing the extrudate, thereby forming a core of cylindrical shape having a diameter and a length from 0.5 mm to 2.0 mm. For example, the core can have a size from 0.7 mm to 1.5 mm. In one aspect, the method further comprises spheronizing the core, thereby producing a core having a substantial spherical shape.

In one aspect, the method further comprises the step of fattening the fertilizer core particle with a shell comprising urea or other nitrogen fertilizer, thereby forming a fertilizer granule. The fattening process can comprise spraying molten urea or other nitrogen fertilizer onto the core. In one aspect, the fattening of the core process is a granulation process.

In one aspect, the fattening of the core with a shell produces a fertilizer granule having a size from 1.5 mm to 8.0 mm, or from 2.0 mm to 4.0 mm.

In one aspect, the method further comprises heating the fertilizer core particle, thereby drying the fertilizer core particle. The heating can be done in a oven/dryer/similar instruments. Accordingly, the method can further comprise spheronizing the fertilizer core particle in a spheronizer. The fertilizer core particle can have a moisture content from greater than 0 wt % to 4 wt % after the fertilizer core particle has been spheronized. In one aspect, the spheronizer can operate at temperatures between 50° C. and 200° C., such as, for example, between 80° C. and 150° C. In one aspect, the spheronizer can operate at temperatures between 5° C. and 95° C., such as, for example, between 20° C. and 25° C. Residence time will vary between 10 seconds to 30 minutes, such as, for example, between 15 seconds to 5 minutes or between 30 seconds to 5 minutes. RPM of spheronizer will be dependent on the size and manufacturer's instructions.

The fertilizers and methods disclosed herein have several advantages over conventional fertilizer materials and methods. For example, the disclosed fertilizer granule compositions can prevent unwanted loss of a fertilizer additive, thereby lowering cost and/or improving the performance of the fertilizer.

Figure 13:
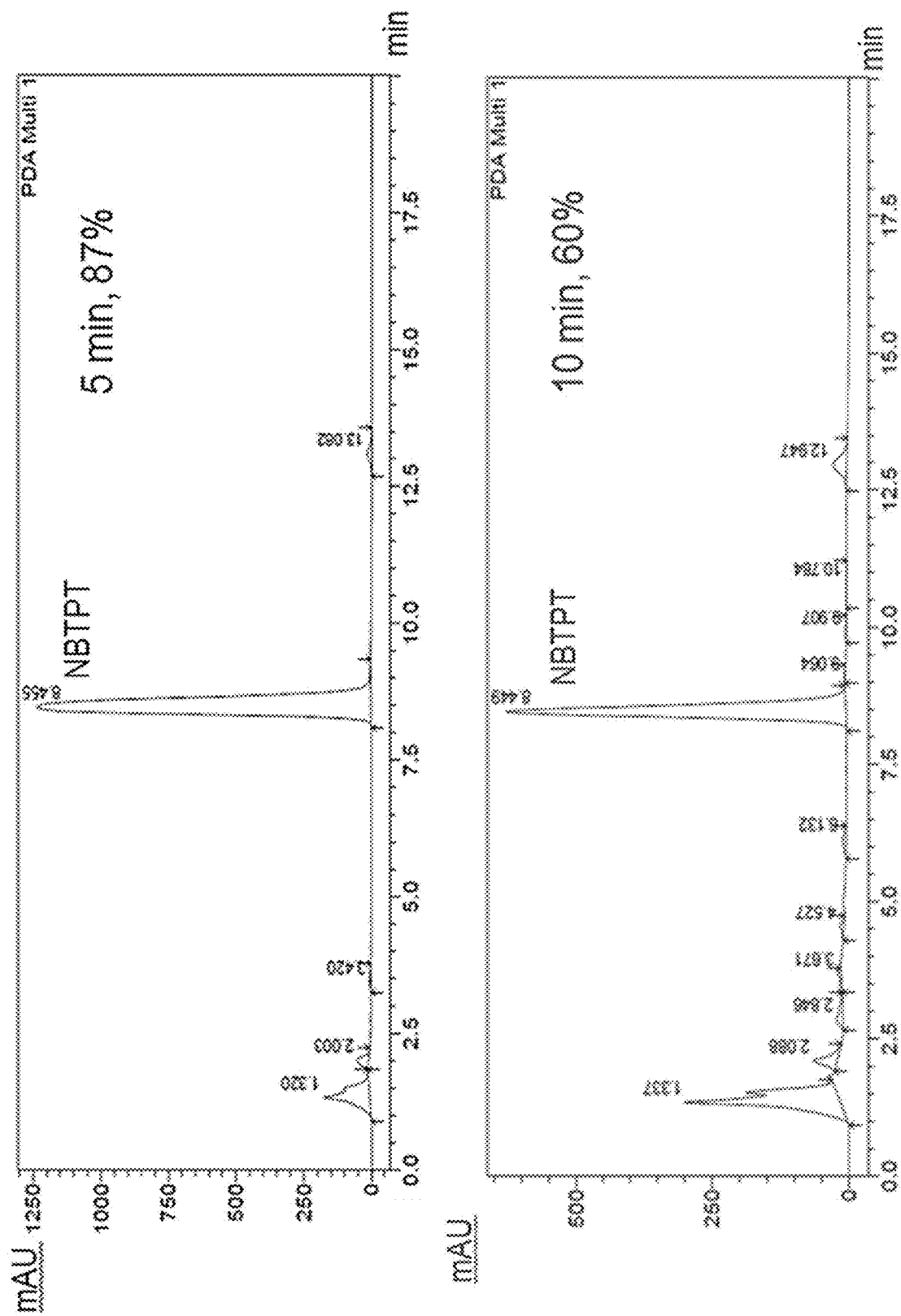
FIG. 13 shows the HPLC analysis of neat NBTPT that is exposed to 133-135° C. The percentage of intact NBTPT in the sample is shown in each chromatogram.
Figure 13:
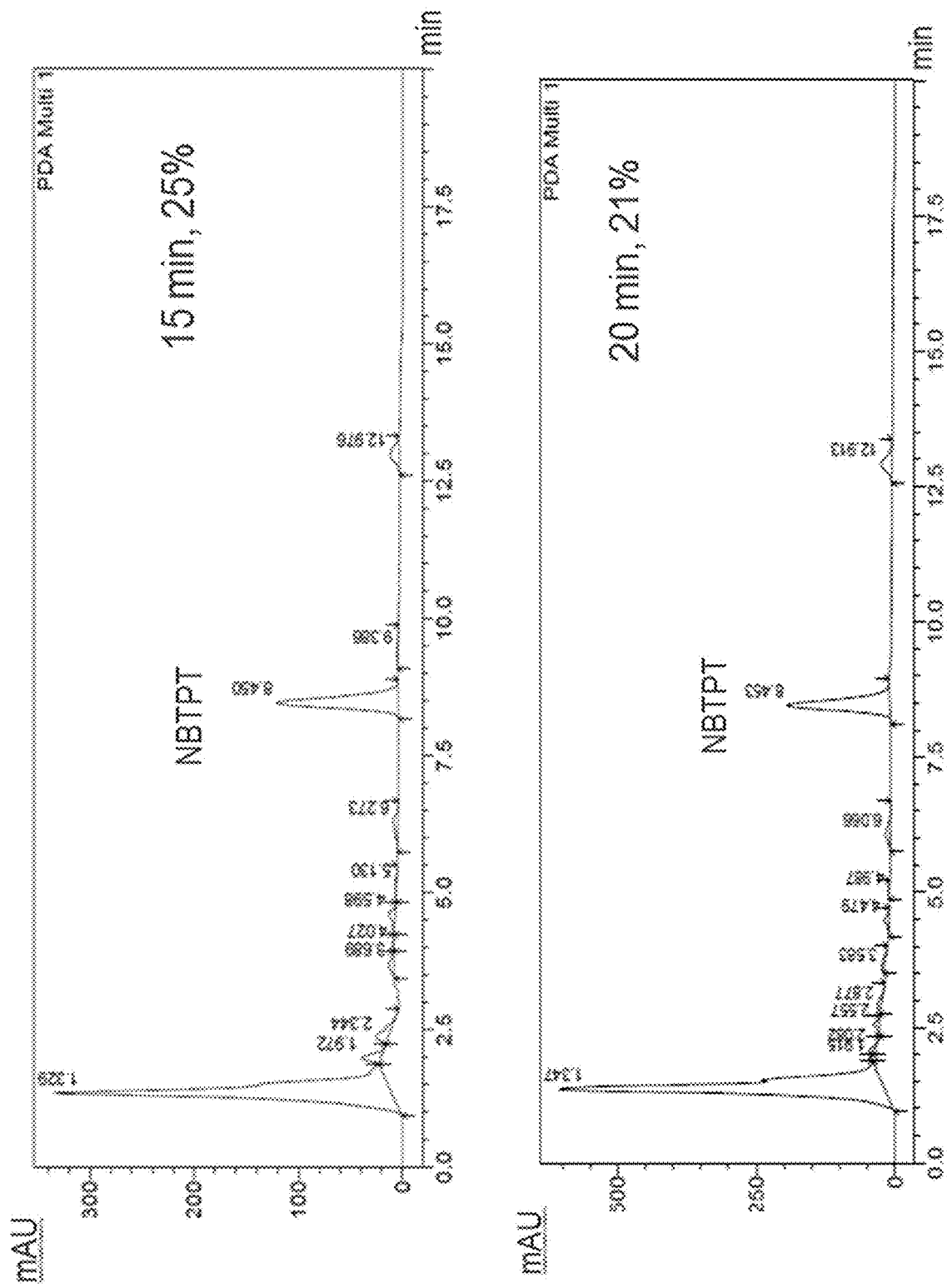
Figure 13:
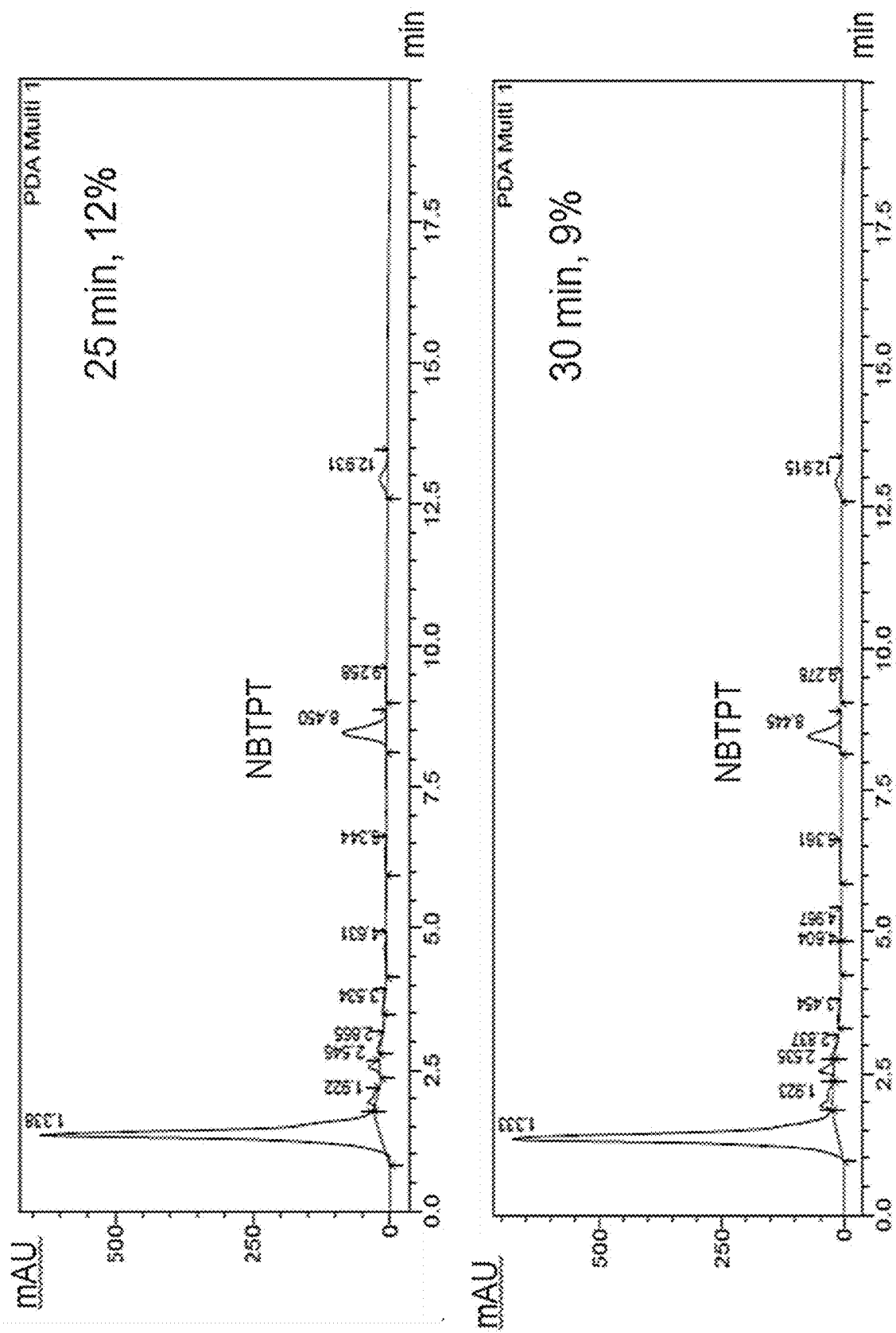

Certain fertilizer additives can be unstable and decompose at elevated temperatures. In a conventional manufacturing process, a fertilizer additive is directly exposed to the temperature of a urea melt, which is typically 133-135° C., during the granulation process. As shown in FIG. 13, in one example of this problem, neat NBTPT decomposes at this temperature over time. Accordingly, at least a portion of NBTPT is lost by using conventional methods.

Figure 14:
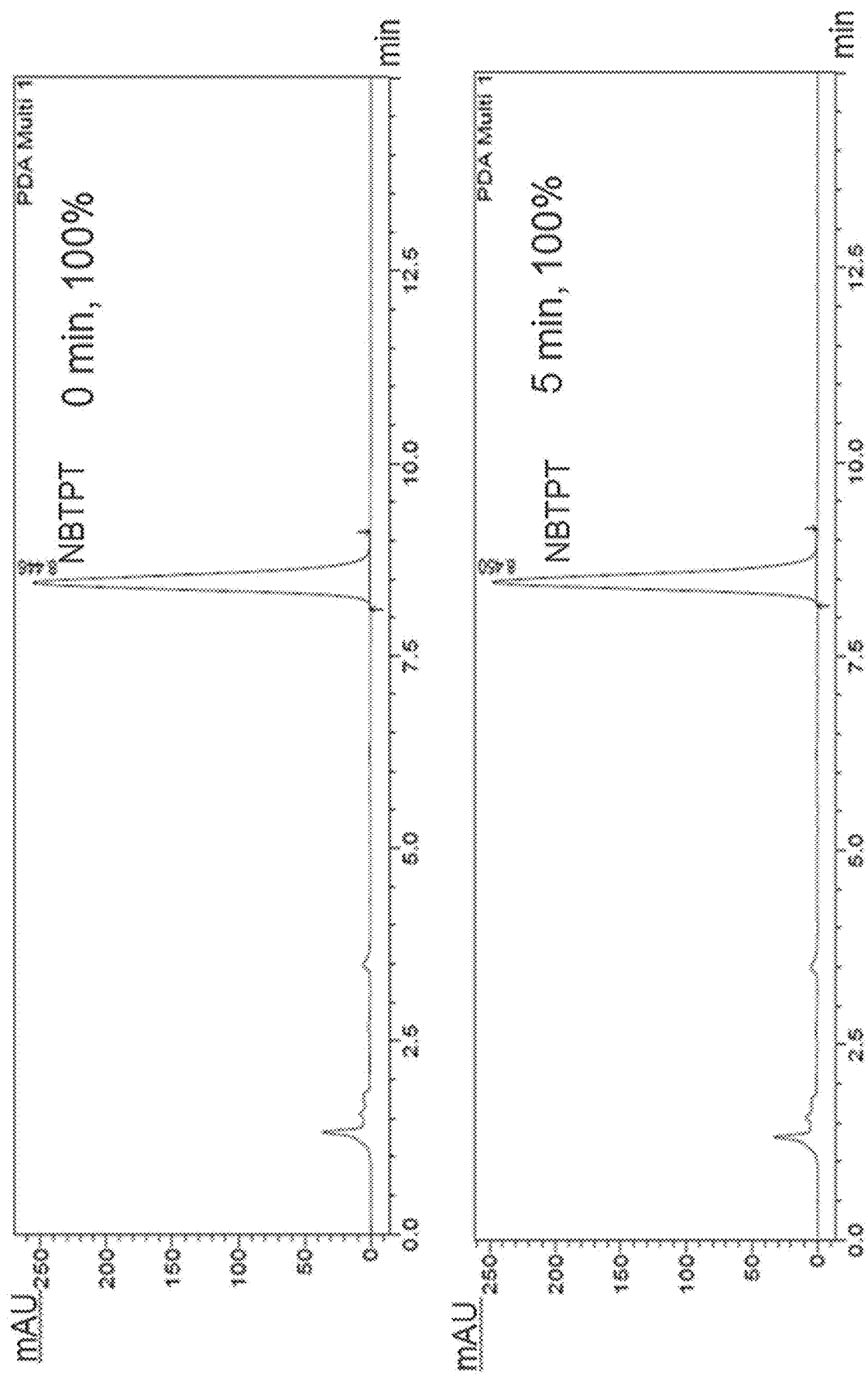
FIG. 14 shows data from the HPLC analysis of NBTPT within a core that is exposed to 133-135° C. The percentage of intact NBTPT in the sample is shown in each chromatogram.
Figure 14:
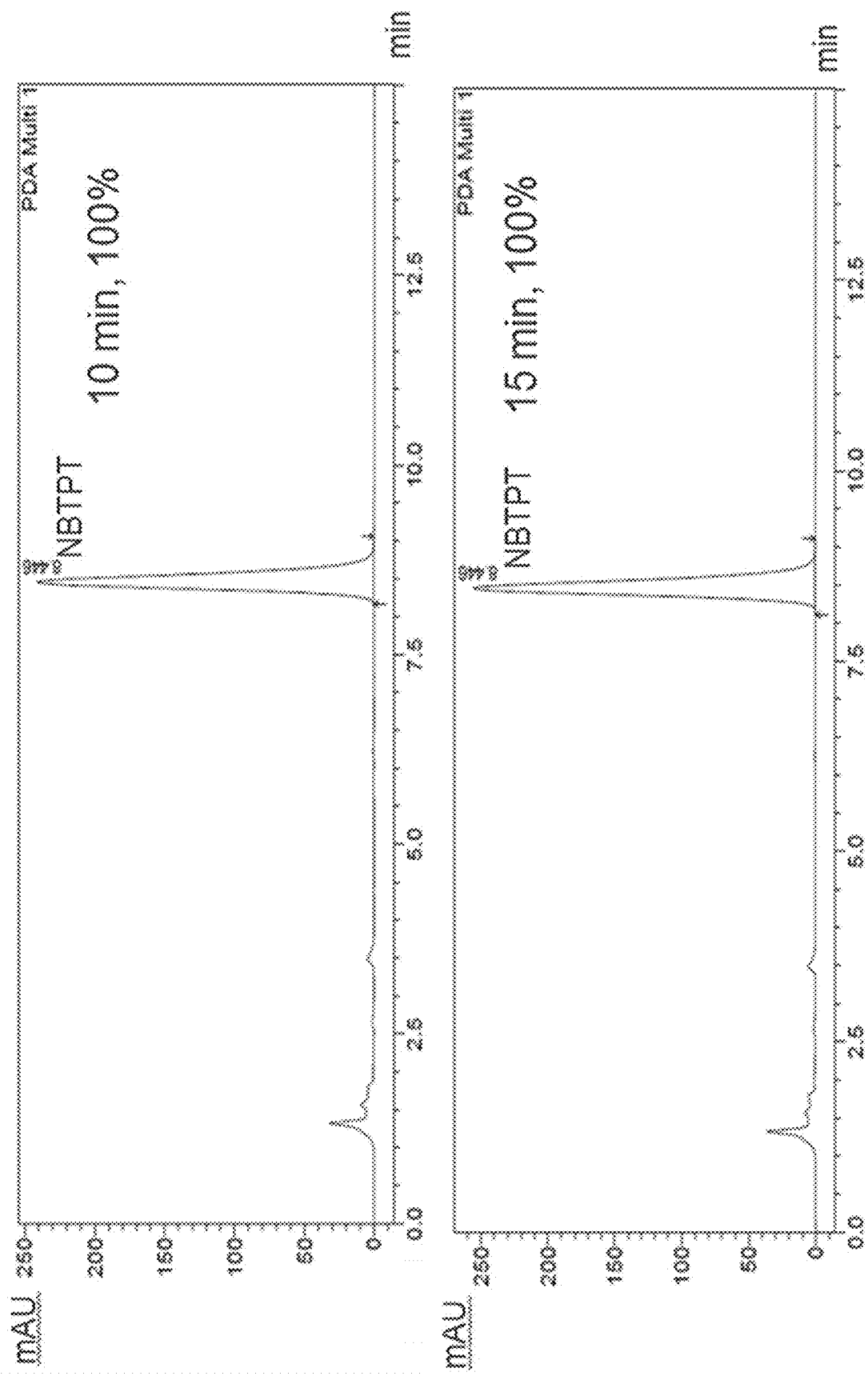
Figure 14:
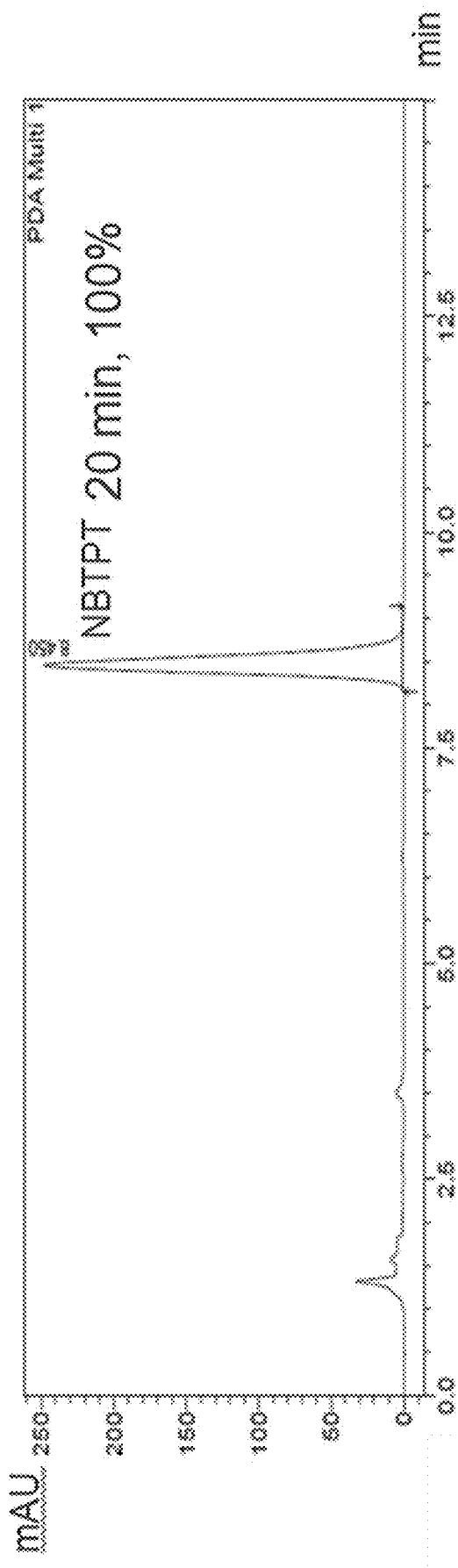
Figure 14:
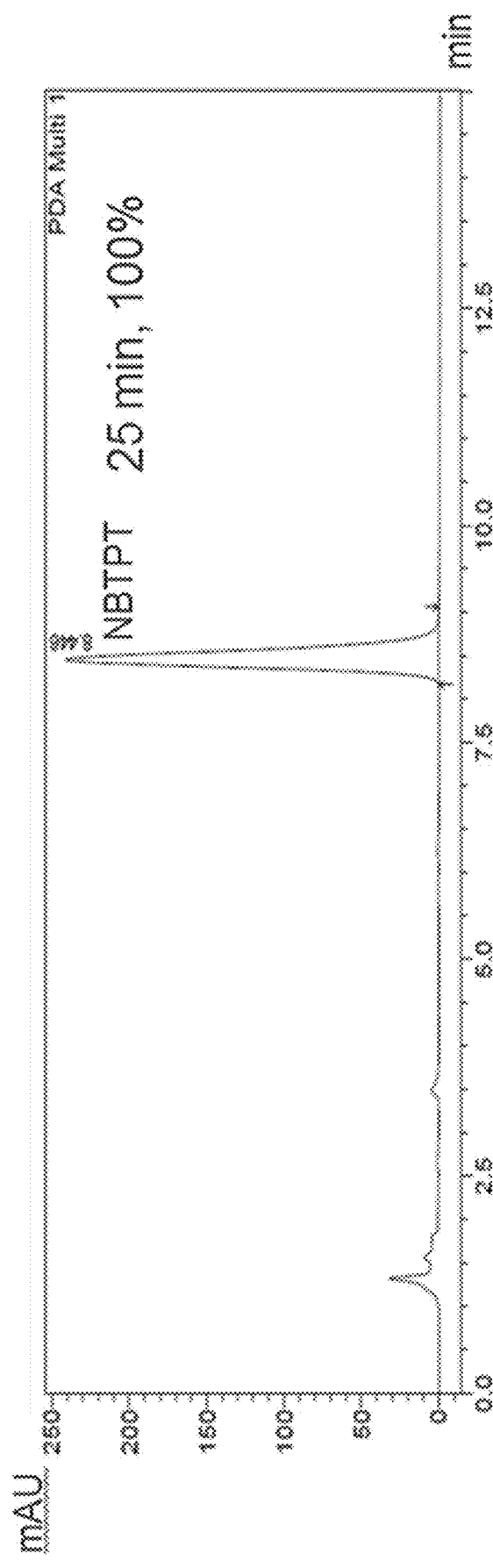
Figure 14:
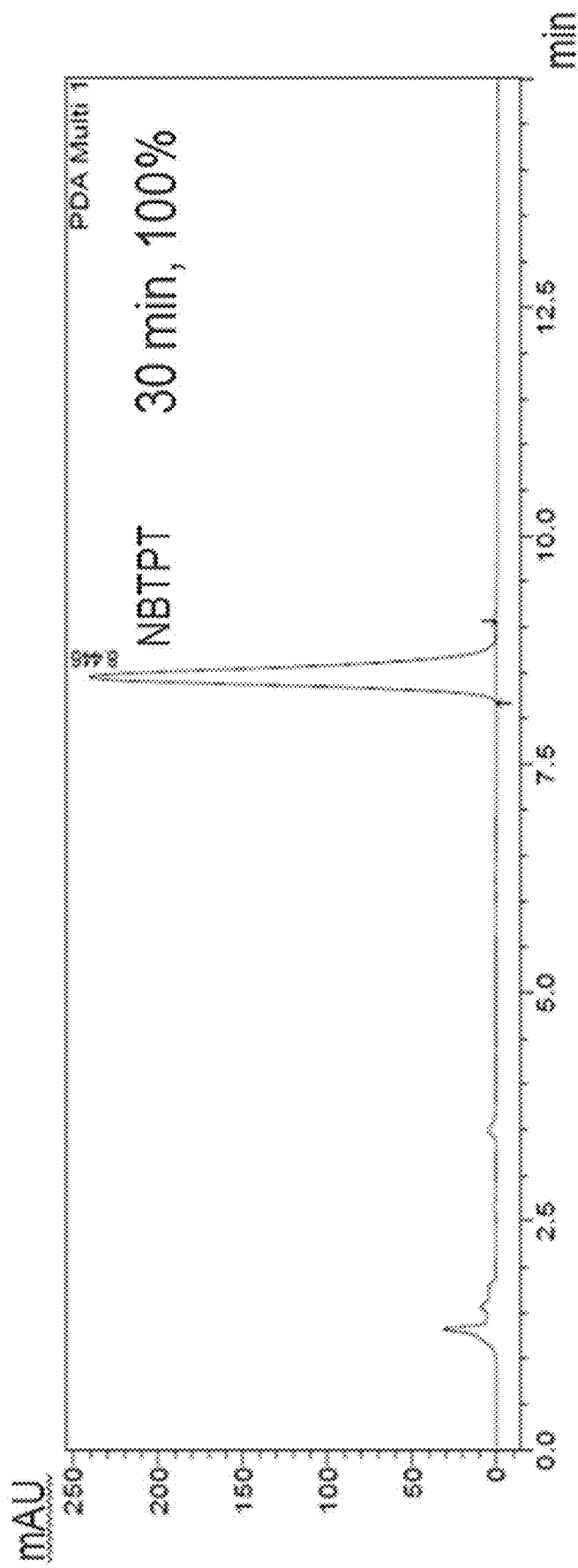

The fertilizers and methods disclosed herein protect the fertilizer additive from being directly exposed to the temperature of a urea melt during the manufacturing process. The fertilizer core particle of the fertilizer comprises a binder, which protects the fertilizer additive from being directly exposed to the urea melt and the temperature of the urea melt. As such, the fertilizer additive is protected from the elevated temperature and is less likely to decompose. As shown in FIG. 14, NBTPT within a fertilizer core particle is stable over time and does not decompose when the fertilizer core particle is exposed to 133-135° C. Thus, the fertilizers and methods disclosed herein prevent loss of a fertilizer additive, such as, for example, without limitation, an inhibitor, for example NBTPT, during the manufacturing process.

Furthermore, the fertilizer core particle disclosed herein is extrudable because of the binder. Thus, the binder also provides for a convenient method of producing a fertilizer core particle having a consistent size and composition.

2. Method of Using a Composition

Also disclosed herein is a method for increasing the amount of nitrogen in soil comprising the step of: a) applying an effective amount of the fertilizer granule disclosed herein to the soil, thereby increasing the amount of nitrogen in the soil.

Also disclosed herein is a method for increasing the amount of nitrogen in soil comprising the step of: a) applying an effective amount of the composition disclosed herein to the soil, thereby increasing the amount of nitrogen in the soil. For example, the composition can comprise the fertilizer granule disclosed herein and a nitrogen containing fertilizer composition. In another example, the composition can comprise the fertilizer core particle disclosed herein and a nitrogen containing fertilizer composition. In yet another example, the composition can comprise the fertilizer granule disclosed herein and a fertilizer composition. In yet another example, the composition can comprise the fertilizer core particle disclosed herein and a fertilizer composition.

In one aspect, the method of increasing the amount of nitrogen in the soil also promotes the growth of a plant, such as, for example, promotes the growth of a crop. The crop can be for example, but not limited to, rice, wheat, corn, barley, oats, and soybeans.

In one aspect, less than 20 wt % of the nitrogen added by the fertilizer granule is lost after being exposed to the soil for 17 days.

In one aspect, less percentage of the nitrogen added by the fertilizer granule is lost in the soil after being exposed to the soil for 17 days as compared to the percentage of nitrogen lost when Agrotain® or SuperU® is added to identical soil for 17 days under the same conditions.

Agrotain® is sold by Koch Fertilizer, LLC. Agrotain® is a NBTPT containing liquid formulation, with NMP as the main solvent with other additives to allow for spreading of this liquid onto urea granules, generally at the farmer site. Thus it requires an additional step before being used by the farmer and incorporates the toxic solvent NMP. Tremendous odor is evident during usage.

SuperU® is sold by Koch Fertilizer, LLC. SuperU® is a formulation of urea containing both NBTPT and DCD prepared by adding these two inhibitors in the urea melt during granulation.

G. System

Also disclosed herein is a system comprising an extruder capable of extruding a fertilizer core particle disclosed herein.

The extruder comprises a multi-feeder comprising extrusion components. Extrusion components include, but are not limited to, the main drive, shaft, screw, barrel, and die.

Also disclosed herein is a system for forming a fertilizer granule comprising a granulator capable of granulating a core particle with at least one of nitrogen containing fertilizer to form a fertilizer granule, wherein the granulator comprising an inlet for feeding the core particle. In one aspect, the nitrogen containing fertilizer comprising urea.

In one aspect, the system for forming a fertilizer granule comprises a) an extruder capable of extruding a fertilizer core particle; and b) a granulator capable of granulating the fertilizer core particle. In one aspect, the system further comprises means for transporting an extruded fertilizer core particle from the extruder to the granulator. The means for transporting can be a belt or other device capable of collecting a fertilizer core particle at the extruder and moving it into the granulator.

In one aspect, the granulator comprises a coating device, such as, for example, a nozzle for spraying molten urea onto the fertilizer core particle.

In one aspect, the system further comprises a cooler. The cooler is capable of cooling down the fertilizer granules exiting the granulator. Thus, in one aspect, the system further comprises means for transporting the fertilizer granule from the granulator to the cooler. In one aspect, the cooler comprises a fan or refrigeration unit.

H. Aspects

The disclosed methods include at least the following aspects.

Aspect 1: A fertilizer core particle having an outer surface and comprising one or more fertilizer additives, one or more binders comprising a wax, and one or more pH buffering agents, and wherein the core particle comprises from about 10 wt % to about 99 wt % of the one or more binders comprising a wax.

Aspect 2: The fertilizer core particle of aspect 1, wherein the one or more fertilizer additives comprise a urease inhibitor or a nitrification inhibitor, or a combination thereof.

Aspect 3: The fertilizer core particle of aspects 1 or 2, wherein the one or more fertilizer additives comprise a urease inhibitor and a nitrification inhibitor.

Aspect 4: The fertilizer core particle of any one of aspects 2 or 3, wherein the urease inhibitor comprises N-(n-butyl) thiophosphoric triamide (NBTPT) or phenyl phosphorodiamidate (PPDA), or a combination thereof.

Aspect 5: The fertilizer core particle of any one of aspects 2-4, wherein the nitrification inhibitor comprises 3,4-dimethylpyrazole phosphate (DMPP), thio-urea (TU), dicyandiamide (DCD), 2-Chloro-6-(trichloromethyl)-pyridine (Nitrapyrin), 5-Ethoxy-3-trichloromethyl-1, 2, 4-thiadiazol (Terrazole), 2-Amino-4-chloro-6-methyl-pyrimidine (AM), 2-Mercapto-benzothiazole (MBT), or 2-Sulfanimalamidothiazole (ST), or a combination thereof.

Aspect 6: The fertilizer core particle of any one of aspects 2-4, wherein the one or more inhibitors comprise NBTPT and DCD.

Aspect 7: The fertilizer core particle of any one of aspects 1-6, wherein the one or more pH buffering agents comprise $CaCO_3$, MgO, $KH_2PO_4$, or $NaHCO_3$, or a combination thereof.

Aspect 8: The fertilizer core particle of any one of aspects 1-7, wherein the one or more pH buffering agents comprise $CaCO_3$.

Aspect 9: The fertilizer core particle of any one of aspects 1-8, wherein the core particle comprises from about 40 wt % to about 90 wt % of the one or more binders comprising a wax.

Aspect 10: The fertilizer core particle of any one of aspects 1-8, wherein the core particle comprises from about 60 wt % to about 90 wt % of the one or more binders comprising a wax.

Aspect 11: The fertilizer core particle of any one of aspects 1-10, wherein the core particle comprises from about 5 wt % to about 60 wt % of the one or more pH buffering agent.

Aspect 12: The fertilizer core particle of any one of aspects 1-11, wherein the core particle comprises from about 20 wt % to about 60 wt % of the one or more pH buffering agent.

Aspect 13: The fertilizer core particle of any one of aspects 1-12, wherein the core particle comprises from about 40 wt % to about 60 wt % of the one or more pH buffering agent.

Aspect 14: The fertilizer core particle of any one of aspects 1-13, wherein the core particle comprises from about 5 wt % to about 30 wt % of the one or more pH buffering agent.

Aspect 15: The fertilizer core particle of any one of aspects 1-14, wherein the core particle is an extruded core particle.

Aspect 16: The fertilizer core particle of any one of aspects 1-14, wherein the one or more binders comprising a wax comprise a high melt wax or a low melt wax, or a combination thereof.

Aspect 17: The fertilizer core particle of any one of aspects 1-14, wherein the one or more binders comprising a wax comprise a high melt wax.

Aspect 18: The fertilizer core particle of any one of aspects 1-14, wherein the one or more binders comprising a wax comprise a low melt wax.

Aspect 19: The fertilizer core particle of any one of aspects 1-18, wherein the one or more fertilizer additives comprises a micronutrient, a primary nutrient, a secondary nutrient, an insecticide, an herbicide, or a fungicide, or combination thereof.

Aspect 20: The fertilizer core particle of any one of aspects 1-19, wherein the fertilizer core particle comprises from 20 wt % to 50 wt % of a low melt wax or high melt wax or combination thereof, from 20 wt % to 50 wt % of a binder selected from bleached wheat flour, or starch, or a filler comprising rice husk, or a combination thereof, from 10 wt % to 30 wt % of DCD, and from more than 0 wt % to 5 wt % of NBTPT, and from about 15 wt % to about 50 wt % of the pH buffering agent.

Aspect 21: The fertilizer core particle of any one of aspects 1-20, the fertilizer core particle a filler comprising rice husk.

Aspect 22: The fertilizer granule of aspect 21, wherein the filler comprises rice husk.

Aspect 23: The fertilizer granule of aspects 20-22, wherein the one or more pH buffering agents comprise $CaCO_3$.

Aspect 24: A fertilizer granule comprising the fertilizer core of any one of aspects 1-23, wherein the fertilizer granule further comprises a first nitrogen containing fertilizer composition in contact with the outer surface of the fertilizer core particle.

Aspect 25: The fertilizer granule of aspect 24, wherein an outer shell comprising a first nitrogen containing fertilizer composition at least partially surrounds the fertilizer core particle.

Aspect 26: The fertilizer granule of aspects 24 or 25, wherein the first nitrogen containing fertilizer composition comprises urea.

Aspect 27: The fertilizer granule of any one of aspect 24-26, wherein the outer shell substantially surrounds the fertilizer core particle.

Aspect 28: The fertilizer granule of any one of aspect 24-26, wherein the outer shell fully surrounds the fertilizer core particle.

Aspect 29: The fertilizer granule of any one of aspects any one of aspect 24-28, wherein the first nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof.

Aspect 30: The fertilizer granule any one of aspects 25-29, wherein the outer shell substantially comprises urea.

Aspect 31: The fertilizer granule of any one of aspects 24-30, wherein the core particle comprises from 20 wt % to 50 wt % of a low melt wax or high melt wax or combination thereof, from 20 wt % to 50 wt % of a binder selected from bleached wheat flour, rice husk, or starch, or a combination thereof, from 10 wt % to 30 wt % of DCD, from more than 0 wt % to 5 wt % of NBTPT, and from about 15 wt % to about 50 wt % of the pH buffering agent, and wherein an outer shell substantially comprising urea at least partially surrounds the core.

Aspect 32: The fertilizer granule of any one of aspects 24-31, wherein less than 20 wt % of the nitrogen in the nitrogen containing fertilizer composition is lost after being exposed to Greenville soil for 20 days.

Aspect 33: The fertilizer granule of any one of aspects 24-31, wherein less than 20 wt % of the nitrogen in the nitrogen containing fertilizer granule is lost after being exposed to upland crowley soil for 17 days.

Aspect 34: The fertilizer granule of any one of aspects 24-31, wherein less nitrogen in the nitrogen containing fertilizer granule is lost after being exposed to upland crowley soil for 17 days as compared to Agrotain® or SuperU® being exposed to upland crowley soil for 17 days under the same conditions.

Aspect 35: A composition comprising the fertilizer granule of any one of aspects 24-34 and a second nitrogen containing fertilizer composition.

Aspect 36: The composition of aspect 35, wherein the second nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof.

Aspect 37: The composition of aspect 35, wherein the second nitrogen containing fertilizer composition comprises urea.

Aspect 38: A composition comprising the fertilizer granule of any one of aspects 24-34 and a fertilizer composition.

Aspect 39: A composition comprising the fertilizer core particle of any one of aspects 1-23 and a second nitrogen containing fertilizer composition.

Aspect 40: The composition of aspect 39, wherein the second nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof.

Aspect 41: The composition of aspect 39, wherein the second nitrogen containing fertilizer composition comprises urea.

Aspect 42: A composition comprising the fertilizer core particle of any one of aspects 1-23 and a fertilizer composition.

Aspect 43: A kit comprising a) the fertilizer granule of any one of aspects 24-34; and b) a second nitrogen containing fertilizer composition.

Aspect 44: The kit of aspect 43, wherein the second nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof.

Aspect 45: The kit of aspect 43, wherein the second nitrogen containing fertilizer composition comprises urea.

Aspect 46: The kit of any one of aspects 43-45, wherein the kit further comprises at least one of a micronutrient, a primary nutrient, a secondary nutrient, an insecticide, an herbicide, a fungicide, or instructions for administering an effective amount of the kit to soil in order to increase the amount of nitrogen in the soil.

Aspect 47: A kit comprising a) the fertilizer granule of any one of aspects 24-34; and b) a fertilizer composition.

Aspect 48: A kit comprising a) the fertilizer core particle of any one of aspects 1-23; and b) a second nitrogen containing fertilizer composition.

Aspect 49: The kit of aspect 48, wherein the second nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof.

Aspect 50: The kit of aspect 48, wherein the second nitrogen containing fertilizer composition comprises urea.

Aspect 51: The kit of any one of aspects 48-50, wherein the kit further comprises at least one of a micronutrient, a primary nutrient, a secondary nutrient, an insecticide, an herbicide, a fungicide, or instructions for administering an effective amount of the kit to soil in order to increase the amount of nitrogen in the soil.

Aspect 52: A kit comprising a) the fertilizer core particle of any one of aspects 1-23; and b) a fertilizer composition.

Aspect 53: A method for preparing the fertilizer core particle of any one of aspects 1-23 comprising the step of: a) extruding a mixture comprising one or more fertilizer additives, one or more binders comprising a wax, and one or more pH buffering agents, and wherein the mixture comprises from about 10 wt % to about 99 wt % of the one or more binders, thereby forming the fertilizer core particle.

Aspect 54: The method of aspect 53, wherein the temperature of the extrusion is performed from about 5° C. to about 150° C.

Aspect 55: The method of aspect 53 or 54, wherein the one or more binders comprising a wax comprise a high melt wax and the temperature of the extrusion is performed from about 80° C. to about 150° C.

Aspect 56: The method of aspect 53 or 54, wherein the one or more binders comprise a low melt wax and the temperature of the extrusion is performed from about 15° C. to about 100° C.

Aspect 57: The method of any one of aspects 53-56, wherein the extrusion is performed by a screw having from about 100 to about 500 revolutions per minute (rpm).

Aspect 58: The method of any one of aspects 53-57, wherein the one or more fertilizer additives comprise a urease inhibitor or a nitrification inhibitor, or a combination thereof.

Aspect 59: The method of any one of aspects 53-58, wherein the one or more fertilizer additives comprise a urease inhibitor and a nitrification inhibitor.

Aspect 60: The method of any one of aspects 58 or 59, wherein the urease inhibitor comprises N-(n-butyl) thiophosphoric triamide (NBTPT) or phenyl phosphorodiamidate (PPDA), or a combination thereof.

Aspect 61: The method of any one of aspects 58-60, wherein the nitrification inhibitor comprises 3,4-dimethylpyrazole phosphate (DMPP), thio-urea (TU), dicyandiamide (DCD), 2-Chloro-6-(trichloromethyl)-pyridine (Nitrapyrin), 5-Ethoxy-3-trichloromethyl-1, 2, 4-thiadiazol (Terrazole), 2-Amino-4-chloro-6-methyl-pyrimidine (AM), 2-Mercaptobenzothiazole (MBT), or 2-Sulfanimalamidothiazole (ST), or a combination thereof.

Aspect 62: The method of any one of aspects 58-61, wherein the one or more inhibitors comprise NBTPT and DCD.

Aspect 63: The method of any one of aspects 53-62, wherein the one or more pH buffering agents comprise $CaCO_3$, $MgO$, $KH_2PO_4$, or $NaHCO_3$, or a combination thereof.

Aspect 64: The method of any one of aspects 53-62, wherein the one or more pH buffering agents comprise $CaCO_3$.

Aspect 65: The method of any one of aspects 53-64, wherein the one or more binders comprising a wax comprise a high melt wax or a low melt wax, or a combination thereof.

Aspect 66: The method of any one of aspects 53-64, wherein the one or more binders comprising a wax comprise a high melt wax.

Aspect 67: The method of any one of aspects 53-64, wherein the one or more binders comprising a wax comprise a low melt wax.

Aspect 68: A method for preparing a fertilizer granule of any one of aspects 24-34 comprising the steps of: a) providing a core particle comprising one or more fertilizer additives, one or more binders comprising a wax, and one or more pH buffering agents, and wherein the core particle comprises from about 10 wt % to about 99 wt % of the one or more binders comprising a wax; and b) granulating the core particle with a first nitrogen containing fertilizer composition, thereby forming a fertilizer granule.

Aspect 69: The method of aspect 68, wherein the fertilizer granule has a longest dimension from 1.5 mm to 8.0 mm.

Aspect 70: The method of any one of aspects 68-69, wherein the step of providing the core particle comprises the step of extruding a mixture comprising one or more fertilizer additives, one or more binders comprising a wax, and one or more pH buffering agents, and wherein the mixture comprises from about 10 wt % to about 99 wt % of the one or more binders, thereby forming the core particle.

Aspect 71: The method of any one of aspects 68-70, wherein the method further comprises the step of cooling the fertilizer granule.

Aspect 72: The method of any one of aspects 68-71, wherein the binder comprising a wax comprises a high melt wax.

Aspect 73: The method of any one of aspects 68-72, wherein the first nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof.

Aspect 74: The method of any one of aspects 68-72, wherein the first nitrogen containing fertilizer composition comprises urea.

Aspect 75: A method for increasing the amount of nitrogen in soil comprising the step of: a) applying an effective amount of the fertilizer granule of any one of aspects 24-34 to the soil, thereby increasing the amount of nitrogen in the soil.

I. EXAMPLES

The following examples are put forth so as to provide those of ordinary skill in the art with a complete disclosure and description of how the compounds, compositions, articles, devices, and/or methods described and aspected herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

1. Example 1

Described herein are fertilizer compositions that can be made using an extrusion process. Provided in this example are exemplary procedures for making core particles containing inhibitors and/or micronutrients for enhanced efficiency fertilizers.

i. Materials

Technical grade urea was received from SABIC, P.O. Box 5101, Riyadh 11422, Saudi Arabia. Waxes such as soy wax, palm wax and castor wax were received as samples from Ruchi Soya Industries Ltd., Indore, India. Castor wax (50 Kg) was obtained from K.R. Enterprises, Sivakasi, Tamil Nadu, India. Starches were received as samples from Angel starch, Erode, Tamil Nadu, India. High melting waxes (Qualiwax-C, Qualiwax QD flakes and Qualiwax QD-150) were received as samples from Quality Chemical Industries, Navi Mumbai, India. Bleached wheat flour was purchased from Sri Bhagyalakshmi maida, Bengaluru local market. N-(n-butyl) thiophosphoric triamide (NBTPT) was purchased from Samich (HK) Ltd., Hangzhou, China. All remaining commercially available reagents were purchased from Sigma-Aldrich, India.

ii. Equipment

For extrusion, Micro compounder (DACA, a lab scale mini extruder), pilot scale twin screw extruder (Coperion), wire press and room temperature twin screw extruder was used. Z-blade twin screw mixer with ~40 rpm (NH-2L kneader) was used for uniform mixing of bleached wheat flour and other additives for wet extrusion.

iii. Procedure for Extruding Exemplary Fertilizer Core Particles

Representative procedure for mini extruder (DACA): The raw materials (mainly waxes) were weighed to the nearest accuracy. The other additives needed were added to the molten waxes, mixed thoroughly, and poured on glass tray to crush the material in to small flakes. The extrusions were carried out using micro compounder (DACA, a lab scale vertical twin screw extruder). The extrusions were carried out at a processing temperature ranging from 20° C.-150° C.

Representative procedure for pilot scale extruder: The raw materials needed for formulations were weighed to the nearest accuracy and mixed thoroughly. The compounding operations were carried out in a W&P ZSK25 Twin Screw Extruder with a 25 mm screw diameter on a 6-barrel. The screw configuration was designed with sufficient kneading elements to get maximum shear for better mixing. The experiments were carried out at a processing temperature ranging from 5° C.-50° C. The temperature of the extrusion process can be controlled by the screw speed used in the extrusion process. For example, fertilizer core particles comprising Plaster of Paris were extruded at a lower temperature than fertilizer core particles comprising Plaster of Paris. The temperature of the extrusion process for fertilizer core particles comprising Plaster of Paris was generally between 20° C.-50° C., and the temperature of the extrusion process for fertilizer core particles comprising wax was generally between 50° C.-150° C. The ingredients were added through the hopper slowly by keeping the load constant. The extrudates were collected as strands and dried at room temperature. Screw speed was between 20-100 rpm and the material was added through the main hopper at 6-8 kg/hr. The extrudates were collected out of the die at the end of the extruder in a tray and allowed to cool.

Representative procedure for wire press (small scale manual extruder): The raw materials needed for formulations were weighed, mixed thoroughly in a mortar and pestle while adding minimal quantity of water to have extrudable dough form. The dough is a homogeneous mixture of the ingredients. The dough was transferred to a vessel having a 1.0 or 1.5 mm die and probe was screwed slowly at constant speed. This entire process was carried out at room temperature. The extrudates were collected out of the die in a tray and dried.

Representative procedure for room temperature extruder: The raw materials needed for formulations were weighed to the nearest accuracy and mixed thoroughly using Z-blade twin screw mixer with ~40 rpm (NH-2L kneader). Active ingredients were added followed by water slowly while mixing and continued the mixing until consistent dough is obtained (in 1 h). The dough is a homogeneous mixture of the ingredients. The dough was introduced into extruder (F-26 Twin Screw Banded Extruder) in the form of round bars at 100 rpm to get extrudates that were collected out of the die (1.0 or 1.5 mm) in a tray. The mixing and extrusion was carried out at room temperature. The extrudates were dried at 65-80° C. for 1 to 3 hrs before taking for further analysis. The dried extrudates generally have a moisture level to below 1%.

The thermal stability of neat NBTPT and NBTPT contained within a core, as disclosed herein, can be determined by HPLC. For example, neat NBTPT or a core containing NBTPT can be exposed to 135° C. (133-135° C. is the typical temperature range of a urea melt) and can continuously be analyzed by HPLC every 5 min, until data for 30 min was collected. Such data will determine whether the NBTPT has better thermal stability when contained within a core, as compared to neat NBTPT.

iv. Procedure for Coating and Granulating Exemplary Fertilizer Core Particles

The extruded fertilizer core particles were provided as described above. fertilizer core particles with having a longest dimension of 0.7-1.0 mm were chosen for granulation. During the granulation process, active ingredients, such as the inhibitors, are protected inside the fertilizer core particles by the binder materials used in the formulation. The fertilizer core particles were placed in the granulator. The fertilizer core particles were sprayed with a urea melt inside the granulator to produce the fertilizer granule. The granulated fertilizer core particle generally has a longest dimension of about 3 mm. The granulating process both fattens the cores with urea and dries the fertilizer granules.

The spray rate of the urea melt can be controlled to control the agglomeration of multiple cores into one fertilizer granule. Round, single and multi-core fertilizer granules were produced using this process.

Challenges in the granulation process include: i) transferring urea melt to granulator ii) reducing biuret formation iii) avoiding crystallization of urea melt in the delivery tubes up to spray nozzle head, and iv) homogenization of the melt and rate of transfer to the granulator. To resolve these issues the granulation process included transferring urea melt to the granulator by pumping the urea melt to granulator. This can be a complicated process when the volume of the liquid (urea melt) to be transferred is small (2-3 liter) as pump head heating is a must and that the piping length have some limitations. This issue was solved by transferring molten liquid to the granulator by gravitational force instead of pumping.

Reducing of biuret formation during the melt preparation is achieved by increasing surface area of urea and reducing melt preparation time and high temperature exposure. Melt temperature is reduced by using 10% water into the system. A heat tracing device was attached with proper insulation for avoiding crystallization of urea melt in the PTFE delivery tubes up to spray nozzle head. The bottom spray nozzle was used with a valve in front of the nozzle and coupled to a heating system. A continuous stirring device was introduced into urea melter to keep the melt homogenized. The urea melter temperature was controlled by circulating heated thermal oil into the double jacketed melter. The rate of transfer of the melt to granulator can be controlled by flow meter. However, on an experimental scale the volume is so small that introducing a flow meter in the transfer line is not viable. For these experiments the urea melter was kept over a weighing scale, and the rate of transfer was calculated from the weight loss of weighing scale vs. time of transfer. A valve at the urea melt tank discharge, with heating system, was used to control the rate of flow of the urea melt.

The granulation process parameters are described in Table 1.

TABLE 1

| Process | Coating |
|---|---|
| Bin | Coating Bin |
| Nozzle | Bottom spray; Diameter 1.2 mm; Air cap 2.6 mm |
| Atomization air pressure | 0.8 bar |
| Distribution plate | Sieve plate with 58% free area |
| Sieve cloth | 1x; 250 μm mesh size |
| Nozzle heating (thermal oil temperature) | 160° C. |
| Liquid tank heating (thermal oil temperature) | 150° C. |
| Atomization air heating | 100° C. |
| Electrical trace heating (tube) | 160° C. |
| Valve I heating (in front of the nozzle) | 160° C. |
| Valve II heating (liquid tank discharge) | 160° C. |

A general flow of the process for the production of the granulation process parameters are described in Table 1.

v. Exemplary Samples

The exemplary samples shown in Table 2 were produced using the extrusion and, if indicated, the granulation process described above.

TABLE 2

| | Values in percentage | | | | | | | | | | |
|---|---|---|---|---|---|---|---|---|---|---|---|
| Formulation | PVA | PLA | POP | HMW | LMW | RH | BWF | CP | DCD | NBTPT | Urea |
| F-9 | | | | 2.50 | | 2.50 | | | | | 95.00 |
| F-10 | | | | 2.45 | | 2.45 | | | | 0.10 | 95.00 |
| F-11 | | | | 1.45 | | 1.45 | | | 2.10 | | 95.00 |
| F-12 | | | | 1.40 | | 1.40 | | | 2.10 | 0.10 | 95.00 |
| F-13 | | | 3.00 | | | | 2.00 | | | | 95.00 |
| F-14 | | | 2.94 | | | | 1.96 | | | 0.10 | 95.00 |
| F-15 | | | 1.65 | | | | 1.06 | | 2.10 | | 95.19 |
| F-16 | | | 1.59 | | | | 1.06 | | 2.10 | 0.10 | 95.15 |
| F-19ND | | | 2.41 | | | | 1.61 | | 0.90 | 0.07 | 95.01 |
| F-20ND | | | 1.70 | | | | 1.15 | | 2.05 | 0.09 | 95.01 |
| F-21D | 3.00 | | 0.90 | | | | | | 1.10 | | 95.00 |
| F-22D | | | | | 2.50 | | 2.00 | | 0.50 | | 95.00 |
| F-23N | | | 2.46 | 2.43 | | | | | | 0.11 | 95.00 |
| F-24N | | | | | 2.38 | | | 2.51 | | 0.11 | 95.00 |
| F-25 | | | 2.00 | | | | 1.40 | 1.60 | | | 95.00 |
| F-26N | | | 1.89 | | | | 1.40 | 1.60 | | 0.11 | 95.00 |

TABLE 2-continued

| Formulation | PVA | PLA | POP | HMW | LMW | RH | BWF | CP | DCD | NBTPT | Urea |
|---|---|---|---|---|---|---|---|---|---|---|---|
| F-27ND | | | 1.50 | | | | 1.20 | 1.09 | 1.10 | 0.11 | 95.00 |
| F-28ND | | | 2.27 | | | | 1.52 | | 1.10 | 0.11 | 95.00 |
| F-29ND | | | 1.94 | | | | 1.30 | | 1.65 | 0.11 | 95.00 |
| F-30ND | | | 1.60 | | | | 1.10 | | 2.20 | 0.11 | 94.99 |
| F-31ND | | | 1.84 | 1.95 | | | | | 1.10 | 0.11 | 95.00 |
| F-32ND | | | | | 1.90 | 1.89 | | | 1.10 | 0.11 | 95.00 |
| F-33N | | | 2.38 | | | | | 2.51 | | 0.11 | 95.00 |
| F-34D | | | 1.90 | | | | | 2.00 | 1.10 | | 95.00 |
| F-35ND | | | 1.90 | | | 1.89 | | | 1.10 | 0.11 | 95.00 |
| F-36ND | | | | 1.90 | | | 1.89 | | 1.10 | 0.11 | 95.00 |
| F-37ND | | 2.30 | | | 1.49 | | | | 1.10 | 0.11 | 95.00 |
| F-38D | | | | 2.50 | | | 1.40 | | 1.10 | | 95.00 |

In Table 2: PVA = Polyvinyl acetate; PLA = Polylactic acid; POP = Plaster of Paris; HMW = High Melt Wax; LMW = Low Melt Wax; RH = Rice Husk; BWF = Bleached Wheat Flour; CP = Chalk Powder; DCD = Dicyandiamide; NBTPT = N-(n-butyl) thiophosphoric triamide.

vi. Sample Analysis and Results

Analytical characterization: Melting point and thermal degradation properties of waxes and inhibitors (NBTPT and DCD) were confirmed using DSC and TGA analysis. The purity of NBTPT and DCD was cross-checked by NMR, HPLC and LCMS analysis.

Crush Strength: Crush strength was measured for some of the samples using crush strength analyzer to know the strength of the extrudate.

Stability of inhibitors in urea melt: Extrudates containing inhibitors were tested for their stability in urea melt using HPLC and LCMS.

Moisture analysis: moisture content of extrudates was measured using moisture analyzer.

vii. Results

The final fertilizer granules were tested for crush strength, abrasion analysis, impact resistance, moisture content, size distribution, biuret content, and nitrogen content. In general the fertilizer granule have the following properties: crush Strength (kgf) 1.68-3.60, Abrasion Analysis (Wt loss %) 0.11-0.85, Impact resistance (shattered granules %) 0.05-0.64, Moisture Analysis (Wt %) 0.12-0.23, Particle size distribution (granule) 2-4 mm (97%), Biuret % 1.05-3.8, and Nitrogen % 43.3-46.3. Table 4 shows the details of these measurements.

TABLE 4

| | Core material | | Spraying liquid | | |
|---|---|---|---|---|---|
| Test No. | Product name | Mass [g] | Product name | Concentration [%] | Melting point [° C.] | Spraying quantity [g] |
| 1 | F-25 | 120 | Urea granules + Aqua dest. | 90 | 105 | 2700 |
| 2 | F-23N | 120 | Urea granules + Aqua dest. | 90 | 105 | 2650 |
| 3 | F-21D | 120 | Urea granules + Aqua dest. | 90 | 105 | 2600 |
| 4 | F-26N | 120 | Urea granules + Aqua dest. | 90 | 105 | 2600 |
| 5 | F-27ND | 120 | Urea granules + Aqua dest. | 90 | 105 | 2550 |
| 6 | F-28ND | 120 | Urea granules + Aqua dest. | 90 | 105 | 2550 |
| 7 | F-29ND | 120 | Urea granules + Aqua dest. | 90 | 105 | 2550 |
| 8 | F-30ND | 120 | Urea granules + Aqua dest. | 90 | 105 | 2550 |
| 9 | F-31ND | 120 | Urea granules + Aqua dest. | 90 | 105 | 2550 |
| 10 | F-33N | 120 | Urea granules + Aqua dest. | 90 | 105 | 2550 |
| 11 | F-22D | 120 | Urea granules + Aqua dest. | 90 | 105 | 2550 |
| 12 | F-34D | 120 | Urea granules + Aqua dest. | 90 | 105 | 2550 |

TABLE 4-continued

| | | Process parameters | | | | | | | |
|---|---|---|---|---|---|---|---|---|---|
| Test No. | Core material Product name | Spray rate g/min | Temp Spraying liquid [° C.] | Inlet air temperature [° C.] | Exhaust air temperature [° C.] | Air flow rate m³/h | Atom Pressure [bar] | Granul. Time [min] | Cooling time [min] |
| 1 | F-25 | 6-27 | 125-130 | 90 | 64.8-85.6 | 50-130 | 0.8 | 66 | 20 |
| 2 | F-23N | 6-100 | 125-130 | 90 | 60.8-82.7 | 50-130 | 0.8 | 42 | 20 |
| 3 | F-21D | 6-60 | 123-126 | 90 | 55.7-82.9 | 150-130 | 0.8 | 69 | 20 |
| 4 | F-26N | 13-68 | 121-125 | 90 | 55.2-82.0 | 50-130 | 0.8 | 63 | 20 |
| 5 | F-27ND | 15-58 | 123-127 | 90 | 63.0-84.0 | 50-125 | 0.8 | 71 | 20 |
| 6 | F-28ND | 14-54 | 129-132 | 90 | 67.5-85.0 | 50-140 | 0.8 | 65 | 20 |
| 7 | F-29ND | 12-64 | 125-128 | 90 | 60.9-81.0 | 50-135 | 0.8 | 50 | 20 |
| 8 | F-30ND | 30-74 | 120-124 | 90 | 64.1-82.9 | 50-135 | 0.8 | 41 | 20 |
| 9 | F-31ND | 20-60 | 127-130 | 90 | 68.0-84.8 | 50-140 | 0.8 | 54 | 20 |
| 10 | F-33N | 24-73 | 121-126 | 90 | 64.5-82.6 | 50-140 | 0.8 | 46 | 20 |
| 11 | F-22D | 23-72 | 120-132 | 70-90 | 60.7-81.9 | 50-140 | 0.8 | 47 | 20 |
| 12 | F-34D | 18-80 | 121-131 | 90 | 61.9-84.3 | 50-140 | 0.8 | 44 | 20 |

| | | Final product | | | |
|---|---|---|---|---|---|
| Test No. | Core material Product name | Final product mass [g] | Moisture content [%] | Crushing strength [kg] | Growth mass [Factor] |
| 1 | F-25 | 2700 | 0.13 | 6.0<br>6.4<br>6.4 | 22.5 |
| 2 | F-23N | 2680 | 0.17 | 1.6<br>1.2<br>3.3 | 22.3 |
| 3 | F-21D | 2651 | 0.12 | 0.85<br>1.5<br>5.0 | 22.0 |
| 4 | F-26N | 2670 | 0.17 | 2.5<br>1.9<br>3.6 | 22.3 |
| 5 | F-27ND | 2476 | 0.11 | 3.2<br>2.3<br>2.2 | 20.6 |
| 6 | F-28ND | 2558 | 0.17 | 2.6<br>2.4<br>1.5 | 21.3 |
| 7 | F-29ND | 2378 | 0.12 | 3.3<br>3.4<br>1.7 | 19.8 |
| 8 | F-30ND | 2540 | 0.19 | 1.8<br>3.3<br>1.7 | 21.2 |
| 9 | F-31ND | 2650 | 0.14 | 2.0<br>2.4<br>3.0 | 22.0 |
| 10 | F-33N | 2582 | 0.23 | 2.0<br>1.4<br>3.0 | 21.5 |
| 11 | F-22D | 2530 | 0.19 | 2.1<br>1.9<br>1.9 | 21.0 |
| 12 | F-34D | 2675 | 0.22 | 3.2<br>1.1<br>3.4 | 22.3 |

| | Core Material | | |
|---|---|---|---|
| Product name | Mean particle size diameter [mm] | Bulk density [g/L] | Mass [g] |
| F9 | 1.06 | 587 | 400 |
| F10 | 1.09 | 626 | 400 |
| F11 | 1.12 | 648 | 400 |
| F12 | 1.08 | 624 | 400 |

TABLE 4-continued

| | Spraying liquid | | | |
|---|---|---|---|---|
| Product name | Product name | Concentration [%] | Melting point [° C.] | Mass (dry matter) [g] |
| F9 | Urea granules + Aqua dest. | 80 | 81 | 4047 |
| F10 | Urea granules + Aqua dest. | 80 | 81 | 4164 |
| F11 | Urea granules + Aqua dest. | 80 | 81 | 4118 |
| F12 | Urea granules + Aqua dest. | 80 | 81 | 4264 |

| | Process Parameters | | | |
|---|---|---|---|---|
| Product name | Spray rate [g/min] | Temp Spraying liquid [° C.] | Temp. tube [° C.] | Inlet air temperature [° C.] |
| F9 | 20-50 | 115 | 100 | 90 |
| F10 | 20-50 | 115 | 100 | 90 |
| F11 | 20-50 | 115 | 100 | 90 |
| F12 | 20-50 | 115 | 100 | 90 |

| | Process Parameters | | | | |
|---|---|---|---|---|---|
| Product name | Exhaust air temperature [° C.] | Air flow rate m³/h | Atom Pressure [bar] | Granul. Time [min] | Cooling time [min] |
| F9 | 51.2-78.3 | 48-140 | 1.2 | 115 | 20 |
| F10 | 43.6-78.5 | 48-140 | 1.2 | 110 | 20 |
| F11 | 50.1-78.9 | 48-140 | 1.2 | 105 | 20 |
| F12 | 67.8-78.1 | 48-140 | 1.2 | 110 | 20 |

| | Final Product | | | | |
|---|---|---|---|---|---|
| Product name | Final product mass [g] | Mean particle size diameter [mm] | Moisture content [%] | Bulk density [g/L] | Crushing strength [kg] | Content of core material [%] |
| F9 | 4447 | 3.16 | 0.24 | 624 | 3 | 9.0 |
| F10 | 4564 | 3.0 | 0.25 | 613 | 2.7 | 8.8 |
| F11 | 4518 | 2.7 | 0.21 | 617 | 3.3 | 8.9 |
| F12 | 4646 | 3.25 | — | 605 | 2.1 | 8.6 |

| Core Material | | Spraying Liquid | | | Spraying |
|---|---|---|---|---|---|
| Product name | Mass [g] | Product name | Concentration [%] | Melting point [° C.] | quantity [g] |
| F24N | 120 | Urea granules + Aqua dest. | 90 | 105 | 2550 |
| F32ND | 120 | Urea granules + Aqua dest. | 90 | 105 | 2550 |
| F35ND | 120 | Urea granules + Aqua dest. | 90 | 105 | 2550 |
| F36ND | 120 | Urea granules + Aqua dest. | 90 | 105 | No Granulation possible |
| F37ND | 120 | Urea granules + Aqua dest. | 90 | 105 | No Granulation possible |
| F38ND | 120 | Urea granules + Aqua dest. | 90 | 105 | No Granulation possible |

| | Process Parameters | | | | |
|---|---|---|---|---|---|
| Core Material Product name | Spray rate g/min | Temp Spraying liquid [° C.] | Inlet air temperature [° C.] | Exhaust air temperature [° C.] | Air flow rate m³/h |
| F24N | 8-69 | 129-133 | 50-90 | 45.4-81.1 | 50-140 |
| F32ND | 12-74 | 122-134 | 50-90 | 44.9-82.0 | 50-140 |

TABLE 4-continued

| Core Material Product name | | | | |
|---|---|---|---|---|
| F35ND | 17-25 | 128.5-132.0 | 90 | 55.0-88.6 | 50-140 |
| F36ND | | No Granulation possible | | | |
| F37ND | | No Granulation possible | | | |
| F38ND | | No Granulation possible | | | |

| | Process Parameters | | |
|---|---|---|---|
| Core Material Product name | Atom Pressure [bar] | Granul. Time [min] | Cooling time [min] |
| F24N | 0.8 | 47 | 20 |
| F32ND | 0.8 | 45 | 20 |
| F35ND | 0.8 | 53 | 20 |
| F36ND | | No Granulation possible | |
| F37ND | | No Granulation possible | |
| F38ND | | No Granulation possible | |

| | Final Product | | | |
|---|---|---|---|---|
| Core Material Product name | Final product mass [g] | Moisture content [%] | Crushing strength [kg] | Growth mass [Factor] |
| F24N | 2526 | 0.19 | 3.6 | 21.0 |
| | | | 3.2 | |
| | | | 3.4 | |
| F32ND | 2690 | 0.18 | 3.0 | 22.4 |
| | | | 3.9 | |
| | | | 4.8 | |
| F35ND | 2326 | | 1.8 | 19.4 |
| | | | 2.0 | |
| | | | 2.3 | |
| F36ND | | No Granulation possible | | |
| F37ND | | No Granulation possible | | |
| F38ND | | No Granulation possible | | |

Figure 3A:
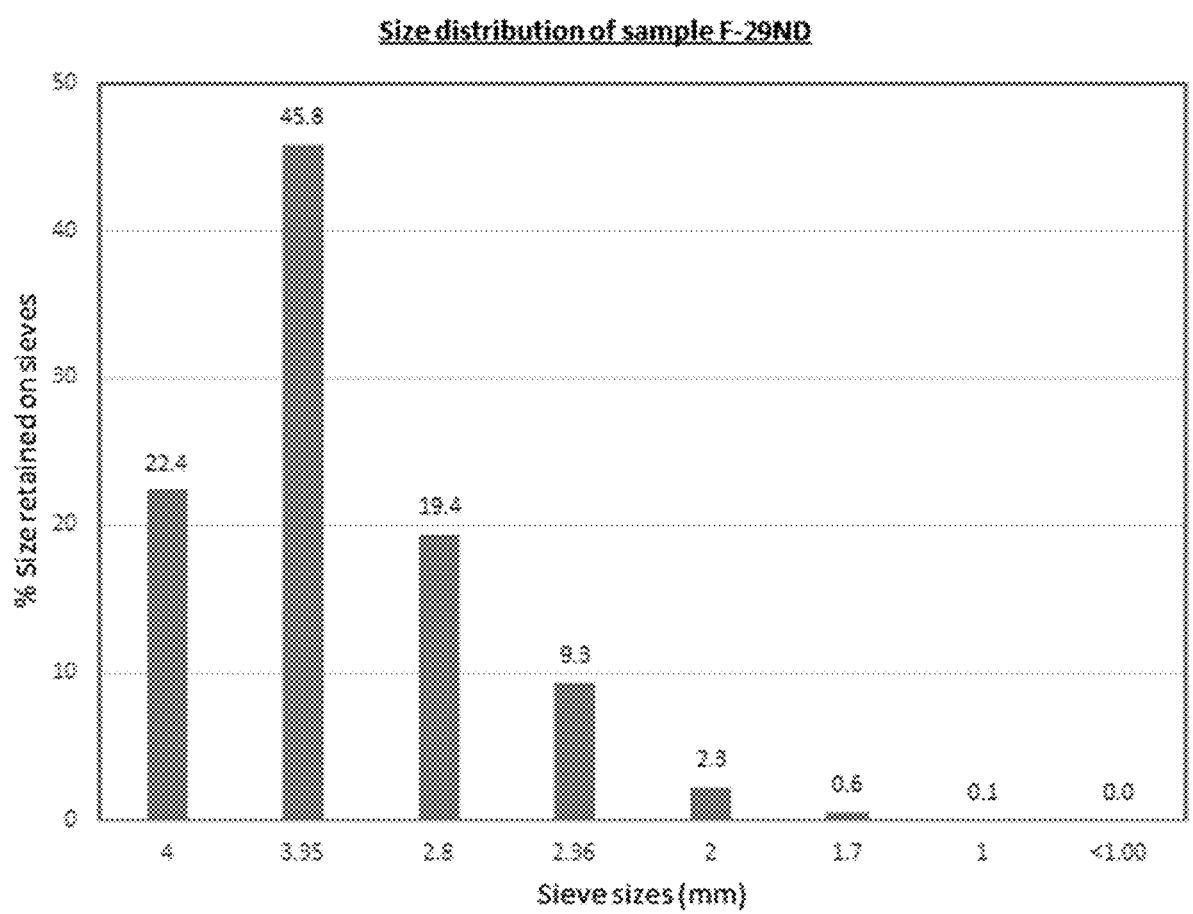
FIG. 3A-3C show the size distribution of sample F-29ND (3A), F-28ND (3B), and F-31ND (3C).
Figure 3B:
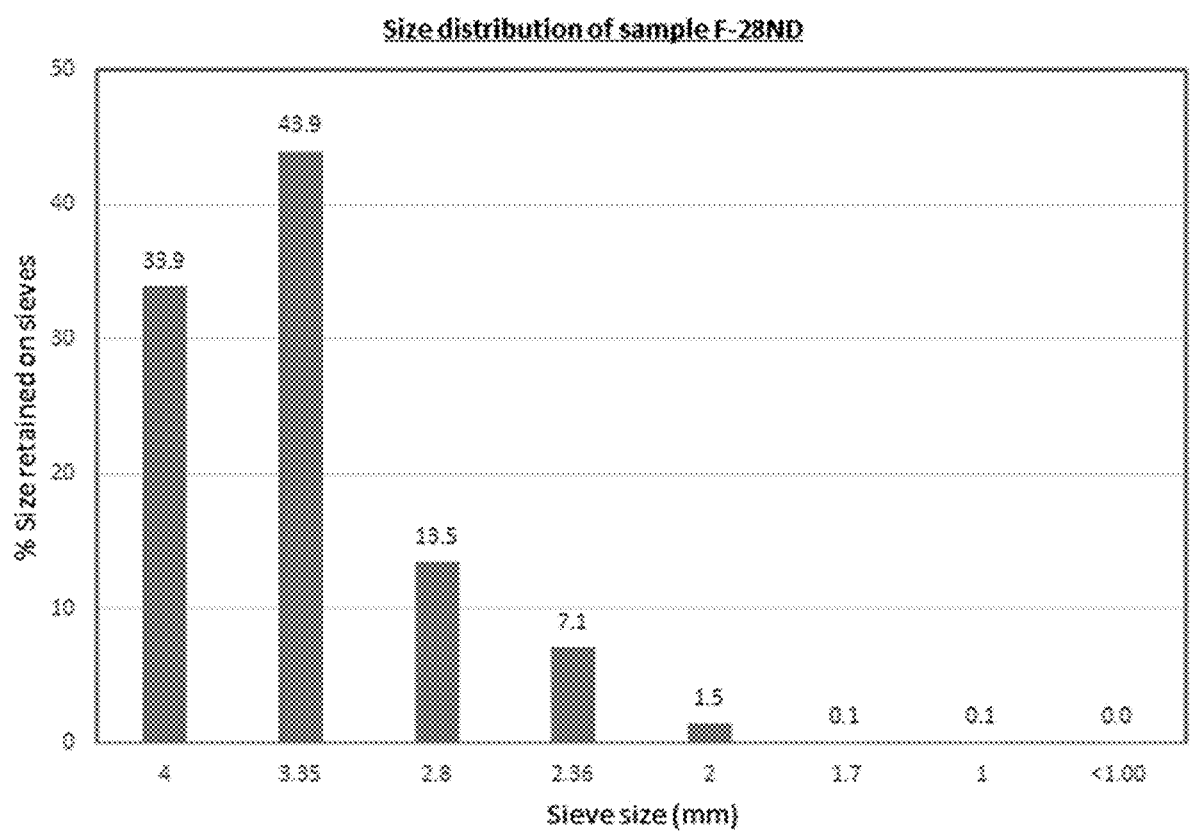
Figure 3C:
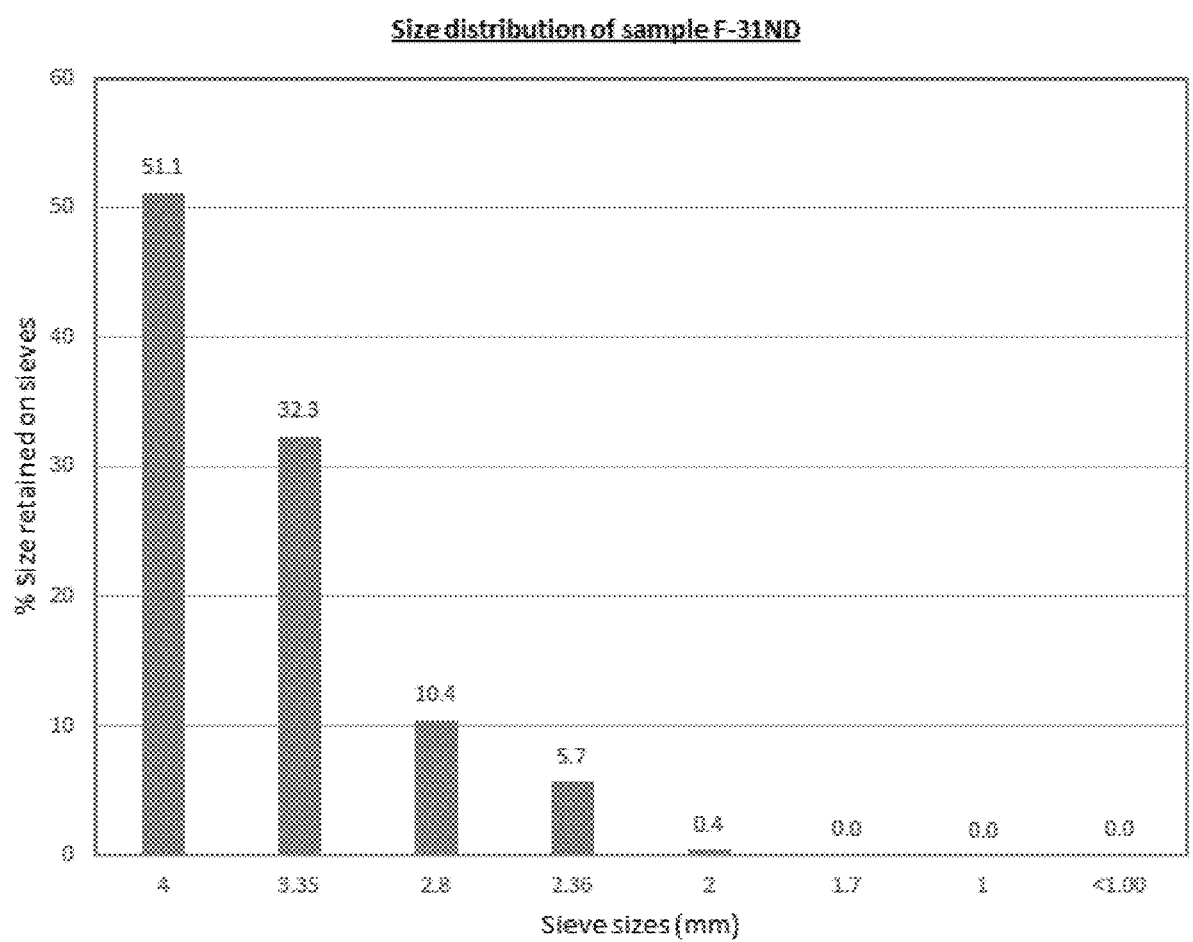

The size distribution of the urea coated and granulated sample F-29ND is shown in FIG. 3A. The size distribution of the urea coated and granulated sample F-28ND is shown in FIG. 3B. The size distribution of the urea coated and granulated sample F-31ND is shown in FIG. 3B. FIGS. 3A and 3B shows that the fertilizer granules F-29ND, F-28ND, F-31ND have a size distribution from about 2.0 mm to about 4.0 mm, wherein the majority of the fertilizer granules have a size from about 2.8 mm to about 4 mm.

The nitrogen volatilization was measured in different soils for several samples and compared to products on the market, such as Agrotain®, ESN®, and SuperU®. The samples were tested in Greenville soil, Crowley soil, and Brownfield Soil.

Brownfield soil is generally described as calcareous sandy loam. Its soil taxonomic classification is loamy, mixed, super active, thermic Arenic Aridic Paleustalfs. The soil belongs to the order Alfisol and is slightly weathered soil found in warm arid regions. The soil has soil pH of 7.4-7.7; hence with high volatilization potential and being a sandy loam also has a higher leaching potential than Greenville soil. Brownfield soil is also highly phosphorous-deficient (Bray 1 P=2.4 mg P kg$^{-1}$, Pi-P=2.6 mg P kg$^{-1}$), with CEC of 6.6 cmol/kg. the soil also has less than 1% organic matter and is deficient in nitrogen.

Greenville soil or Greenville clay-loam soil is a loamy heavier textured soil than Brownfield. The soil is typical of weathered tropical ultisols, and is found in warm humid environments. The soil is classified as fine, kaolinitic, thermic Rhodic Kandiudults) with a pH of 6.1-6. The soil has organic matter of 1.4%, total amount of nitrogen is about 0.06%, and the CEC is 5.2 cmol/kg. Accordingly, the soil has a low content of organic matter, and also low availability of sulfur and nitrogen. Thus, the soil is ideal for nitrogen and sulfur trials with fertilizers.

Crowley soil consists of very deep, somewhat poorly drained, very slowly permeable soils that formed in clayey fluviomarine deposits of the Pleistocene age. The soil exist in nearly level to very gently sloping soils and occur on flat coastal plains terraces. The slope is dominantly less than 1 percent but ranges to up to 3 percent. The mean annual precipitation is about 1549 mm (61 in), and the mean annual air temperature is about 20 degrees c. (68 degrees F.), where the soil is found. The soil is fine, smectitic, and thermic Typic Albaqualfs.

Figure 4:
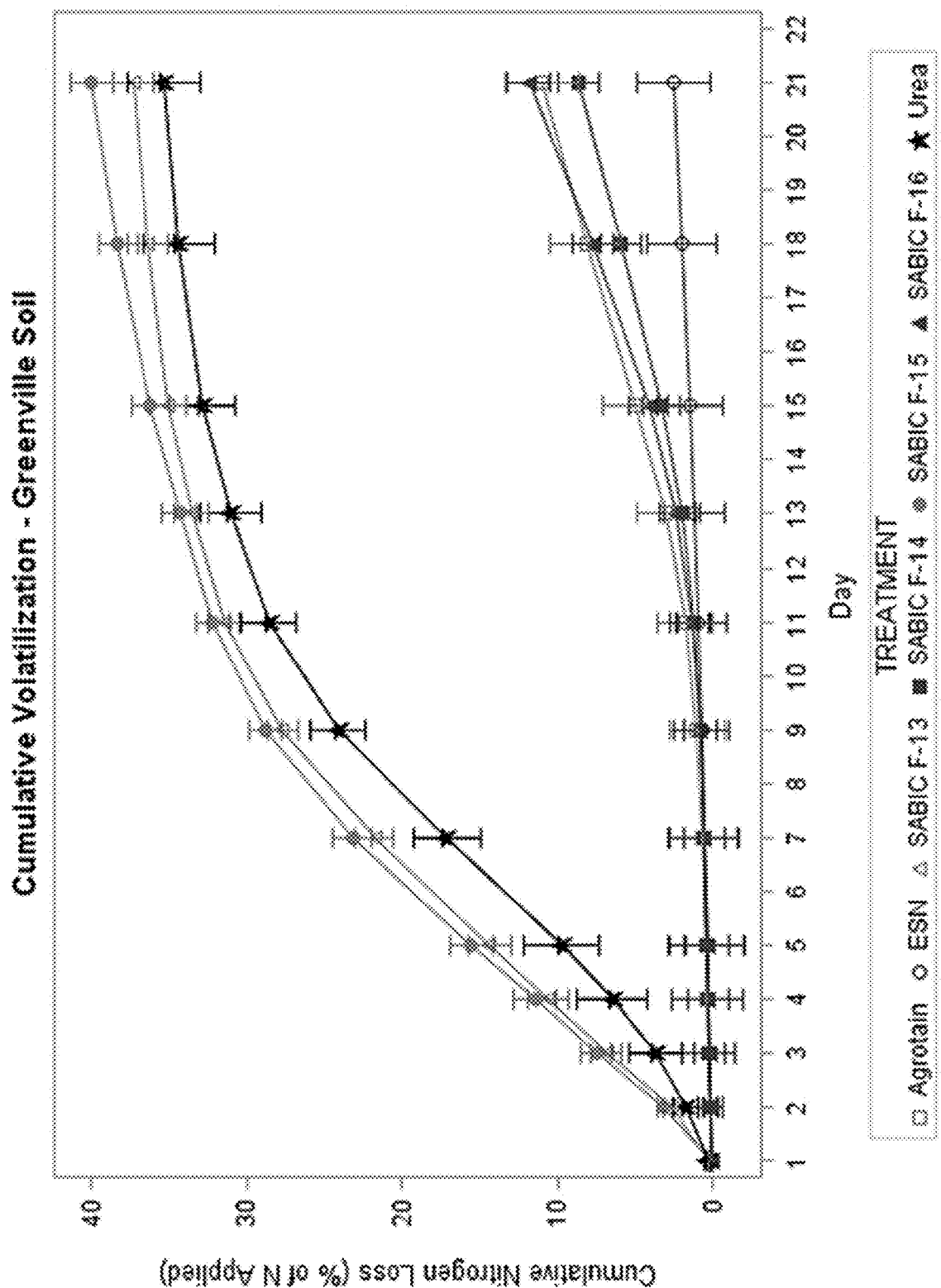
FIG. 4 shows the nitrogen volatilization of exemplary fertilize granules.
Figure 5:
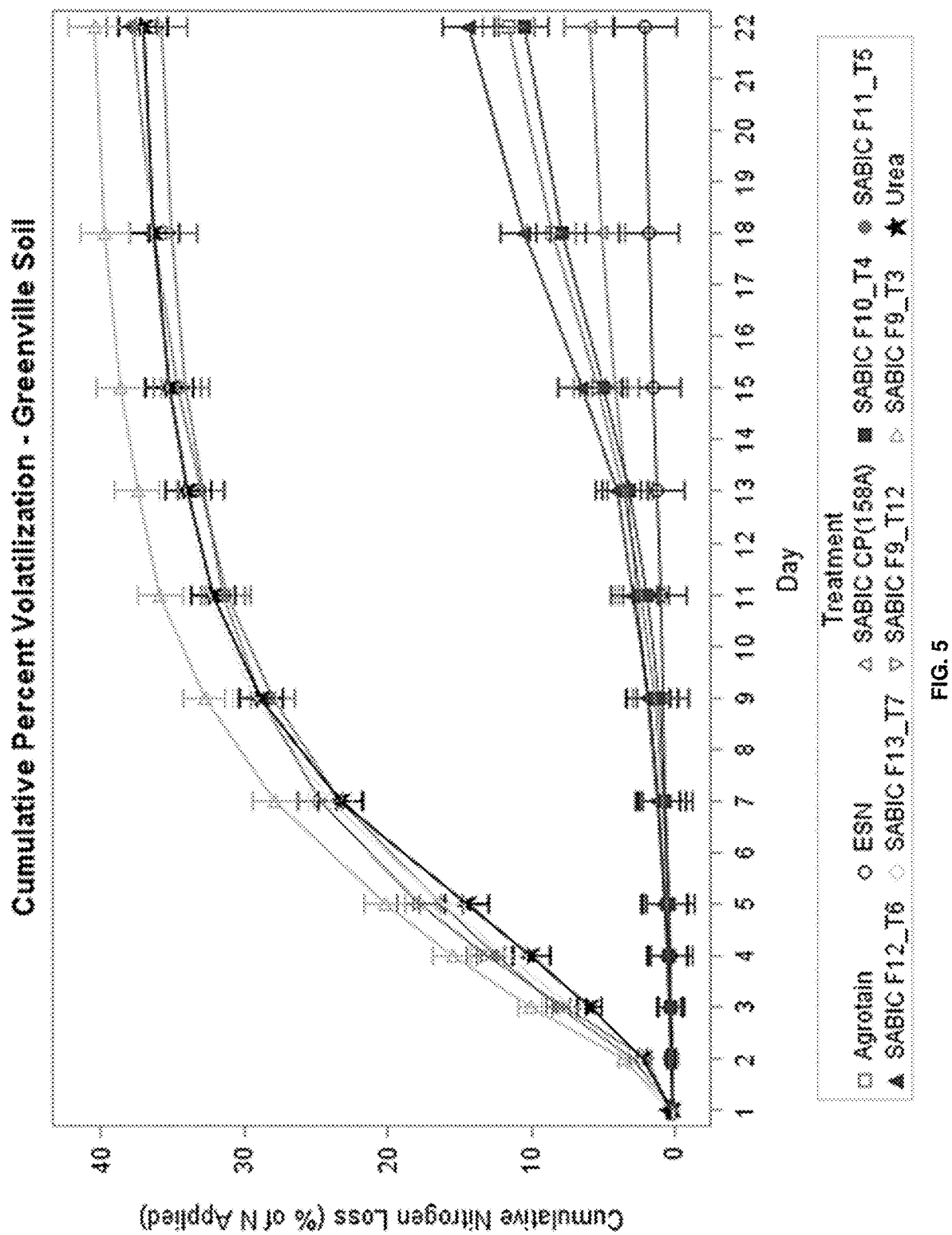
FIG. 5 shows the nitrogen volatilization of exemplary fertilize granules.

The nitrogen volatilization of various exemplary samples of fertilizer granules as compared to Agrotain®, ESN®, SuperU, and urea, is shown in FIG. 4-FIG. 9. The measurement shown in FIG. 4 and FIG. 5 is the percentage of nitrogen loss as ammonia volatilization as compared to the amount of nitrogen applied. FIGS. 6-9 show the nitrogen loss in mg.

Figure 6:
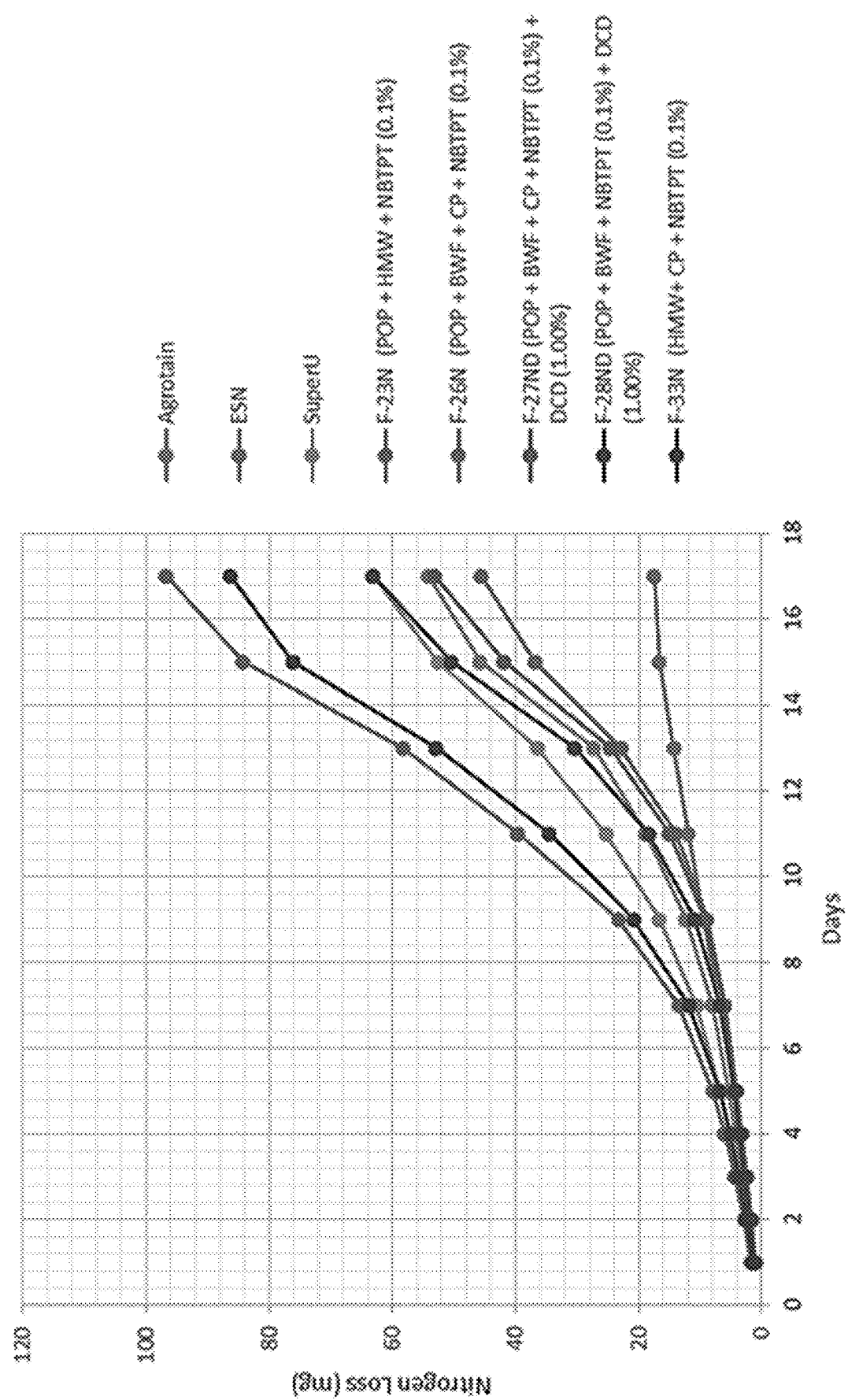
FIG. 6 shows the nitrogen volatilization of exemplary fertilize granules.
Figure 7:
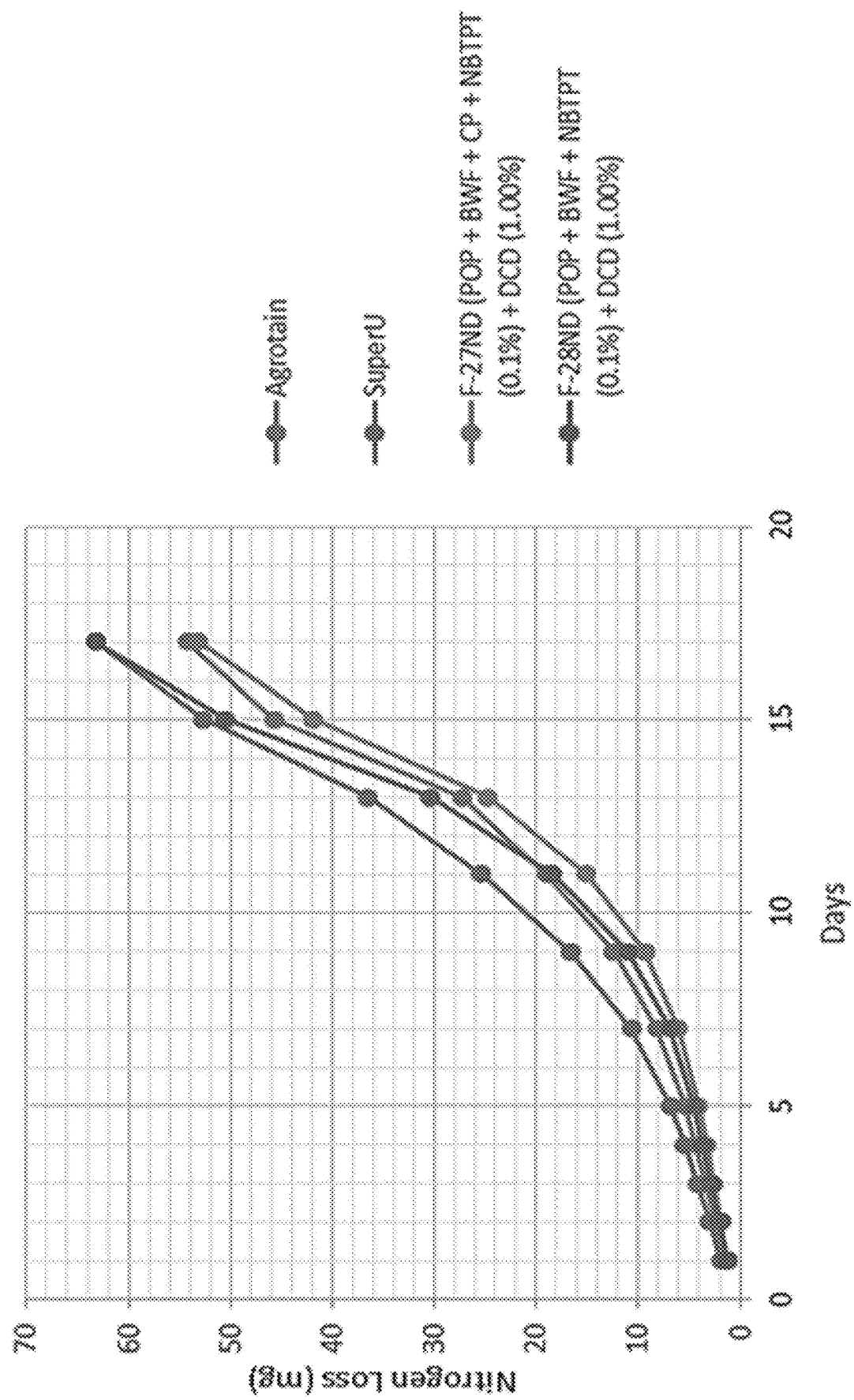
FIG. 7 shows the nitrogen volatilization of exemplary fertilize granules.
Figure 8:
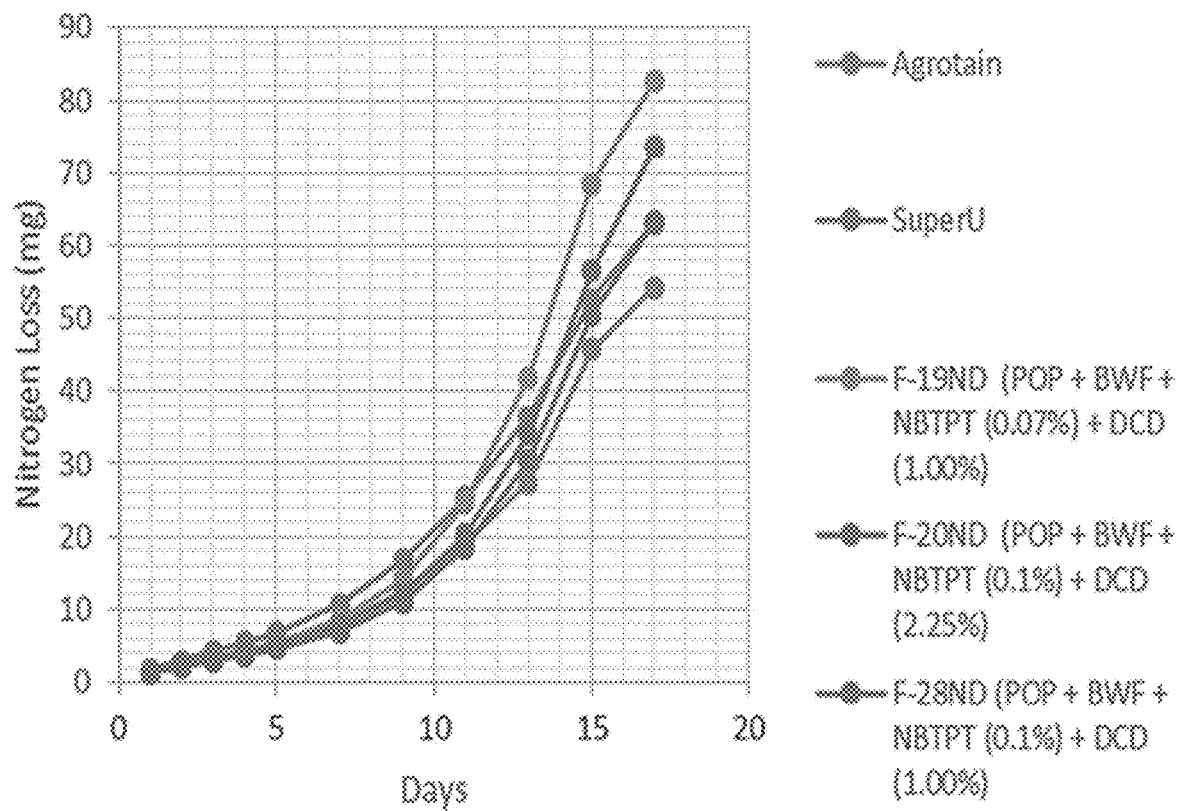
FIG. 8 shows the nitrogen volatilization of exemplary fertilize granules.
Figure 9:
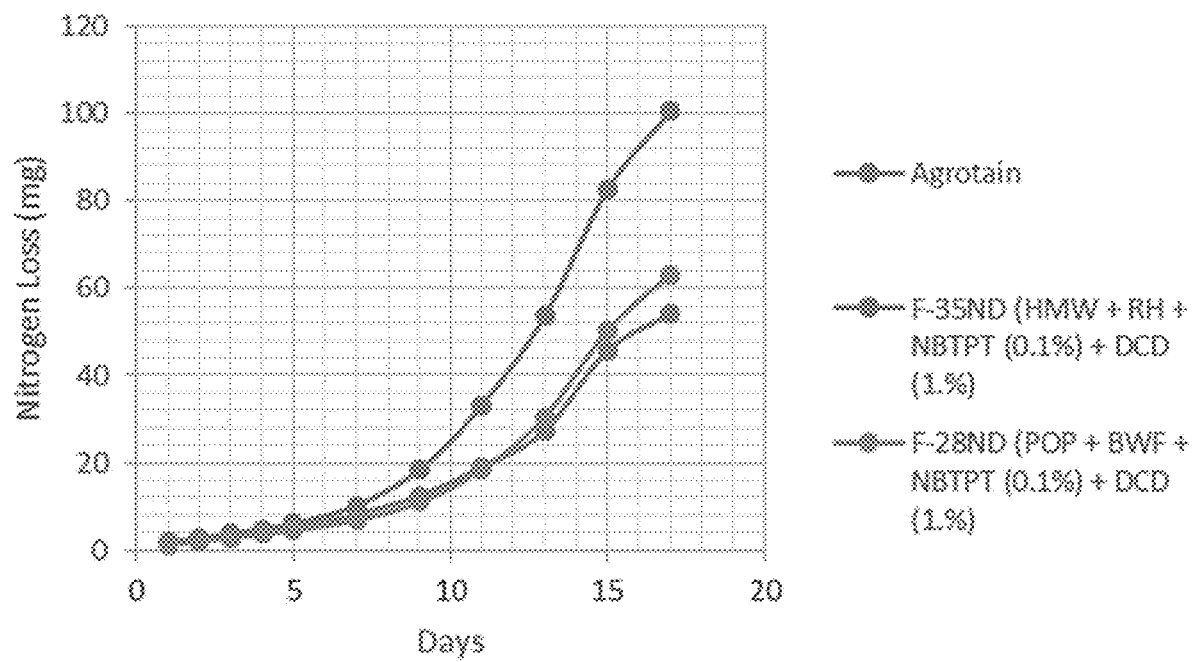
FIG. 9 shows the nitrogen volatilization of exemplary fertilize granules.

The results show that the exemplary fertilizer granules have low ammonia volatilization and nitrogen loss. For example, samples F-14, F-16, F-10, F-12, F-28ND, F-27ND, F-19ND, and F-26N have lower or comparable ammonia volatilization and nitrogen loss to commercial products. FIGS. 6-7 show the impact of nitrogen loss in fertilizer granules with the different binders and a pH buffering agent. FIGS. 8-9 show the impact of nitrogen loss in fertilizer granules with the different binders but without a pH buffering agent.

Figure 10A:
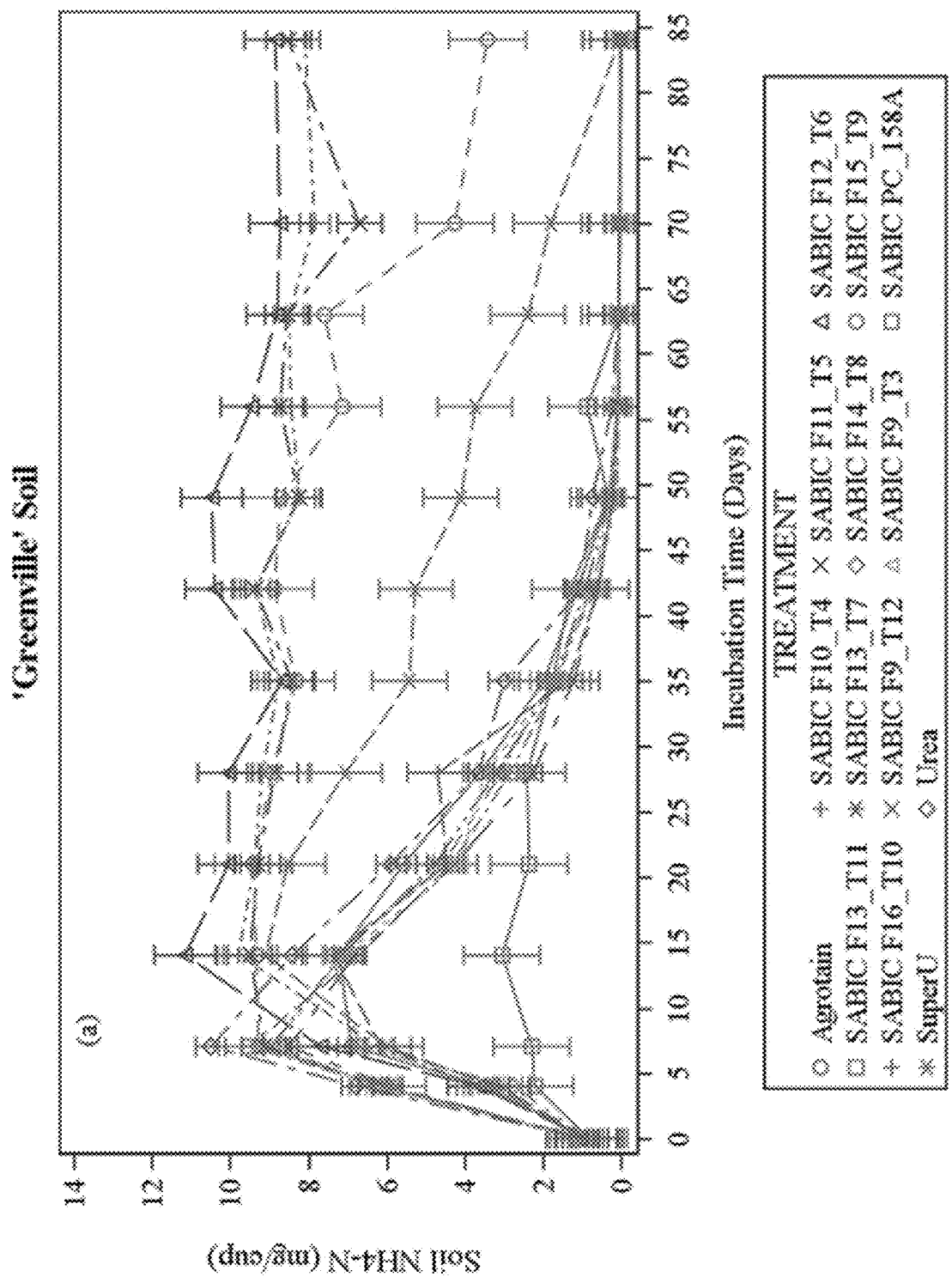
FIGS. 10A and 10B show the nitrogen transformation measurements of fertilizer granules in Greenville Soil.
Figure 10B:
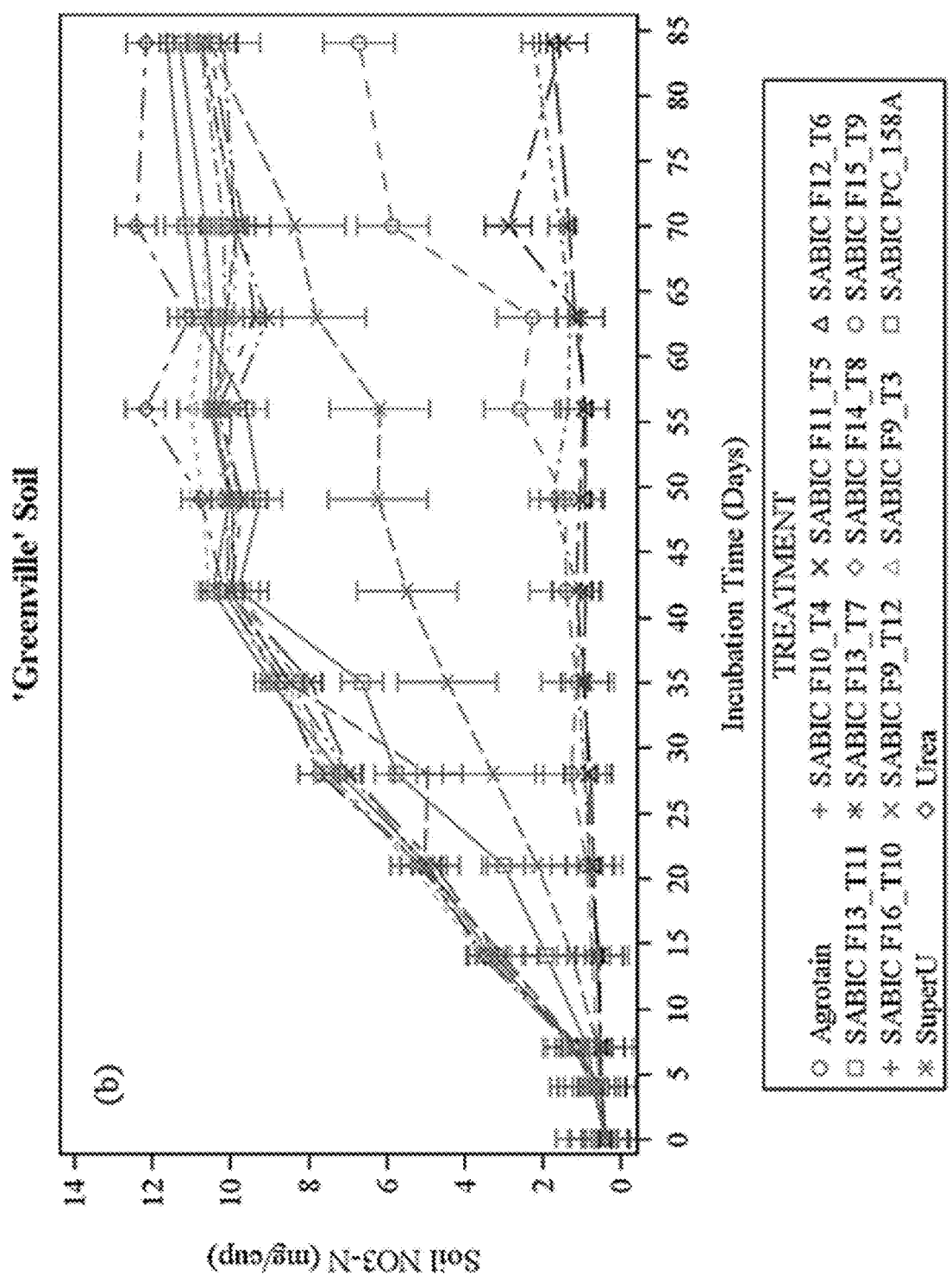
Figure 11A:
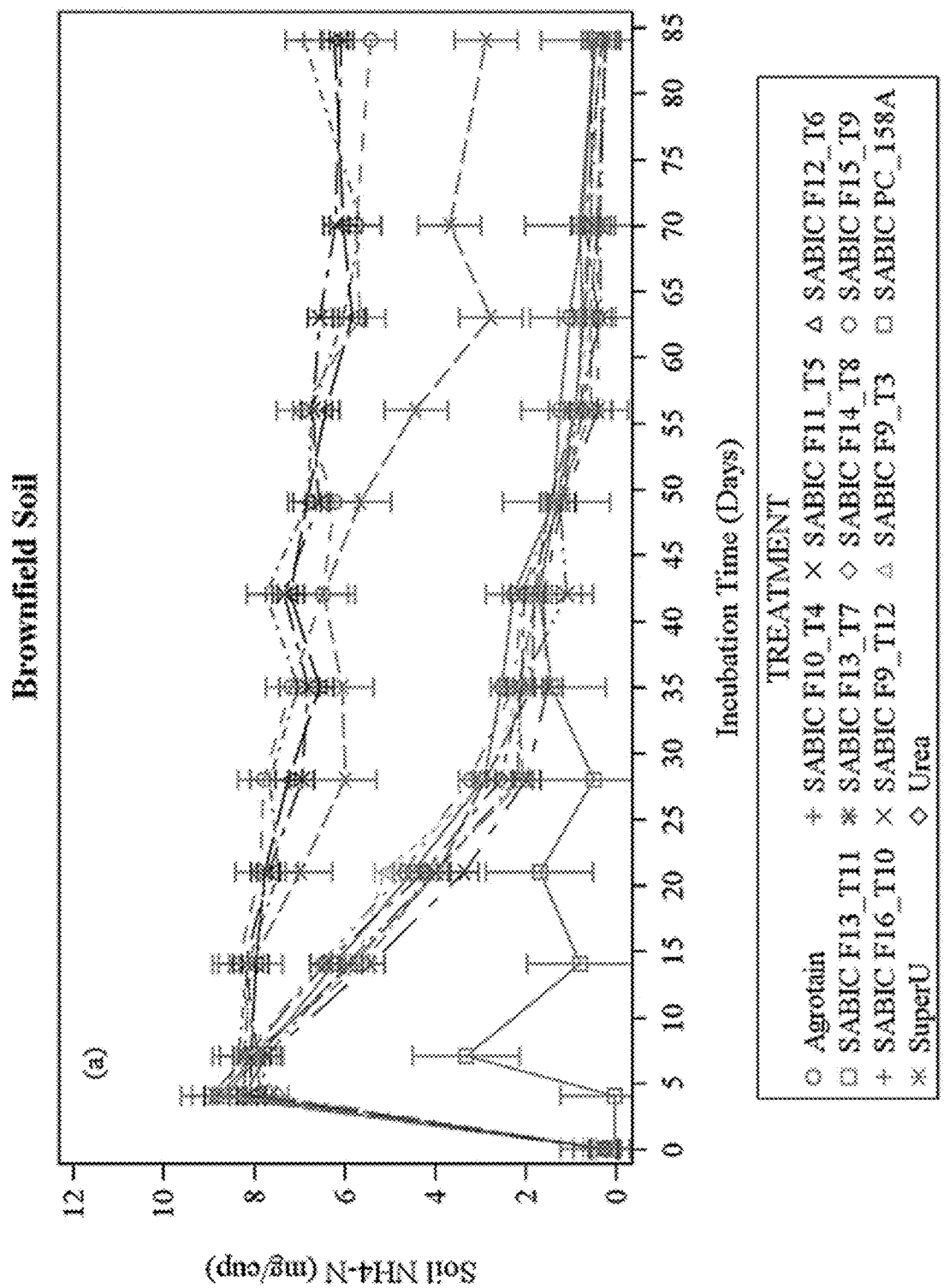
FIGS. 11A and 11B show the nitrogen transformation measurements of fertilizer granules in Brownfield Soil.
Figure 11B:
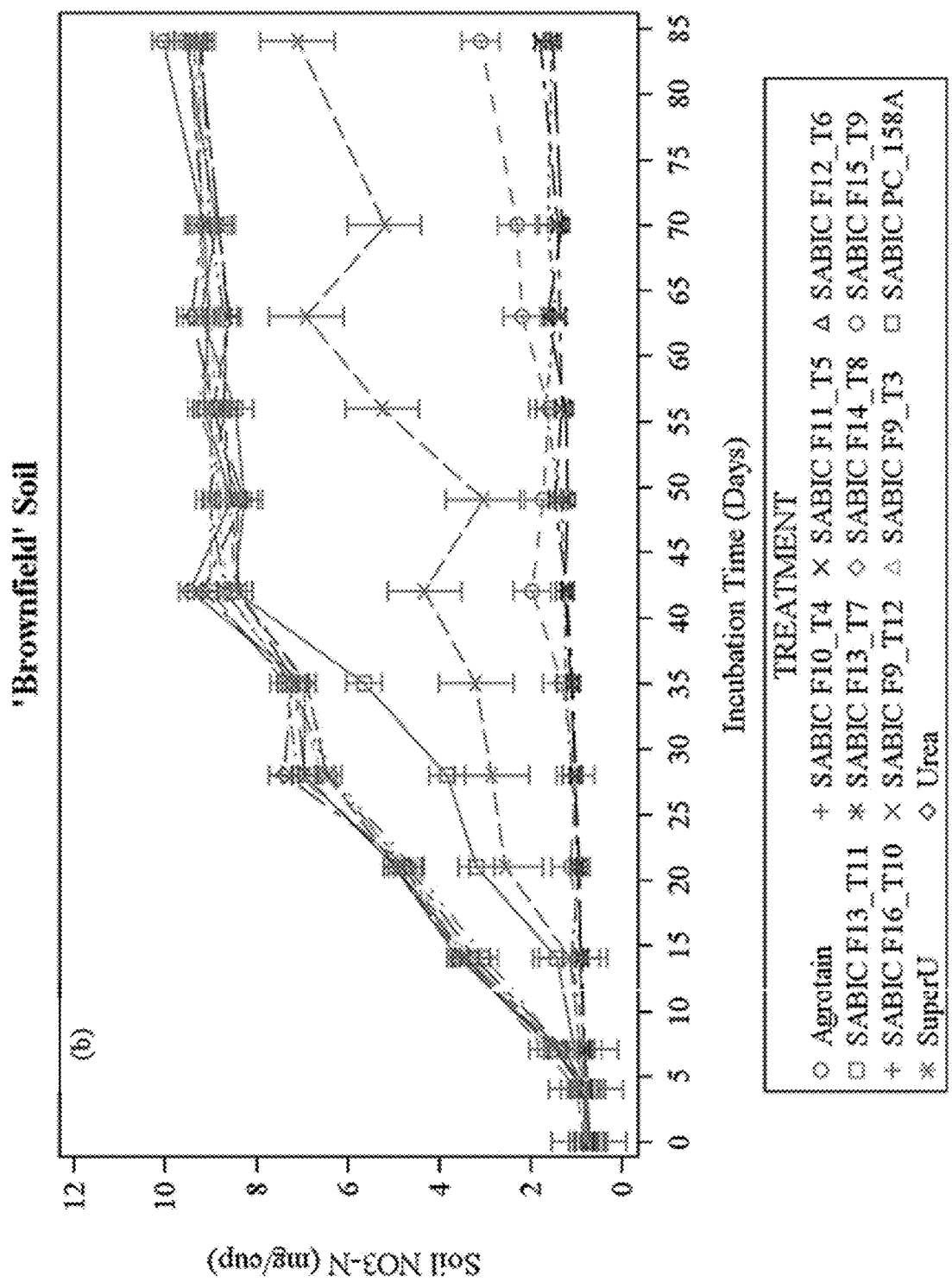

The nitrogen transformation (nitrification) was measured for exemplary fertilizer granule samples. The nitrogen transformation (nitrification) measurements were conducted in both Greenville Soil and in Brownfield sandy soil. FIG. 10A, 10B, 11A and FIG. 11B show the results. FIGS. 10A and 11A show the nitrogen content present as ammonium in the soil, and FIGS. 10B and 11B show the nitrogen content present as nitrate in the soil.

Table 5 shows the loss of nitrogen and percentage reduction of nitrogen of F-26, F27, F-28, urea Agrotain®, and SuperU® after 17 days of exposure to Upland Crowley Soil at the International Fertilizer Development Centre (IFDC, Alabama, USA).

TABLE 5

| Sampel | PoP | BWF | CP | DCD | NBTPT | Cumulative Nitrogen Loss (mg) by 17 Days | % Urea | % Reduction in Nitrogen Loss |
|---|---|---|---|---|---|---|---|---|
| F-26 | 0.38 | 0.28 | 0.32 | 0.00 | 0.022 | 45.59 | 15.24 | 84.76 |
| F-27 | 0.30 | 0.24 | 0.22 | 0.22 | 0.022 | 53.12 | 17.76 | 82.24 |
| F-28 | 0.45 | 0.30 | 0.00 | 0.22 | 0.022 | 63.2 | 21.13 | 78.87 |
| Urea | | | | | | 299.08 | 100 | 0 |
| Agrotain ® | | | | | | 54.22 | 18.13 | 81.87 |
| SuperU ® | | | | | | 63.21 | 21.13 | 78.87 |

The data show that F-26 and F-27 has less nitrogen loss than Agrotain® and SuperU®, and non-CP containing formulation F-28.

Overall, the exemplary fertilizer granules showed comparative or better performance as compared to benchmark product, Agrotain®, which indicates that the fertilizer core effectively shields and provides stability of inhibitors (active ingredient), such as for example, NBTPT, during urea melt conditions during the granulation process.

Table 7 shows that the addition of a pH buffering agent, such as chalk powder (contains mostly $CaCO_3$), improved the performance of the fertilizer granules. This effect can be attributed to that the pH buffering agent stabilizes the inhibitors (active ingredient), such as for example, NBTPT, in the soil and/or during the granulation process.

What is claimed is:

1. A fertilizer granule comprising a core particle having an outer surface coated with a first nitrogen containing fertilizer composition, the core particle comprising:
   one or more fertilizer additives comprising a urease inhibitor or a nitrification inhibitor, or a combination thereof;
   one or more binders comprising a wax; and
   one or more pH buffering agents, and
   wherein the core particle comprises from about 10 wt % to about 99 wt % of the one or more binders comprising a wax.

2. The fertilizer granule of claim 1, wherein the urease inhibitor comprises N-(n-butyl) thiophosphoric triamide (NBTPT) or phenyl phosphorodiamidate (PPDA), or a combination thereof, and wherein the nitrification inhibitor comprises 3,4-dimethylpyrazole phosphate (DMPP), thio-urea (TU), dicyandiamide (DCD), 2-Chloro-6-(trichloromethyl)-pyridine (Nitrapyrin), 5-Ethoxy-3-trichloromethyl-1, 2, 4-thiadiazol (Terrazole), 2-Amino-4-chloro-6-methyl-pyrimidine (AM), 2-Mercaptobenzothiazole (MBT), or 2-Sulfanimalamidothiazole (ST), or a combination thereof.

3. The fertilizer granule of claim 1, wherein the one or more pH buffering agents comprise $CaCO_3$, MgO, $KH_2PO_4$, or $NaHCO_3$, or a combination thereof.

4. The fertilizer granule of claim 1, wherein the core particle comprises from about 60 wt % to about 90 wt % of the one or more binders comprising a wax.

5. The fertilizer granule of claim 1, wherein the core particle comprises from about 5 wt % to about 60 wt % of the one or more pH buffering agents.

6. The fertilizer granule of claim 1, wherein the one or more binders comprising a wax comprise a high melt wax.

7. The fertilizer granule of claim 1, wherein the one or more binders comprising a wax comprise a low melt wax.

8. The fertilizer granule of claim 1, wherein the fertilizer core particle comprises from 20 wt % to 50 wt % of a low melt wax or high melt wax or combination thereof, from 20 wt % to 50 wt % of a binder selected from bleached wheat flour, or starch, or a filler comprising rice husk, or a combination thereof, from 10 wt % to 30 wt % of DCD, and from more than 0 wt % to 5 wt % of NBTPT, and from about 15 wt % to about 50 wt % of the pH buffering agent.

9. The fertilizer granule of claim 8, wherein the first nitrogen containing fertilizer composition coating the fertilizer core particle comprises urea.

10. The fertilizer granule of claim 1, wherein the fertilizer core particle comprises a filler comprising rice husk.

11. The fertilizer granule of claim 1, wherein the first nitrogen containing fertilizer composition coating the fertilizer core particle at least partially surrounds the fertilizer core particle.

12. The fertilizer granule of claim 1, wherein the first nitrogen containing fertilizer composition comprises urea, ammonium nitrate, ammonium sulfate, diammonium phosphate, monoammonium phosphate, urea-formaldehyde, ammonium chloride, or potassium nitrate, or a combination thereof.

13. The fertilizer granule claim 11, wherein the coating comprises urea.

14. A kit comprising
   a) the fertilizer granule of claim 1; and
   b) a fertilizer composition.

15. A fertilizer core particle having an outer surface and comprising:
   one or more fertilizer additives;
   one or more binders comprising a wax; and
   one or more pH buffering agents, and
   wherein the core particle comprises from about 10 wt % to about 99 wt % of the one or more binders comprising a wax and wherein the fertilizer core particle comprises from 20 wt % to 50 wt % of a low melt wax or high melt wax or combination thereof, from 20 wt % to 50 wt % of a binder selected from bleached wheat flour, or starch, or a filler comprising rice husk, or a combination thereof, from 10 wt % to 30 wt % of DCD, and from more than 0 wt % to 5 wt % of NBTPT, and from about 15 wt % to about 50 wt % of the pH buffering agent.

16. A fertilizer granule comprising the fertilizer core particle of claim 15 and an outer shell comprising urea at least partially surrounding the core particle.

17. A method for preparing the fertilizer granule of claim 1 comprising the step of:
   a) extruding a mixture comprising one or more fertilizer additives, one or more binders comprising a wax, and one or more pH buffering agents, and wherein the mixture comprises from about 10 wt % to about 99 wt % of the one or more binders, thereby forming the fertilizer core particle.

18. The method of claim 17, wherein the one or more binders comprising a wax comprise a high melt wax and the temperature of the extrusion is performed from about 80° C. to about 150° C.

19. The method of claim 17, wherein the one or more binders comprising a wax comprise a high melt wax or a low melt wax, or a combination thereof.

20. A method for preparing a fertilizer granule of claim 1 comprising the steps of:
  a) providing a core particle comprising one or more fertilizer additives, one or more binders comprising a wax, and one or more pH buffering agents, and wherein the core particle comprises from about 10 wt % to about 99 wt % of the one or more binders comprising a wax; and
  b) granulating the core particle with a first nitrogen containing fertilizer composition, thereby forming a fertilizer granule.

\* \* \* \* \*